US012779463B2

(12) United States Patent
Oh et al.

(10) Patent No.: US 12,779,463 B2
(45) Date of Patent: Nov. 3, 2026

(54) LOW-VOLTAGE MICROFLUIDIC DEVICES

(71) Applicant: Regents of the University of Minnesota, Minneapolis, MN (US)

(72) Inventors: Sang-Hyun Oh, Plymouth, MN (US); Christopher T. Ertsgaard, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 1119 days.

(21) Appl. No.: 17/756,403

(22) PCT Filed: Nov. 20, 2020

(86) PCT No.: PCT/US2020/061553
§ 371 (c)(1),
(2) Date: May 24, 2022

(87) PCT Pub. No.: WO2021/108261
PCT Pub. Date: Jun. 3, 2021

(65) Prior Publication Data

US 2022/0395827 A1 Dec. 15, 2022

Related U.S. Application Data

(60) Provisional application No. 62/940,540, filed on Nov. 26, 2019.

(51) Int. Cl.
*B01L 3/00* (2006.01)

(52) U.S. Cl.
CPC ..... *B01L 3/50273* (2013.01); *B01L 3/502707* (2013.01); *B01L 3/502761* (2013.01);
(Continued)

(58) Field of Classification Search
CPC .......... B01L 3/50273; B01L 3/502707; B01L 3/502761; B01L 2200/0652;
(Continued)

(56) References Cited

U.S. PATENT DOCUMENTS 5,858,195 A 1/1999 Ramsey
6,110,343 A 8/2000 Ramsey et al.
(Continued)

FOREIGN PATENT DOCUMENTS

CN 102681048 A 9/2012
CN 104583816 A 4/2015
(Continued)

OTHER PUBLICATIONS

Response to Office Action dated May 29, 2024, from counterpart Canadian Application No. 3,159,444 filed Sep. 17, 2024, 18 pp.
(Continued)

*Primary Examiner* — Brian J. Sines
(74) *Attorney, Agent, or Firm* — Shumaker & Sieffert, P.A.

(57) ABSTRACT

A microfluidic device includes a bottom electrode, a dielectric layer on the bottom electrode, one or more top electrodes on a region of the dielectric layer. Each of the one or more top electrodes has a sidewall that forms a sidewall angle with an outer surface of the dielectric layer that is less than 180 degrees. The sidewall of each of the one or more top electrodes and a portion of the outer surface of the dielectric layer adjacent to the sidewall define a microchannel region for transporting an open microchannel of a fluid. Such microfluidic devices may enable transport of small microchannels using low voltages.

29 Claims, 23 Drawing Sheets

(52) U.S. Cl.
CPC ... *B01L 2200/0652* (2013.01); *B01L 2200/10* (2013.01); *B01L 2400/0424* (2013.01)

(58) Field of Classification Search
CPC ......... B01L 2200/10; B01L 2400/0424; B01L 2200/0668; B01L 3/502792; B01L 2300/0645; B01L 2300/0887; B01L 2300/161
See application file for complete search history.

(56) References Cited

U.S. PATENT DOCUMENTS

| | | | | |
|---|---|---|---|---|
| 7,081,192 | B1 | 7/2006 | Wang et al. | |
| 8,810,893 | B2 | 8/2014 | Cai et al. | |
| 2003/0012483 | A1* | 1/2003 | Ticknor | F04B 19/006 385/39 |
| 2003/0118453 | A1* | 6/2003 | Fritsch | B01L 3/502784 417/48 |
| 2006/0245140 | A1 | 11/2006 | Hunt et al. | |
| 2007/0105239 | A1 | 5/2007 | Lee et al. | |
| 2008/0169195 | A1 | 7/2008 | Jones et al. | |
| 2009/0032401 | A1* | 2/2009 | Ronaghi | B01L 3/502761 204/647 |
| 2011/0294691 | A1 | 12/2011 | Erickson et al. | |
| 2014/0061049 | A1* | 3/2014 | Lo | G01N 27/44704 204/547 |
| 2014/0152641 | A1 | 6/2014 | Yun et al. | |
| 2014/0198372 | A1 | 7/2014 | Cai et al. | |
| 2015/0124311 | A1 | 5/2015 | Berge et al. | |
| 2015/0174574 | A1* | 6/2015 | Chang | G01N 33/54366 204/601 |
| 2015/0253267 | A1* | 9/2015 | Quellet | G06Q 10/06313 324/76.39 |
| 2019/0030537 | A1* | 1/2019 | Hadwen | B01L 3/502715 |
| 2019/0099756 | A1 | 4/2019 | Pang et al. | |
| 2019/0111433 | A1 | 4/2019 | French | |
| 2019/0211389 | A1 | 7/2019 | Chen et al. | |
| 2021/0322977 | A1* | 10/2021 | Sun | B01L 3/502707 |

FOREIGN PATENT DOCUMENTS

| | | | |
|---|---|---|---|
| CN | 105797792 | A | 7/2016 |
| CN | 105842841 | A | 8/2016 |
| CN | 107790199 | A | 3/2018 |
| CN | 108339581 | A | 7/2018 |
| KR | 20140071192 | A | 6/2014 |
| WO | 2021056352 | A1 | 4/2021 |

OTHER PUBLICATIONS

Response to Extended Search Report dated Feb. 28, 2023, from counterpart European Application No. 20892717.8 filed Sep. 11, 2023, 13 pp.
Response to Official Action dated Jul. 18, 2023, from counterpart Canadian Application No. 3159444 filed Nov. 16, 2023, 14 pp.
Ahmed et al., "A Pumpless Acoustofluidic Platform for Size-Selective Concentration and Separation of Microparticles" Analytical chemistry, vol. 89, No. 24, ACS Publications, Nov. 21, 2017, pp. A-G.
Chang, "New Electrokinetic Techniques for Material Manipulation on the Microscale", North Carolina State University, Nov. 25, 2008, 180 pp.
Guzman et al., "Spatially controlled microfluidics using low-voltage electrokinetics", Journal of microelectromechanical systems, vol. 15, No. 1, Feb. 6, 2006, pp. 237-245.
Jones, "Liquid dielectrophoresis on the microscale", Journal of Electrostatics, vol. 51-52, Elsevier Science B.V., May 1, 2001, pp. 290-299.
Kaler et al., "Liquid dielectrophoresis and surface microfluidics", Biomicrofluidics, vol. 4, No. 2, American Institute of Physics, Jun. 29, 2010, 17 pp.
Kang, "On-Chip Separation and Detection of Biological Particles Using Dielectrophoresis and Resistive Pulse Sensing", Dec. 2008, 186 pp., https://core.ac.uk/download/pdf/216048622.pdf.
Khodayari et al., "A material system for reliable low voltage anodic electrowetting", Materials Letters, vol. 69, Feb. 15, 2012, 10 pp.
Khodayari, "Continuous Electrowetting in Passivating and Non-passivating Systems", USF Tampa Graduate Theses and Dissertations, Jan. 2013, 133 pp., Retrieved from the Internet on Aug. 25, 2022 from URL: https://digitalcommons.usf.edu/etd/4708/.
Kornyshev et al., "Ultra-Low-Voltage Electrowetting", Journal of Physical Chemistry C, vol. 114, Aug. 17, 2010, p. 14885-14890.
Li et al., "Biosensors based on nanomaterials and nanodevices", CRC Press, Dec. 20, 2013, 517 pp.
Miled et al., "Dielectrophoresis-based integrated lab-on-chip for nano and micro-particles manipulation and capacitive detection", IEEE transactions on biomedical circuits and systems, vol. 6, No. 2, IEEE, Mar. 2, 2012, pp. 120-132.
Miled et al., "Low-voltage dielectrophoretic platform for lab-on-chip biosensing applications", Proceedings of the 8th IEEE International NEWCAS Conference 2010, IEEE, Jun. 20, 2010, pp. 389-392.
Moon et al., "Low voltage electrowetting-on-dielectric", Journal of applied physics, vol. 92, No. 7, American Institute of Physics, Oct. 1, 2002, pp. 4080-4087.
Reddy et al., "Electrical Chips for Biological Point-of-Care Detection", Annual Review of Biomedical Engineering, vol. 18, Jul. 11, 2016, pp. 329-355.
Renaudot et al., "Optimized micro devices for liquid-dielectrophoresis (LDEP) actuation of conductive solutions", Sensors and Actuators B: Chemical, vol. 177, Elsevier, Feb. 1, 2013, pp. 620-626.
Rios et al., "Miniaturization through lab-on-a-chip: Utopia or reality for routine laboratories? A review", Analytica Chimica Acta, vol. 740, Aug. 31, 2012, pp. 1-11.
Wikipedia, "Electrowetting", 8 pp., Retrieved from the Internet on Aug. 25, 2022 from URL: https://en.wikipedia.org/wiki/Electrowetting.
Wu et al., "Electrostatic droplet manipulation using electret as a voltage source", 2008 IEEE 21st International Conference on Micro Electro Mechanical Systems, IEEE, Jan. 13, 2008, pp. 591-594.
Wu et al., "Low-voltage droplet manipulation using liquid dielectrophoresis on electret", Journal of Micromechanics and Microengineering, vol. 20, No. 8, IOP Publishing, Jul. 28, 2010, 8 pp.
Zeinali, "Microfluidic Device with 3d Electrode Structure for High Throughput Dielectrophoretic Applications", Bilkent University, Oct. 1, 2014, 72 pp.
Zhao et al., "Large area and low power dielectrowetting optical shutter with local deterministic fluid film breakup", Applied Physics Letters, vol. 103, No. 22, AIP Publishing LLC, Nov. 25, 2013, pp. 223510-1-223510-5.
International Search Report and Written Opinion of International Searching Authority, mailed Mar. 24, 2021, for counterpart WO application PCT/US 2020/061553.
Kumar, "Optical nano-antennas: Fabrication, characterization and applications," 2011, 93 pp.
Lopez-Sanchez et al., "Ultrasensitive photodetectors based on monolayer MoS2," Nature Nanotechnology, vol. 8, 2013, pp. 497-501.
Mehrotra et al., "EM-Wave Biosensors: A Review of RF, Microwave, mm-Wave and Optical Sensing," Sensors, vol. 19, 2019, pp. 1013-1058.
"Green Fluorescent Protein: Shining New Light on Food QC," Microbiologics Blog, Aug. 4, 2013, 6 pp., obtained on Aug. 25, 2022, from https://blog.microbiologics.com/green-fluorescent-proteins-shining-new-light-on-food-qc/.
Minerva et al., "A Cloverleaf-like Structure Extending the Operational Bandwidth of Integrated Inductors," Proceedings of the 34th European Microwave Conference, 2004, pp. 1369-1372.
Mohan et al., "Simple Accurate Expressions for Planar Spiral Inductances," IEEE Journal of Solid-State Circuits, vol. 34, No. 10, Oct. 1999, pp. 1419-1424.
"The World's Most Sensitive Plasmon Resonance Sensor Inspired by Ancient Roman Cup," University of Illinois College of Engi-

(56) References Cited

OTHER PUBLICATIONS neering, ScienceDaily, Feb. 14, 2013, 3 pp., obtained on Aug. 24, 2022 from https://phys.org/news/2013-02-world-sensitive-plasmon-resonance-sensor.html.
"Rapid Result Pregnancy Test," https://www.PNGKIT.com, Dec. 2018, 1 p., obtained on Aug. 30, 2022, from https://www.pngkit.com/view/u2q8e6w7a900r5u2_rapid-result-pregnancy-test-pregnancy/.
"New Nanoantenna Technology Developed to Harvest Light," University of Illinois College of Engineering, Sci Tech Daily, Nov. 23, 2019, 6 pp., obtained on Aug. 25, 2022, from https://scitechdaily.com/new-nanoantenna-technology-developed-to-harvest-light/.
Notice of Intent to Grant from counterpart Canadian Application No. 3,159,444 dated Aug. 27, 2025, 1 pp.
Office Action from counterpart Application No. 11202205507Q dated Nov. 18, 2025, 11 pp.
Office Action from counterpart Canadian Application No. 3,159,444 dated Jul. 18, 2023, 4 pp.
Extended Search Report from counterpart European Application No. 20892717.8 dated Feb. 28, 2023, 9 pp.
Office Action from counterpart Canadian Application No. 3,159,444 dated May 29, 2024, 4 pp.
International Preliminary Report on Patentability from International Application No. PCT/US2020/061553, dated Jun. 9, 2022, 8 pp.
Invitation to Pay Additional Fees and, Where Applicable, Protest Fee from International U.S. Appl. No. 17/756,403 dated Feb. 2, 2021, 2 pp.

* cited by examiner

LOW-VOLTAGE MICROFLUIDIC DEVICES

This application is a National Stage application under 35 U.S.C. § 371 of PCT Application No. PCT/US2020/061.553, entitled "LOW-VOLTAGE MICROFLUIDIC DEVICES" and filed on Nov. 20, 2020, which claims the benefit of U.S. Provisional Patent Application No. 62/940,540, titled "LOW-VOLTAGE MICRO-FLUIDIC DEVICES" and filed Nov. 26, 2019. The entire contents of application nos. PCT/US2020/061553 and 62/940,540 are incorporated herein by reference.

TECHNICAL FIELD

The present disclosure relates to microfluidic devices.

BACKGROUND

Microfluidics involves the transport of small liquid volumes through channels having small dimensions, such as millimeters or less. Liquid actuation through microfluidics may offer cheaper overhead experimental costs, enable high throughput experiments, and/or provide more sensitive detection due to tighter confinement of target molecules to a sensing surface or more precise positioning of liquid volume and chemical reactions. Microfluidics may be used in, for example, Lab-on-a-chip (LOC) or Micro Total Analysis Systems (μTAS) systems that reduce laboratory protocols onto a single, portable chip.

Microfluidic systems may use various components, such as pumps, valves, tubing, and microfabricated rigid channels, that inherently possess limitations. For example, components of mechanical actuation systems, such as pumps and valves, may be rigid, may use moving parts, may maintain constant pressure gradients and tight seals, and may be complex and intricate to assemble, which may increase the price of fabrication, the number of surfaces to be kept sanitized, and the chance for device failure. Further, vast tubing networks and empty "dead" space involved with pumps and valves may result in significant wasted sample volume and may act as a source for microbubbles to form and obstruct flow or device operation.

SUMMARY

This disclosure describes examples microfluidic devices capable of transporting small fluid drops using low voltage. Example microfluidic devices described herein include a bottom electrode, one or more top electrodes, and a dielectric layer separating the bottom electrode from the top electrodes. Rather than form a flat microchannel surface using coplanar electrodes, each top electrode has a sidewall that forms a sidewall angle with the bottom electrode that is less than 180 degrees, thus defining an open nonplanar microchannel region for transporting a fluid. This sidewall angle reduces a surface tension of the microchannel and enables mobility of the microchannel using smaller microchannels and/or lower voltages than microfluidic devices using coplanar electrodes. Further, the reduced sidewall angle enables actuation for both extremes of liquid conductivity due to two modalities driving both benefitting from the geometrical design. In this way, microfluidic devices discussed herein may be implemented on relatively low powered microchips or actuated using wireless signals.

In one example, a system includes a bottom electrode, a dielectric layer on the bottom electrode and defining a plane, and one or more top electrodes on a region of the dielectric layer. Each of the one or more top electrodes has a sidewall that forms a sidewall angle with the plane of the dielectric layer less than 180 degrees. The sidewall of each of the one or more top electrodes and a portion of the dielectric layer proximate to the sidewall define a microchannel for transporting a fluid.

In another example, a system includes a microchip and an inductor. The microchip includes a bottom electrode, a dielectric layer on the bottom electrode and defining a plane, and one or more top electrodes on a region of the dielectric layer. Each of the one or more top electrodes has a sidewall that forms a sidewall angle with the plane of the dielectric layer less than 180 degrees. The sidewall of each of the one or more top electrodes and a portion of the dielectric layer proximate to the sidewall define a microchannel for transporting a fluid. The inductor is electrically coupled to at least one of the bottom electrode or the one or more top electrodes.

In one example, a method for fabricating a system includes depositing a dielectric layer on a bottom electrode in which the dielectric layer defines a plane. The method further includes depositing a top conductive layer on a region of the dielectric layer to form one or more top electrodes. Each of the one or more top electrodes has a sidewall that forms a sidewall angle with the plane of the dielectric layer less than 180 degrees. The sidewall of each of the one or more top electrodes and a portion of the dielectric layer proximate to the sidewall define a microchannel for transporting a fluid.

In one example, a microfluidic device includes a substrate and one or more electrode sections. Each electrode section includes a first electrode and a second electrode on the substrate and a dielectric layer on the first electrode and the second electrode. The first electrode and the second electrode are separated by a gap. A sidewall of the first electrode and a sidewall of the second electrode form an apex angle that is less than about 180 degrees. The sidewalls of the first electrode and the second electrode define a microchannel region for transporting a microchannel of a fluid.

In one example, a microfluidic system includes a microchip and an inductor. The microchip includes a substrate and one or more electrode sections. Each electrode section includes a first electrode and a second electrode on the substrate and a dielectric layer on the first electrode and the second electrode. The first electrode and the second electrode are separated by a gap. A sidewall of the first electrode and a sidewall of the second electrode form an apex angle that is less than about 180 degrees. The sidewalk of the first electrode and the second electrode define a microchannel region for transporting a microchannel of a fluid. The inductor is electrically coupled to at least one of the first electrode or the second electrode.

In one example, a method includes etching a support layer on a substrate to form a first support layer and a second support layer and depositing a conductive layer on the first support layer and the second support layer to form a first electrode and a second electrode. The first and second electrodes are separated by a gap. A sidewall of the first electrode and a sidewall of the second electrode form an apex angle that is less than about 180 degrees. The sidewalk of the first electrode and the second electrode define a microchannel region for transporting a microchannel of a fluid.

In one example, a method for manipulating a fluid includes generating, by a microfluidic device, an electric field in a microchannel region in response to receiving a voltage. The microfluidic device includes a substrate and one or more electrode sections. Each electrode section includes a first electrode and a second electrode on the substrate and a dielectric layer on the first electrode and the second electrode. The first and second electrodes are separated by a gap. A sidewall of the first electrode and a sidewall of the second electrode form an apex angle that is less than about 180 degrees. The sidewalls of the first electrode and the second electrode define the microchannel region for transporting a microchannel of the fluid.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 18F is a side view cross-sectional conceptual and schematic diagram illustrating example operation of a device.

DETAILED DESCRIPTION

Figure 1A:
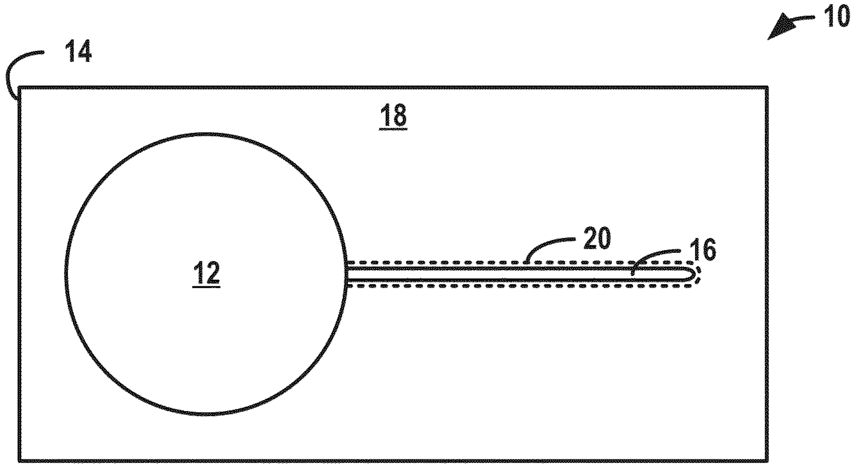
FIG. 1A is a top view conceptual and schematic diagram illustrating an example device for electronically manipulating liquid using a low voltage.

This disclosure describes example microfluidic devices capable of transporting open microchannels of a fluid using low voltage. Example microfluidic devices described herein include two non-planar, separated electrodes that define a microchannel region for transporting a microchannel of a fluid. Some example microfluidic devices described herein include a bottom electrode, one or more top electrodes, and a dielectric layer separating the bottom electrode from the top electrodes. The top and bottom electrodes define a microchannel region for transporting a microchannel of a fluid. Other example microfluidic devices described herein include a first electrode, a second electrode, and a gap separating the first and second electrodes. The first and second electrodes define a microchannel region for transporting a microchannel of a fluid. The microfluidic devices may be configured to generate a voltage difference between the bottom electrode and the top electrode or first and second electrodes to transport the microchannel along the microchannel region.

The voltage difference to transport the fluid as a microchannel may be related to the surface tension of the fluid in the microchannel. As a cross-section of the microchannel decreases in size, the surface tension associated with the microchannel increases, which may require an increase in the voltage difference between electrodes to generate electric fields sufficient to overcome the increase in surface tension. For example, a device using two coplanar electrodes may generate strong electric fields between the coplanar electrodes to create a local pressure difference across a leading edge of a microchannel positioned above the coplanar electrodes, such that the internal pressure of the microchannel can push fluid out of the confined region of the microchannel. To overcome surface tension of very small microchannels, the coplanar electrodes may generate very high operating voltages, such as greater than 50 Vrms. Additionally, a fluid of the microchannel may include free charges in solution that may inhibit movement of the microchannel, such that even higher voltages may be used to overcome electrostatic forces of the free charges.

As discussed herein, example microfluidic devices may be configured to reduce a surface tension of a microchannel and/or increase a differential pressure within a microchannel using nonplanar surfaces to enable low voltage transport of fluid. In some examples, each discrete top electrode is separated from the bottom electrode by a thin dielectric layer and includes a sidewall that, along with an adjacent outer surface of the dielectric layer, defines a microchannel region for a microchannel. The sidewall forms a sidewall angle with the outer surface of the dielectric layer that is less than 180 degrees. In other examples, a first and second electrode are separated by a V-shaped gap and include sidewalls that defines a microchannel region for a microchannel. The sidewalls of the first and second electrodes form apex angles with an underlying substrate that are less than 180 degrees.

The various sidewall angles described above reduce a surface tension of the microchannel and concentrate an electric field in the microchannel region. For example, the nonplanar surfaces may break surface tension forces by a factor of greater than 3 and simultaneously further confines the electric field by a factor of 4 compared to nonplanar electrode configurations. This may enable mobility of a leading edge of the microchannel using lower voltages than microfluidic devices using coplanar electrodes to define a microchannel region. The microfluidic devices may be manufactured using relatively inexpensive and/or precise planar deposition methods.

In this way, systems using microfluidic devices described herein may operate using lower voltages and/or enable smaller microchannels than coplanar electrode configurations. Additionally or alternatively, such microfluidic devices may enable open-channel fluidics, thereby reducing or removing dependence on external pumps or tubing. Microfluidic devices configured in this way may manipulate relatively small microchannels (e.g., microchannels less than 5 μm in width) for both ionic and dielectric liquids using relatively low voltages, such as less than 5 volts. For example, a combined 12-fold improvement described above may enable 10 nm separation between electrodes, thus enabling lower voltage liquid dielectrophoresis (DEP) actuation, such as 4.5 volts for deionized liquid and 2 volts for high ionic solutions. In some examples, microfluidic devices may include a relatively inexpensive resonant tank circuit to further reduce operating voltage to very low values, such as less than 2 volts, and/or increase a frequency of operation, such as greater than 200 kHz, to further reduce hydrolysis. Likewise, inductive coupling may be used to wirelessly transport power to the electrodes and offer microfluidic actuation without wires. In this way, a wire-free, tube-free microfluidic system could be realized. In some instances, example microfluidic devices having angled microchannel regions may perform self-filtering of large impurities by blocking impurities from entering the microchannels regions and impeding flow, resulting in more robust operation.

FIG. 1A is a top view diagram illustrating an example device 10 for electronically manipulating a liquid. Device 10 includes a fluidic reservoir 12, a bottom electrode 14, a top electrode 16, and a dielectric layer 18 separating bottom electrode 14 and top electrode 16. Top electrode 16 and bottom electrode 14 define a microchannel region 20 for forming an open microchannel of a fluid. Fluidic reservoir 12 is fluidically coupled to microchannel region 20, such that a fluid stored in fluidic reservoir 12 may travel through microchannel region 20 as a microchannel. Microchannel region 20 may represent a region for a microchannel of fluid to form. In some examples, microchannel region 20 may correspond to microchannels having a size less than about one millimeter, such as less than about 1 micrometer.

Device 10 may be configured to generate a voltage difference between bottom electrode 14 and top electrode 16 to transport a microchannel of fluid along microchannel region 20. When device 10 is not generating a voltage difference between bottom electrode 14 and top electrode 16 (e.g., microchannel region 20 is "off"), movement of a leading edge (e.g., "contact line") of the microchannel due to capillary forces may be limited by a first surface tension of the microchannel. However, when device 10 is generating a voltage difference between bottom electrode 14 and top electrode 16 (e.g., microchannel region 20 is "on"), the voltage difference may generate electric fields near the leading edge of the microchannel that reduce the surface tension of the microchannel to a lower second surface tension. The voltage difference may reduce a static contact angle that corresponds to an interfacial energy of the fluid drop. Reducing the static contact angle reduces a corresponding resistance to movement, such that the leading edge of the microchannel may continue to move along microchannel region 20 from capillary effects until equilibrium with the second, lower surface tension or the voltage difference is removed. In this way, device 10 may selectively generate the microchannel of fluid along microchannel region 20. For example, device 10 may manipulate the microchannel of fluid at various volumes, velocities or flow rates, cross-sectional areas, and the like based on a presence and/or magnitude of the voltage difference. Device 10 may be configured to provide other operations involving movement of the microchannel along microchannel region 20, such as mixing the microchannel with other microchannels, splitting the microchannel into two microchannels, and the like.

Device 10 may be used in a variety of applications including, but not limited to, microscopy, spectroscopy, electrochemical, electrochemiluminescence, amperometry, impedimetry, display systems, tunable optics, particle size separation, microgravity fluidic studies, microfabrication techniques, and the like, in fields such as food safety, environmental monitoring of toxicity, criminology and drug detection, clinical diagnostics, enzyme synthesis, and proteomics. For example, device 10 may be capable of generating very small volumes, such that any application that involves moving relatively small volumes of fluid may utilize device 10. In some examples, device 10 may be used for biochemical sensing applications. For example, device 10 may control microchannels of fluid to deliver precise amounts of a fluid. In some examples, device 10 may be used for display components, such as tunable optics. For example, device 10 may control an amount of fluid corresponding to a particular refractive index or optical power. In some examples, device 10 may be used for particle analysis. For example, device 10 may control a volume of fluid to precisely move particles in microchannels for accurate positioning and/or localized chemical reactions. In some examples, device 10 may be used to filter particles. For example, device 10 may use negative dielectrophoresis to remove unwanted particles or films from the sensor surface.

In some examples, device 10 may be used in low voltage applications. For example, device 10 may be capable of generating microchannels of fluid using low voltages, such that any application that involves moving relatively small volumes using low power may utilize device 10. In some examples, device 10 may be powered by a low voltage computer circuit, such as circuits operating at 3.3 V or 5.0 V. For example, device 10 may generate microchannels of a fluid using very low voltage differences found in conventional computer circuits, thus eliminating a transformer or other energy conversion device and/or reducing a power consumed by device 10. In some examples, device 10 may be powered by a mobile device. For example, as will be explained in FIG. 4B, device 10 may be coupled to an inductor capable of generating a voltage difference in response to a wireless signal, such that device 10 may be used without a wired power supply.

Figure 1B:
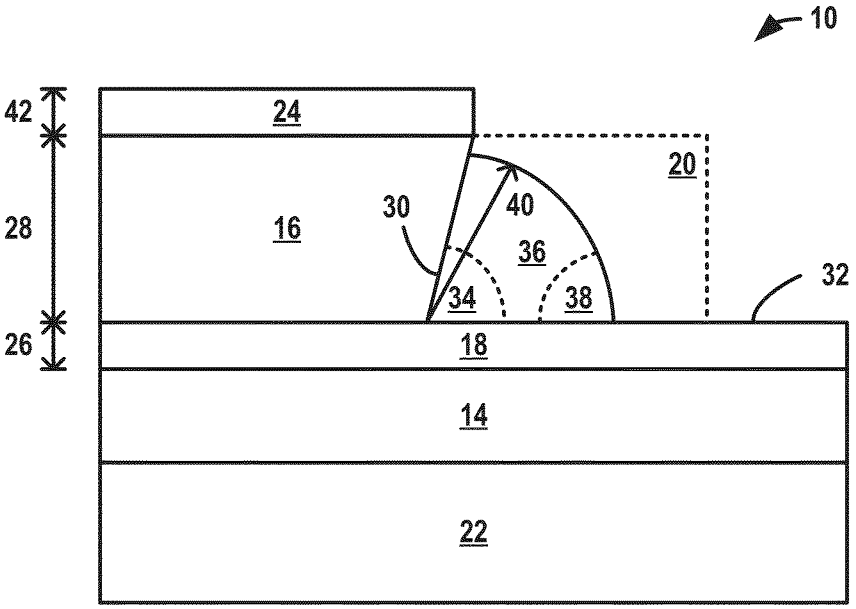
FIG. 1B is a side view cross-sectional conceptual and schematic diagram illustrating the example device of FIG. 1A.

FIG. 1B is a side view cross-sectional conceptual and schematic diagram illustrating the example device 10 of FIG. 1A. Device 10 includes a substrate 22, bottom electrode 14 on substrate 22, dielectric layer 18 on bottom electrode 14, top electrode 16 on a region of dielectric layer 18, and passivation layer 24 on top electrode 16. Substrate 22 may be formed from any suitable material including, but not limited to, silicon, polymers, and the like.

Dielectric layer 18 is configured to electrically separate bottom electrode 14 and top electrode 16. Dielectric layer 18 may be formed from an electrically insulating dielectric material including, but not limited to, aluminum oxide, titanium oxide, and the like. Dielectric layer 18 may be selected for a variety of properties including, but not limited to, a high dielectric constant, a high stress or strain, a low reactivity (high inertness), or the like. In some examples, dielectric layer 18 may have a relatively high relative dielectric permittivity, such as greater than about 5.

In some examples, dielectric layer 18 may be a relatively thin layer. For example, while not being limited to any particular theory, electrical generation of a local pressure differential across a leading edge of microchannel 36 by bottom electrode 14 and top electrode 16 may be represented by Equation 1 below:

$$\Delta p_D = \frac{1}{2}(\varepsilon_L - \varepsilon_{air})E_t^2 \quad \text{(Equation 1)}$$

In the above Equation 1, $\Delta p_D$ is a local pressure difference across microchannel 36 and a surrounding environment, $E_t$ is the magnitude of an electric field generated by bottom electrode 14 and top electrode 16 that is tangential to a surface of microchannel 36, and $\varepsilon_L$ and $\varepsilon_{air}$ the dielectric constants of the liquid of microchannel 36 and the surrounding environment (e.g., air), respectively. If the electric field generated by bottom electrode 14 and top electrode 16 is confined to a local region with enough strength to overcome surface tension of microchannel 36, the pressure difference will create a microchannel of liquid with a cross-section defined by the electric field lines. By decreasing a thickness 26 of dielectric layer 18, and thus the spacing between bottom electrode 14 and top electrode 16, stronger electric fields can be generated in microchannel region 20 at lower threshold voltages. In some examples, thickness 26 of dielectric layer 18 is less than about 50 nanometers in the region of dielectric layer 18 between bottom electrode 14 and top electrode 16, such as between about 10 nanometers and about 20 nanometers.

Each of bottom electrode 14 and top electrode 16 may be formed from a conductive material including, but not limited to: metals, such as platinum, silver, copper, gold, aluminum, lithium, or nickel; nonmetals, such as grapheme; polymers, such as conductive polymers; ceramics, such as indium tin oxide; semiconductors; and the like. In some examples, bottom electrode 14 and/or top electrode 16 may be formed from a material having a relatively low stress after deposition. For example, top electrode 16 may be subject to higher stresses due to the various layers on top electrode 16, such that a lower stress material, such as aluminum, may be particularly suitable for top electrode 16. In some examples, bottom electrode 14 and top electrode 16 include a same composition, while in other examples, bottom electrode 14 and top electrode 16 may include different compositions. In some examples, thickness 28 of top electrode 16 is less than about five micrometers. Thickness 28 of top electrode 16 may be selected based on a variety of factors including, but not limited to, a desired volume or size of microchannel 36, a heat capacity of fluid in microchannel 36, and the like. For example, as will be described below, a sidewall 30 of top electrode 16 defines an edge of microchannel 36, such that a size or volume of microchannel 36 may be limited by a radius of microchannel 36 corresponding to sidewall 30. In some examples, thickness 28 of top electrode 16 may be selected to enable microchannel 36 to have a volume or size that corresponds to a volumetric flow or flow rate. A larger size of microchannel 36 may increase a volume to surface ration of microchannel 36, which may reduce resistance to liquid flow and enable higher flow rates. As another example, thickness 28 of top electrode 16 may be selected to enable microchannel 36 to have a volume or size that limits a change in volume of microchannel 36 due to evaporation. For example, microchannel 36 having a small size or volume may lose volume due to heating from sidewall 30. In some examples, thickness 28 may be selected to reduce a stress of top electrode 16. For example, thicker top electrodes 16 may have a higher stress, which may result in an unstable top electrode 16.

In some examples, bottom electrode 14, top electrode 16, and/or dielectric layer 18 may be formed from materials suitable for sputtering, vapor, or atomic layer deposition. For example, as will be explained in FIGS. 2A-2F and FIG. 3 below, device 10 may be formed using planar deposition techniques, such that thin layers may be produced relatively simply.

Dielectric layer 18 may define an outer surface 32. At least a portion of outer surface 32 may be configured to interface with a microchannel 36 in microchannel region 20. In some examples, outer surface 32 may have various surface properties, such as roughness, charge, friction factor, and the like, which may reduce a surface tension of microchannel 36. In some examples, dielectric layer 18 includes a passivation layer, such as passivation layer 24, configured to reduce surface tension of microchannel 36.

Top electrode 16 includes at least one sidewall 30. Sidewall 30 may be configured to form a lateral boundary of a microchannel 36 in microchannel region 20. While illustrated in FIG. 1B as a flat surface, sidewall 30 may include a curved or multiplanar surface. Sidewall 30 of top electrode 16 and a portion of outer surface 32 of dielectric layer 18 adjacent to the sidewall define the microchannel region for transporting a microchannel of a fluid. As explained above, the voltage difference to transport the fluid as microchannel 36 may be related to the surface tension of the fluid in microchannel 36. Rather than simply overcoming the surface tension with a higher voltage difference, device 10 may overcome surface tension of small microchannels by creating nonplanar geometries of microchannels based on a shape of microchannel region 20. In the example of FIG. 1B, microchannel 36 is positioned in microchannel region 20. An outer surface of microchannel 36 interfaces with an environment. The outer surface forms a contact angle 38 with dielectric layer 18. This contact angle may be related to a surface tension of microchannel 36. Microchannel 36 has a radius 40 that may correspond to a width of microchannel 36. In some examples, radius 40 may be less than about one millimeter, such as less than about one micrometer.

Sidewall 30 forms a sidewall angle 34 with an outer surface 32 of dielectric layer 18. Sidewall angle 34 is less than 180 degrees to reduce surface tension of microchannel 36 compared to planar electrode configurations. For example, in a coplanar electrode configuration having a semicircle microchannel cross-section, a length of the microchannel depends on a balance between the opposing surface tension forces across the leading edge of the microchannel. As a gap between planar electrodes, and thus microchannel dimensions, is further reduced, surface tension forces grow rapidly in opposition. Eventually the voltage difference across the planar electrodes required to create a microchannel may exceed the dielectric breakdown of the dielectric material between the coplanar electrodes, thus limiting a size of microchannels.

A nonplanar geometry of microchannel region 20, and thus a nonplanar geometry microchannel 36, may reduce surface tension of microchannel 36 and enable a smaller size of microchannel 36 and/or a lower voltage difference for a similar size microchannel 36 as a coplanar electrode configuration. For example, without being limited to a particular theory, when microchannel 36 is at equilibrium, movement of the leading edge of microchannel 36 may correspond to an energy cost to add new interfaces as microchannel 36 forms. A pressure difference, p, between fluidic reservoir 12 and leading edge of microchannel 36 is initially at equilibrium and represents the dielectrophoretic pressure term, $\Delta P_D$, as previously shown in Equation 1. A microchannel having a circular sector cross-section, with a radius, R, (e.g., radius 40) and sector angle, α, (e.g. sidewall angle 34) may be represented by Equation 2 below for a non-conductive or low-ionic liquid:

$$E_t^2 \geq \frac{4\gamma(\alpha - \cos(\theta))}{\alpha R(\varepsilon_L - \varepsilon_{air})} \quad \text{(Equation 2)}$$

In the above Equation 2, θ is a Young's static contact angle 38 formed by microchannel 36 and dielectric layer 18 (and/or top electrode 16), and γ is the surface tension of microchannel 36 with a surrounding environment (e.g., air). By reducing contact angle 34, an electric field $E_t$ to move microchannel 36, and thus a voltage difference across bottom electrode 14 and top electrode 16, may be decreased and/or a size (e.g., radius R) of microchannel 36 may be reduced. For example, an electric field $E_t$ to overcome surface tension may be reduced by reducing sidewall angle 34. By reducing sidewall angle 34, and thus surface tension, a voltage difference to generate an electric field to induce flow may be reduced.

Additionally or alternatively, by further reducing sidewall angle 34, an electric field generated for a particular voltage difference between bottom electrode 14 and top electrode may be further increased. For example, a sidewall angle 34 less than 180 degrees may increase confinement of electric fringe fields generated by the voltage difference between bottom electrode 14 and top electrode 16. This confinement may result in a higher electric field strength for a particular voltage difference in the nonplanar configuration of bottom electrode 14 and top electrode 16 than a same voltage difference in the coplanar electrode configuration. In some examples, sidewall angle 34 may be between about 70 degrees and about 90 degrees. Sidewall angle 34 may be selected based on a variety of factors including, but not limited to, manufacturability of sidewall 30 and/or top electrode 16, control of flow of microchannel 36, visibility of microchannel 36, and the like.

For example, regarding manufacturability, sidewall angle 34 larger than 90 degrees may be easier to fabricate but may result in higher threshold voltages. Sidewall angle 34 less than 50-60 may be more difficult to fabricate but may offer lower operating voltages. More complex shapes of top electrode 16 and/or sidewall 30 may be more difficult to fabricate, such as curved top electrodes 16. Additionally, selection of materials used for top electrode 16 and dielectric layer 18 may affect sidewall angle 34. For instance, if a contact angle for top electrode 16 and/or dielectric layer 18 are low due to a hydrophobic surface or surfaces, a smaller alpha will be needed to maintain 5 volt operation. A user may want to use more hydrophobic materials to reduce friction and thus improve flow rates. This may come at a cost of smaller sidewall angles 34 or higher voltage between bottom electrode 14 and top electrode 16. Depending on a viable operating voltage for a particular application, a larger sidewall angle 34 may be used.

As another example, with regard to control of microfluidic flow, for a particular contact angle and/or surface tension of a liquid, there may be an angle alpha what will trigger spontaneous capillary flow, as explained below with respect to a Concuss-Finn limit. In such case, a user may not have control over initiation or cessation of flow. As such, sidewall angle 34 may be configured to better control the initiation or cessation of flow within desired flow conditions, such as microchannel size/volume or flow rate.

As another example, with regard to visibility of microchannel 36, when imaging microchannel 36 or particles from a top-view, larger sidewall angles 34 (e.g., greater than 90 degrees) may be desirable. However, if bottom electrode 14 is made transparent (ITO, graphene, very thin metals), imaging may be achieved from the bottom side through bottom electrode 14).

In some examples, device 10 may be configured to transport microchannel 36 having a conductive fluid. For example, without being bound to any particular theory, for a conductive system in which electric body forces across a microchannel are zero, a new effective contact angle θ* that results after applying a potential V, depends on the initial Young's contact angle 38 with the substrate (i.e., dielectric layer 18), $\theta_0$, and the permittivity of dielectric layer 18, $\varepsilon_t$, that separates microchannel 36 from bottom electrode 14 with thickness 26, t. Using the Lippmann equation and a sector circle channel geometry, a threshold voltage for a conductive liquid may be shown in Equation 3 below:

$$V^2 \geq \frac{\gamma t(\alpha - \cos(\theta_0))}{\varepsilon_t} \quad \text{(Equation 3)}$$

Contact angle may represent a surface tension of the liquid with a surface of device 10, such as dielectric layer 18, sidewall 30, and/or passivation layer 24. The contact angle of the liquid with the particular surface may be configured for various properties of device 10. The contact angle may be decreased as voltage is increased, as the voltage may reduce the surface tension the liquid makes with the surface. The contact angle may be a more significant contributor of microchannel formation and flow for conductive liquids and a less significant contributor of microchannel formation and flow for dielectric liquids, where body-force pressures may initiate flow. The contact angle may be chosen based on various applications and flow conditions, and relates to sidewall angle 34 through the Concuss-Finn limit described below. A contact angle close to the Concuss-Finn limit may allow for low voltage activation of flow. However, if a contact angle is too low that it exceeds the limit, then spontaneous capillary flow may occur, and a user may have reduced or no control of microchannel 36.

In these various ways, reducing sidewall angle 34 and/or reducing thickness 26 may reduce threshold voltage. In some examples, a voltage may be tuned based on sidewall angle 34, thickness 28 of top electrode 16, contact angle 38, and other factors. For example, reduced sidewall angle 34 may reduce surface tension opposing the channel formation. Such reduction may be especially advantageous within the conductive liquid regime where small ∝ angles result in lower switching voltages to meet the CF limit for spontaneous capillary action and generate flow. A smaller sidewall angle 34 may better confine electric fringe fields. Such confinement may be especially advantageous for dielectric solutions where body-forces depend on large fields which can be generated at lower voltages when better confined. The combination of a small thickness 26 of dielectric layer 18 (e.g., a nanometer gap) and a sidewall angle 34 less than 180 degrees stacked sidewall channel) may enable very low-volt operation that can generate microchannels of fluid flow in both the dielectric and conductive liquid regimes.

Figure 13A:
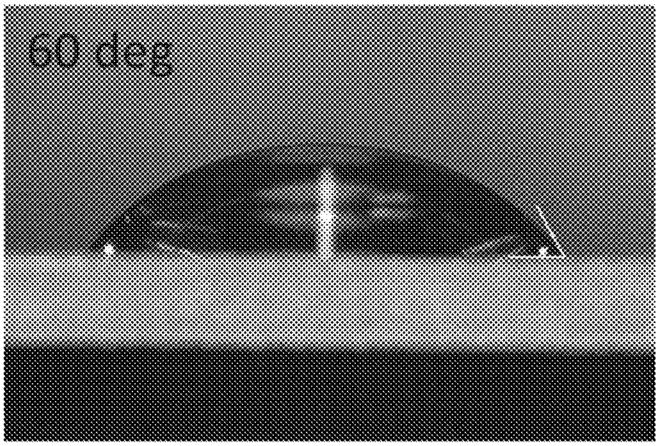
FIG. 13A is an image of a drop on the passivation layer prior to UV treatment.
Figure 13B:
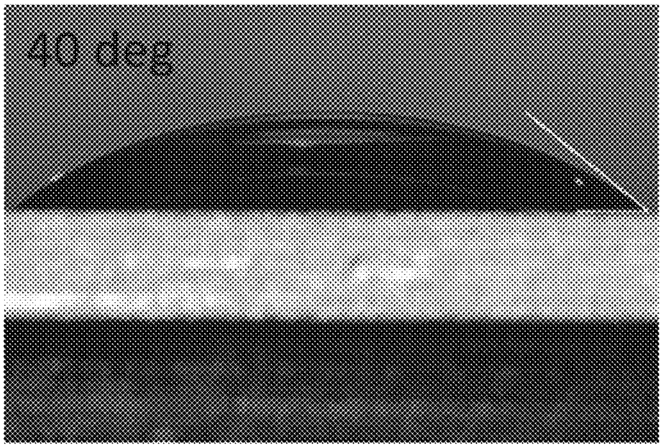
FIG. 13B is an image of the drop on the passivation layer after 30 seconds of UV treatment.
Figure 13C:
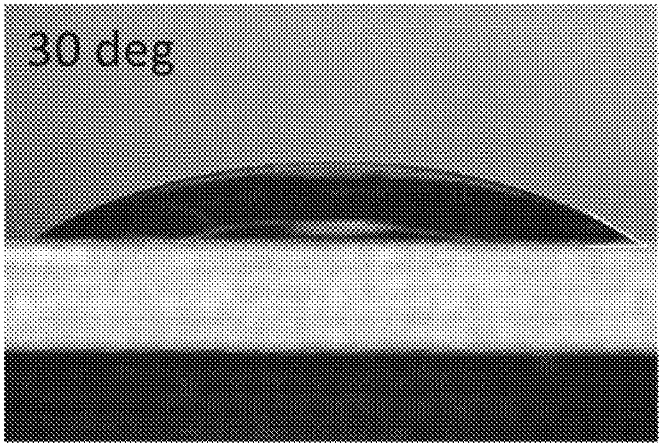
FIG. 13C is an image of the drop on the passivation layer after 10 minutes of UV treatment.

Passivation layer 24 may be configured to provide a protection layer for one or more surfaces of top electrode 16. In the example of FIG. 1B, passivation layer 24 is shown on a top surface of top electrode 16; however, in other examples, passivation layer 24 may extend to other portions of device 10, such as sidewall 30 of top electrode 16 or outer surface 32 of dielectric layer 18. For example, dielectric layer 18 may include a passivation layer to decrease surface tension of microchannel 36 on dielectric layer 18. Passivation layer 24 may be formed from a minimally reactive material including, but not limited to, titanium oxide, aluminum oxide, and the like. In some examples, passivation layer 24 may form a contact angle capable of being controlled by UV exposure. For example, as illustrated in FIGS. 13A-13C, UV treatment of a passivation layer, such as a titanium oxide layer, on dielectric layer 18 may reduce a contact angle, and thus surface tension, of microchannel 36.

In some examples, passivation layer 24 may have a thickness 42 less than about 5 nanometers.

Passivation layer 24 may be a layer or coating with a specific contact angle (theta) that may be coated over some or all of device 10 to further configure a contact angle (or surface tension the liquid has with the device) depending on a desired operation. Passivation layer 24 may include dielectric layers, self-assembled layer, and the like. This could be dielectric films, or even self-assembled monolayers of molecules.

In some examples, passivation layer 24 is a hydrophobic passivation layer having a large contact angle and/or large surface tension with sidewall 30 and/or dielectric layer 18. A hydrophobic passivation layer 24 (i.e. large contact angle or large surface tension with the device top electrodes and dielectric film) may enable faster flow rates. In some examples, passivation layer 24 is a hydrophilic passivation layer having a small contact angle or small surface tension with sidewall 30 and/or dielectric layer 18. A hydrophilic passivation layer 24 may enable lower voltages and/or larger sidewall angles 34, as will be described below.

Passivation layer can be selected using a variety of factors and/or configured in a variety of ways. In some examples, passivation layer 24 may be a photo-sensitive material, such as titanium oxide, that has a hydrophobicity responsive to UV light. In such examples, the hydrophilicity of passivation layer 24 may be configured using UV light to increase hydrophilicity. In some examples, passivation layer 24 may be exposed/treated with ozone to clean surfaces of passivation layer 24 and make the surfaces more hydrophilic. In some examples, passivation layer 24 may be fabricated using self-assembled monolayers of molecules that may change a contact angle/surface tension that the liquid makes with device.

Figure 2A:
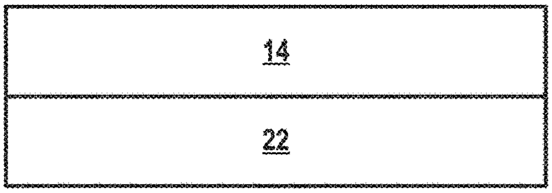
FIG. 2A is a side view cross-sectional conceptual and schematic diagram illustrating an example deposition of a bottom electrode on a substrate.
Figure 2B:
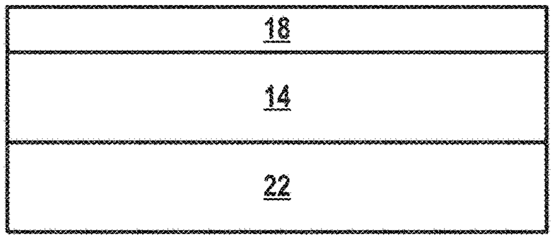
FIG. 2B is a side view cross-sectional conceptual and schematic diagram illustrating an example deposition of a dielectric layer on the bottom electrode of FIG. 2A.
Figure 2C:
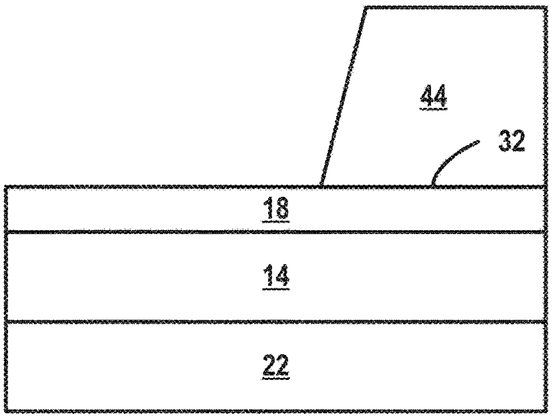
FIG. 2C is a side view cross-sectional conceptual and schematic diagram illustrating an example deposition of a pattern layer on the dielectric layer of FIG. 2B.
Figure 2D:
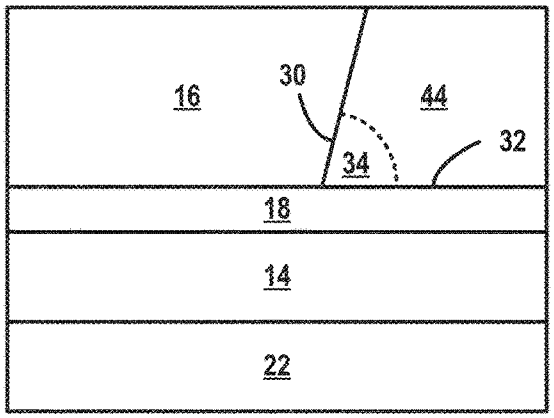
FIG. 2D is a side view cross-sectional conceptual and schematic diagram illustrating an example deposition of a top electrode on the dielectric layer of FIG. 2C.
Figure 2E:
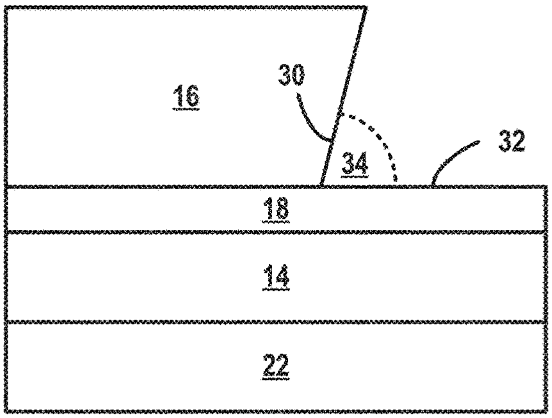
FIG. 2E is a side view cross-sectional conceptual and schematic diagram illustrating an example removal of the pattern layer on the dielectric layer of FIG. 2D.
Figure 2F:
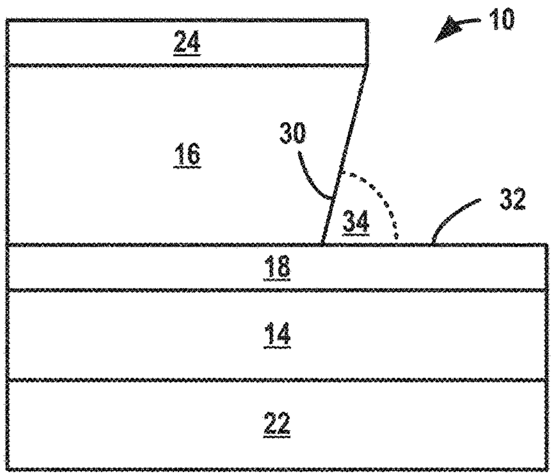
FIG. 2F is a side view cross-sectional conceptual and schematic diagram illustrating an example deposition of a passivation layer on the top electrode of FIG. 2E.
Figure 3:
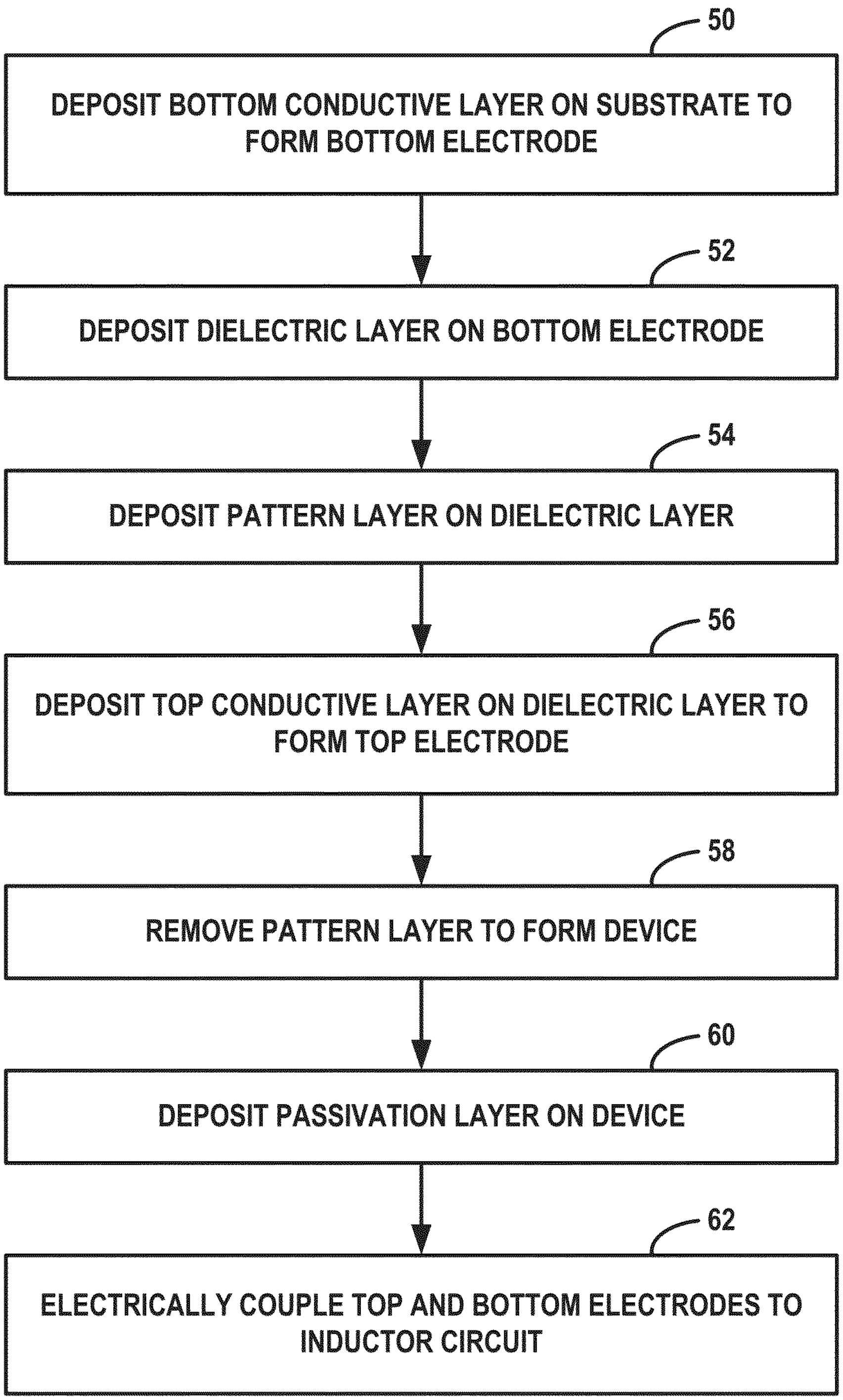
FIG. 3 is a flow diagram illustrating an example technique for manufacturing a system for electronically manipulating a fluid.

FIGS. 2A-2F illustrate various configurations for microfluidic device 10 of FIG. 1B. FIG. 3 is a flow diagram illustrating an example technique for manufacturing a microfluidic device. The techniques of FIG. 3 will be described with reference to FIGS. 2A-2F, however, it will be understood that the method illustrated in FIG. 3 may be used to form other microfluidic devices having other configurations, and that the microfluidic device of FIGS. 2A-2F may be formed using other techniques.

In some examples, the technique of FIG. 3 may include depositing a bottom conductive layer on substrate 22 to form bottom electrode 14 (50). FIG. 2A is a side view cross-sectional conceptual and schematic diagram illustrating deposition of a bottom electrode on substrate. The bottom conductive layer may be deposited onto substrate 22 using a variety of techniques including, but not limited to, evaporation, sputtering, 2D material transfer of graphene and the like. In some examples, the technique of FIG. 3 include patterning the bottom conductive layer to form bottom electrode 14. For example, subtractive techniques, such as lift-off, dry etching, or wet etching, may be used to create a region on substrate 22 that is void of the bottom conductive layer. This region may prevent punch through when making electrical contact with top electrode 16 of device 10.

The technique of FIG. 3 includes depositing dielectric layer 18 on bottom electrode 14 (52). FIG. 2B is a side view cross-sectional conceptual and schematic diagram illustrating deposition of dielectric layer 18 on bottom electrode 14 of FIG. 2A. Dielectric layer 18 may be deposited onto bottom electrode 14 using a variety of techniques including, but not limited to, atomic layer deposition, plasma enhanced atomic layer deposition, and the like, such that dielectric layer 18 has a low thickness. For example, dielectric layer 18 may be deposited to have thickness 26 less than about 50 nanometers in the region of dielectric layer 18 between bottom electrode 14 and top electrode 16. While shown as deposited on an entire surface of bottom electrode 14, dielectric layer 18 may be deposited on only a portion of bottom electrode 14.

In some examples, dielectric layer 18 may include more than one layer. For example, a first dielectric layer may be used to form dielectric layer 18 which forms a gap between bottom electrode 14 and top electrode 16, while a second dielectric layer may be used along the region on substrate 22 that is void of the bottom conductive layer. In this example, a first dielectric layer may be deposited to a first thickness, such as less than 20 nm, using a first deposition technique, such as atomic layer deposition. A second dielectric layer may be deposited to a second thickness, such as less than 100 nm and/or less than 200 nm, using a second deposition technique, such as sputtering, and patterned using lift-off. The second dielectric layer may be aligned over an edge of the region of substrate 22 void of the bottom conductive layer to prevent possible locations of punch through and shorting through the first dielectric layer.

The techniques of FIG. 3 include forming top electrode 16 on dielectric layer 18. While FIGS. 2C-2E will be described with respect to patterning atop conductive layer into top electrode 16 using a pattern layer 44, in other examples, other patterning techniques may be used, such as reactive ion etching, ion milling, or wet etching. For example, these patterning techniques may be used to create a particular sidewall angle for top electrode 16, as will be described below.

In some examples, the technique of FIG. 3 may include depositing pattern layer 44 onto a negative region of dielectric layer 18 to pattern top electrode 16 (54). This negative region may be different from the one or more region of dielectric layer 18 on which the top conductive layer is to be deposited. FIG. 2C is a side view cross-sectional conceptual and schematic diagram illustrating deposition of pattern layer 44 on dielectric layer 18 of FIG. 2B. In some examples, pattern layer 44 may be further processed to form a particular sidewall angle between dielectric layer 18 and sidewall 30 of top electrode 16. For example, pattern layer 44 may be a photoresist layer. The photoresist layer may be formed to have a particular sidewall that compliments a desired sidewall of top electrode 16. By using pattern layer 44, sidewall angles less than 90 degrees may be more easily formed than subtractive patterning processes for forming particular sidewall angles in top electrode 16. For example, using pattern layer 44 prior to depositing the top conductive layer, the resulting sidewall angle of top electrode 16 may be between about 70 degrees and about 90 degrees.

The technique of FIG. 3 includes depositing a top conductive layer on one or more regions of dielectric layer 18 to form one or more top electrodes 16 (56). FIG. 2D is a side view cross-sectional conceptual and schematic diagram illustrating deposition of a top electrode on the dielectric layer of FIG. 2C. The top conductive layer may be deposited onto dielectric layer 18 using a variety of techniques including, but not limited to, evaporation for lift-off-based patterning or sputtering, and the like. In some examples, rather than patterning sidewall 30 into top electrode 16 using lift-off of pattern layer 44, other patterning techniques may be used, such as reactive ion etching, ion milling, or wet etching. For example, a subtractive technique may be used to remove portions of the top conductive layer to form sidewall 30 having a desired sidewall angle 34. As a result of the patterning of the top conductive layer, each of the one or more top electrodes 16 has sidewall 30 that forms sidewall angle 34 with outer surface 32 of dielectric layer 18 that is less than 180 degrees. In some examples, thickness 28 of top electrode 16 is less than about five micrometers, such as between about 100 nm and about 1 micrometer.

In some examples, the technique of FIG. 3 may include removing pattern layer 44 from dielectric layer 18 after depositing the top conductive layer to form top electrode 16 (58). FIG. 2E is a side view cross-sectional conceptual and schematic diagram illustrating removal of pattern layer 44 from dielectric layer 18 of FIG. 21). As a result, sidewall 30 of each of the one or more top electrodes 14 and a portion of outer surface 32 of dielectric layer 18 adjacent to sidewall 30 define a microchannel region for transporting a microchannel of a fluid.

In some examples, the technique of FIG. 3 may include depositing a passivation layer on device 10 (60). FIG. 2F is a side view cross-sectional conceptual and schematic diagram illustrating deposition of a passivation layer on the top electrode of FIG. 2E. While shown on top electrode 16, passivation layer 24 may be deposited on other parts of device 10, such as dielectric layer 18. In some examples, thickness 42 of passivation layer 24 may be less than about 10 nanometers.

In some examples, the technique of FIG. 3 may include electrically coupling top electrode 16 and bottom electrode 14 to an inductor circuit (62). For example, microfluidic devices described herein may be integrated with low voltage circuits that may enable various microfluidic operations at low voltages and/or small microchannel dimensions.

Figure 4A:
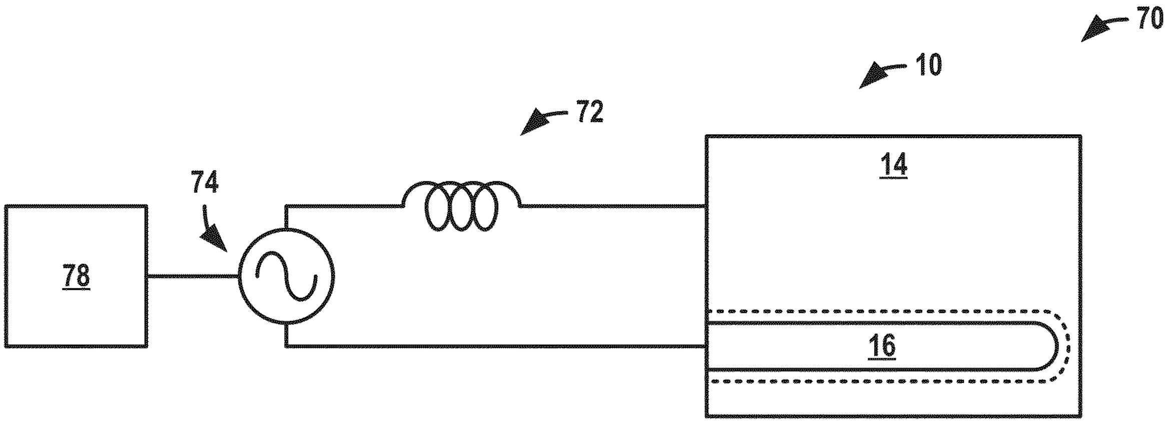
FIG. 4A is a top view schematic and conceptual diagram illustrating an example system for manipulating a fluid using a wired voltage source.

FIG. 4A is a top view schematic and conceptual diagram illustrating an example system 70 for manipulating a fluid using a wired voltage source. System 70 includes device 10, as described in FIGS. 1A and 1B. For simplicity, device 10 is labeled as including bottom electrode 14 and top electrode 16. System 70 also includes a resonant tank circuit electrically coupled to bottom electrode 14 and top electrode 16. The resonant tank circuit includes an inductor 72 electrically coupled to bottom electrode 14 and a voltage source 74 electrically coupled to inductor 72 and top electrode 16; however, in other examples, different configurations of inductor 72 and voltage source 74 may be used. Inductor 72 in series cancels a reactance of device 10 to improve an efficiency of transfer of power, such that an inductance of inductor 72 may be chosen for the specific capacitance of device 10. An electrical current through the resonant tank circuit may be increased or maximized at resonant frequency. The voltage drops over inductor 72 and capacitor may be larger than an input voltage since, as a local reactance of each component does not change with an increase in current to the resonant tank circuit. Energy may be conserved, as the capacitor and inductor 72 cancel each other out so that the total power of the resonant tank circuit may be conserved while the voltages across device 10 locally (i.e. the capacitor) may be very large, including voltages larger than the input voltage. As such, the resonant tank circuit may be configured for a resonant frequency which improves an efficiency of energy transfer. For example, a capacitance of device 10, a series resistance of the resonant tank circuit, and a resistance of inductor 72 may be configured to be low, and an inductance of inductor 72 may be configured to be high. A desired operating frequency of the resonant tank circuit may be selected, and the capacitance of device 10 measured, to select inductor 72.

Voltage source 74 is communicatively coupled to circuitry 78, such as a computing device. Voltage source 74 is configured to generate a voltage. Bottom electrode 14 and top electrode 16 are configured to generate an electric field in a microchannel region in response to receiving a voltage from voltage source 68. This electric field is configured to move a fluid along the microchannel. In some examples, the voltage is less than 5 volts.

In operation, circuitry 78 may control voltage source 74 to create a voltage difference across bottom electrode 14 and top electrode 16. For example, a 3.5 Vrms AC bias may be applied across bottom electrode 14 and top electrode 16 at a 100 kHz frequency. As another example, using a resonant tank circuit, a 1.5 Vrms voltage may be applied across bottom electrode 14 and top electrode 16 at a 500 kHz frequency using a 100 uH inductor. The voltage difference may correspond to a particular flow rate, flow length, width, or volume of a microchannel. For example, an increase in the voltage difference may result in an increase in size (e.g., radius or volume) of the microchannel, an increase in flow rate through the microchannel, an increase in length of the microchannel, a generation of microchannels for a liquid having higher surface tension, a generation of microchannels with larger angles alpha, an increase in heating of a liquid in the microchannels and subsequent evaporation, and/or an increase in hydrolysis (e.g., bubble formation).

Device 10 may receive the voltage from voltage source 64. In response to receiving the voltage, device 10 may generate an electric field in a microchannel region. An outer surface of a microchannel in the microchannel region may form a decreased contact angle with the outer surface of the dielectric layer and/or an increased electric field in the microchannel region, such that the microchannel extends along the microchannel region until the differential pressure within the microchannel is at equilibrium. In some examples, the initial contact angle (e.g., contact angle prior to actuation by a voltage across top electrode 16 and bottom electrode 14) is greater than about 50 degrees. In some examples, the microchannel has a width less than about 5 micrometers.

Figure 4B:
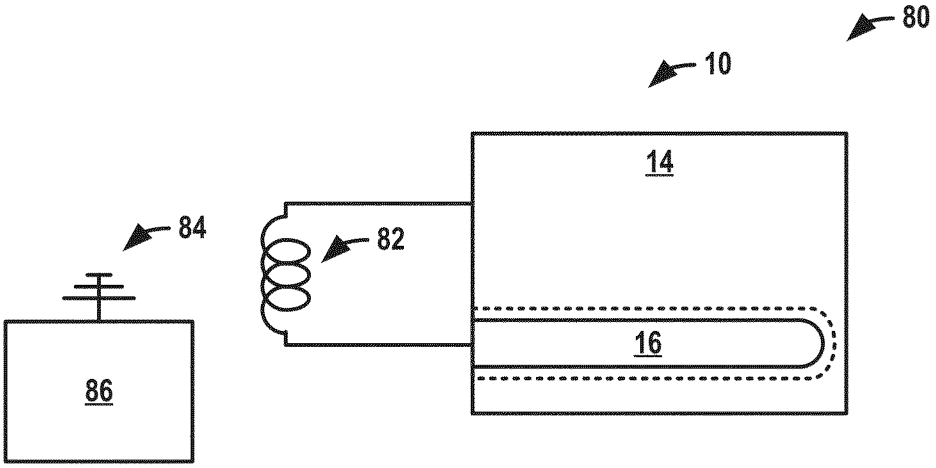
FIG. 4B is a top view schematic and conceptual diagram illustrating an example system for manipulating a fluid using a wireless voltage source.

FIG. 4B is a top view schematic and conceptual diagram illustrating an example system 80 for manipulating a fluid using a wireless voltage source. System 80 includes device 10, as described in FIGS. 1A and 1B. System 80 also includes inductor 82 electrically coupled to bottom electrode 14 and top electrode 16 and inductively coupled to antenna 84. Antenna 84 is communicatively coupled to mobile computing device 86 and configured to emit a signal capable of inducing a voltage in inductor 82. Inductor 82 is configured to receive an induced voltage from antenna 84 and generate a voltage difference between bottom electrode 14 and top electrode 16 in response to receiving the induced voltage through inductor 82. For example, as explained above in FIG. 4A, inductor 82 may be selected based on a capacitance of device 10 and a desired resonant frequency. In some examples, the induced voltage is less than 5 volts.

In operation, mobile computing device 86 may induce, via antenna 84, a voltage in inductor 82 to create a voltage difference across bottom electrode 14 and top electrode 16. Device 10 may receive the induced voltage from inductor 82. In response to receiving the voltage, device 10 may generate an electric field in a microchannel region. An outer surface of a microchannel in the microchannel region may form a decreased contact angle with the outer surface of the dielectric layer and/or an increased electric field in the microchannel region, such that the microchannel extends along the microchannel region until the differential pressure within the microchannel is at equilibrium. In some examples, the initial contact angle is greater than about 50 degrees. In some examples, the microchannel has a width less than about 5 micrometers.

While described with respect to particular circuits in FIGS. 4A and 4B above, device 10 may be integrated into a wide variety of integrated circuits. For example, due to a low voltage for generating a microchannel, device 10 may be used with conventional voltages used in integrated circuits, such as for CMOS-based lab-on-a-chip designs. Such integrated designs may use, for example, components of system 70 and system 80 in FIGS. 4A and 4B, respectively, with other circuits or computing devices for comprehensive and/or low power integrated circuit devices.

In some examples, inductive couplers, such as inductor 82, may be integrated within system 80, such as a microchip, to provide compact integration, less expensive manufacturing, reduced contact resistance, and/or simplified operation. For example, multiple wireless DEP devices may be fabricated on single chips for high throughput manufacturing. Additionally, integrated inductive couplers may increase experimentation throughput by allowing many devices to be activated in parallel with a single emitting source. In some examples, inductive couplers may include one or more coils. Coils may include, but are not limited to, spiral inductors, clover-leaf resonator, microstrip, open stub or shunt stub transmission lines, ring or split-ring resonators, hairpin resonator, interdigitated electrodes, or other integrated inductive coupler designs.

Integrated inductive couplers may have a resonator structure fabricated from a relatively low electrical resistance material, such that inductive wireless coupling may be relatively high. Integrated inductive couplers may be fabricated using standard microfabrication technology (e.g. photolithography or electron beam lithography with lift-off, evaporation or sputtering with etching, etc.), inkjet printing of on-chip inductors via conductive ink, or 3D printing of conductive inductors. In some examples, integrated inductive couplers may be fabricated from doped semiconductors and 2D materials such as graphene. In some examples, the integrated inductive coupler may be fabricated on top of a dielectric layer, such as dielectric layer 18 of FIG. 1B or dielectric layers 108A and 108B of FIGS. 18C-F, such that the edges of the inductive coupler may function as an edge of top electrode 16 and/or one or both of electrodes 109A or 109B to guide electrofluidic flow.

Figure 5A:
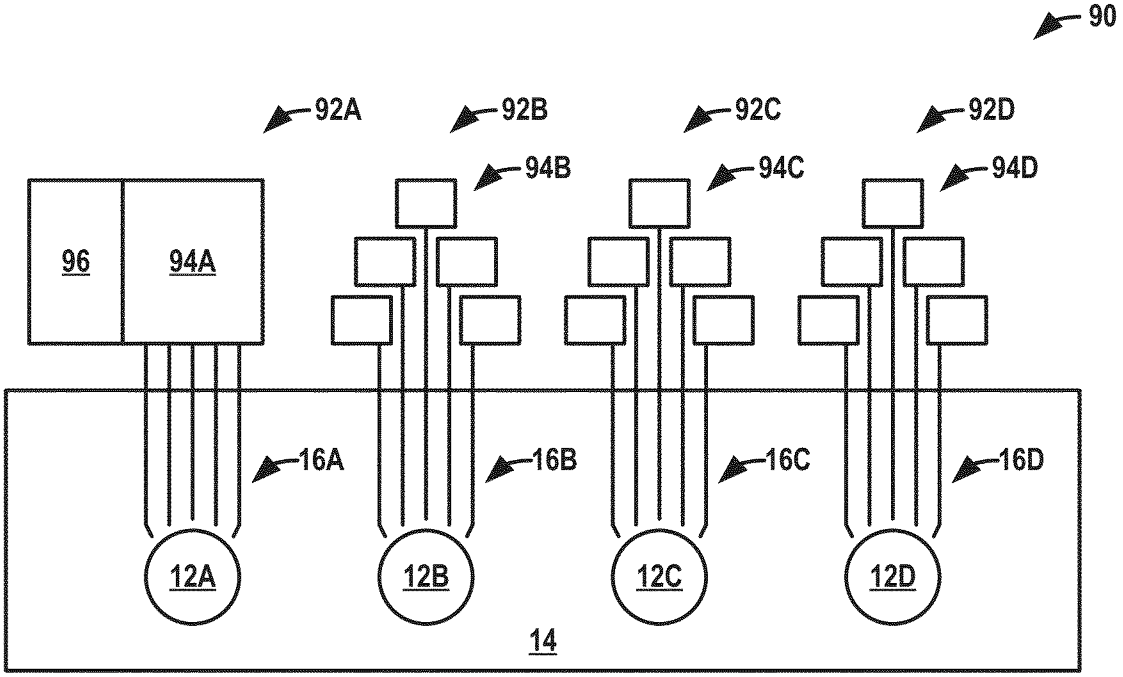
FIG. 5A is a top view schematic and conceptual diagram illustrating an example system for manipulating a fluid.

FIG. 5A is a top view schematic and conceptual diagram illustrating an example system 90 for manipulating a fluid. System 90 includes four device sections 92A, 92B, 92C, and 92D ("device sections 92"). Device sections 92A, 92B, 92C, and 92D each include a fluidic reservoir 12A, 12B, 12C, and 12D, and a set of five multiplexed top electrodes 16A, 16B, 16C, and 16D, respectively. Additionally, each of the five multiplexed top electrodes 16 may be configured in a multiplexed confirmation in which each narrow top electrode 16 includes two or more smaller electrodes, such as illustrated in the image of FIG. 12B. Each top electrode of the respective set of top electrodes 16 includes a set of voltage sources 94A, 94B, 94C, and 94D. In some examples, each of top electrodes 16 is separated from another of top electrodes 16 by less than about 10 micrometers. For example, system 90 may be capable of generating relatively small microchannels at relatively low voltages, such that system 90 may have a relatively high density of microchannels. In operation, device sections 92 may control a voltage difference between bottom electrode 14 and each set of top electrodes 16 to generate microchannels along respective top electrodes. In some examples, system 90 may be configured to facilitate mixing of different sample solutions with another system. For example, two or more independent microchannels controlled with different voltage sources may be positioned proximate to each other to enable the two microchannels to mix solutions.

Figure 5B:
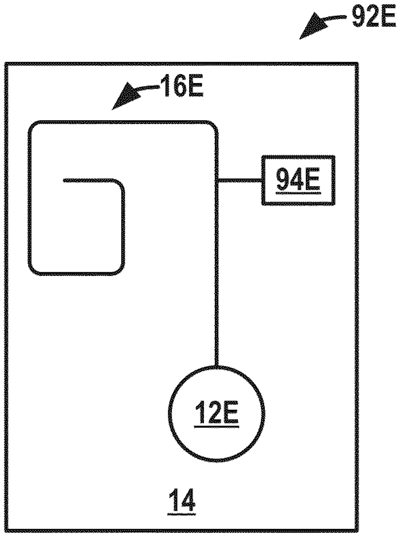
FIG. 5B is a top view schematic and conceptual diagram illustrating an example device for more complex flow of a fluid.

In some examples, devices may be designed for more complex microchannel forms. FIG. 5B is a top view schematic and conceptual diagram illustrating an example device 92E for more complex flow of a fluid. As shown in FIG. 5B, top electrode 16E has a relatively tortuous path from reservoir 12E, such that voltage source 94E may control top electrode 16E to generate a microchannel having a more complex configuration.

Figure 5C:
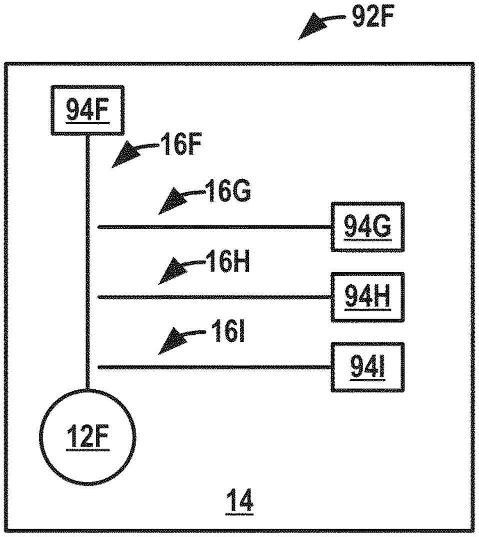
FIG. 5C is a top view schematic and conceptual diagram illustrating an example device for multiplexing a fluid.

In some examples, devices may be designed for high density multiplexing. FIG. 5C is a top view schematic and conceptual diagram illustrating an example device 92F for multiplexing a fluid. For example, grooves may be designed down a length of a first microchannel spaced at the Rayleigh criterion. Liquid may be pumped from reservoir 12F down the first microchannel corresponding to a first top electrode 16F for a period of time. After the period of time, the voltage from voltage source 94F to first top electrode 16F may be turned off to form a large density of smaller droplet reservoirs down the length of the channel. One or more other top electrodes 16G, 16H, and 16I running perpendicular to the first microchannel and operating off different respective voltage sources 94G, 94H, and 94I, may draw liquid from these smaller droplet reservoirs to make very large density multiplexing.

Figure 18A:
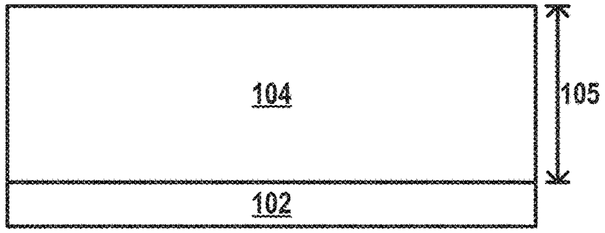
FIG. 18A is a side view cross-sectional conceptual and schematic diagram illustrating an example deposition of a silicon layer on a substrate.
Figure 18B:
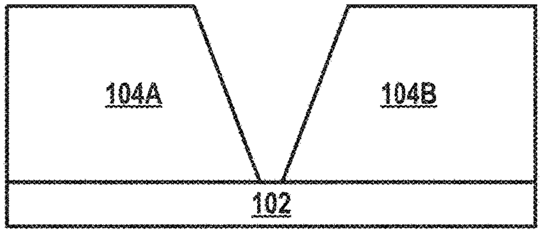
FIG. 18B is a side view cross-sectional conceptual and schematic diagram illustrating an example partial etching of the silicon layer of FIG. 18A.
Figure 18C:
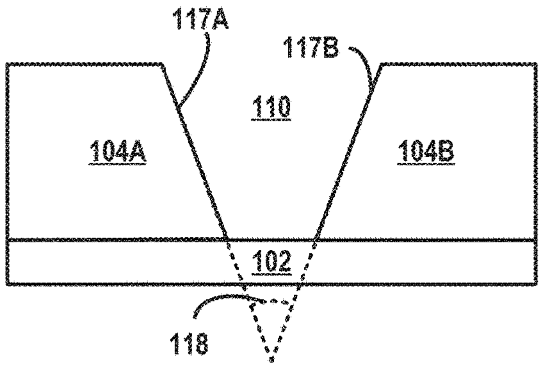
FIG. 18C is a side view cross-sectional conceptual and schematic diagram illustrating an example full etching of the silicon layer of FIG. 18A.
Figure 18D:
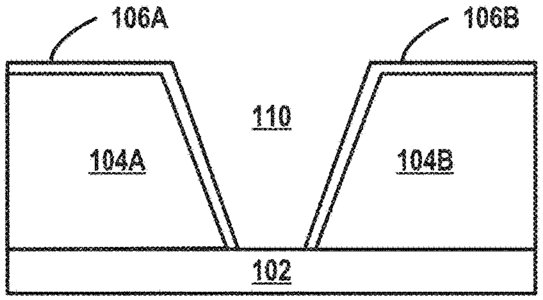
FIG. 18D is a side view cross-sectional conceptual and schematic diagram illustrating an example deposition of an electrode layer on the etched silicon layer of FIG. 18C.
Figure 18E:
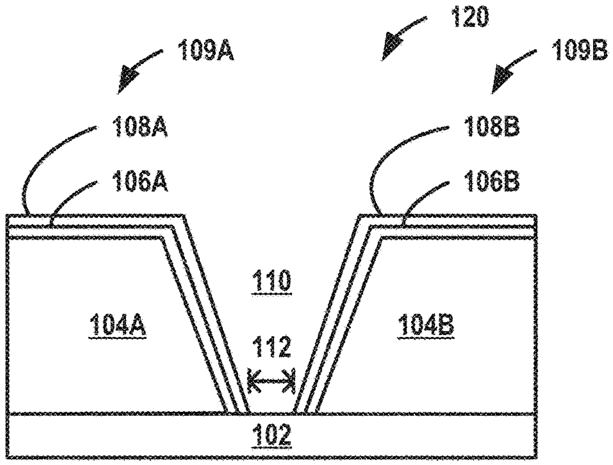
FIG. 18F is a side view cross-sectional conceptual and schematic diagram illustrating an example deposition of a dielectric layer on the electrode layer of FIG. 18D.
Figure 18F:
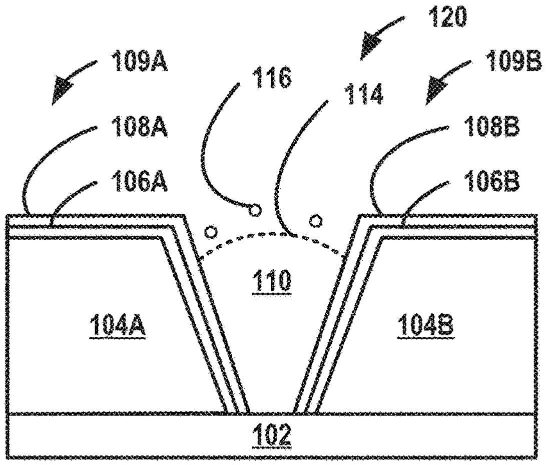

In some examples, microfluidic devices described herein may include two adjacent electrodes separated by a v-groove or gap. For example, to maintain more consistent electrode edge geometries and/or permit tunable gating of various sized particles, etched v-groove structures may be formed, rather than top and bottom electrodes such as described in FIG. 1B. FIGS. 18A-18E illustrate an example technique for forming a non-planar, grooved microfluidic device 120, while FIG. 18F illustrates an example application of device 120.

In some examples, a technique for forming device 120 may include depositing a silicon layer on a substrate. FIG. 18A is a side view cross-sectional conceptual and schematic diagram illustrating an example deposition of a support layer 104 on a substrate 102. Substrate 102 may be similar to, for example, substrate 22 of FIG. 1B, such as a buried oxide layer or silicon on insulator wafer. Support layer 104 may include any crystalline material having a crystalline plane structure capable of forming an apex angle less than about 180 degrees, such as less than about 120 degrees, as will be described below. As will be shown below, a thickness 105 of support layer 104 may correspond to a width of a gap between electrodes, as a crystalline structure of support layer 104 may define a relatively narrow range of angles, such that a gap formed by the angles may increase as a thickness of support layer 104 increases. In some examples, thickness 105 of support layer 104 may be between about 100 nm and about 10 μm, such as between about 1 μm and about 3 μm. In some examples, support layer 104 includes a silicon layer. For example, silicon may form a relatively consistent apex angle, such as about 70.6 degrees when formed using wet etching.

In some examples, the technique for forming device 120 may include forming a gap in the silicon layer to form two discrete silicon layers. FIG. 18B is a side view cross-sectional conceptual and schematic diagram illustrating an example partial etching of support layer 104 of FIG. 18A, while FIG. 18C is a side view cross-sectional conceptual and schematic diagram illustrating an example full etching of support layer 104 of FIG. 18A. While forming a gap 110 will be described with respect to wet etching, other techniques may be used to form gap 110 in support layer 104, such as mechanical processes such as milling. In the example of FIGS. 18B and 18C, a photolithography pattern may be marked with an exposed section for wet etching. A thickness of support layer 104 and width of the photolithography may determine a cross-section width of a resulting microchannel cross-section. A silicon etchant, such as potassium hydroxide, may be applied to support layer 104 to form a v-groove having an apex angle 118 between a first sidewall 117A of a first support layer 104A and a second sidewall 117B of a second support layer 104B. Apex angle 118 may correspond to a fixed apex angle, α, less than about 180 degrees, of support layer 104 to define the apex angle of the fluidic channel of gap 110. In some examples, apex angle 118 may be less than about 120 degrees, such as between about 65 degrees and about 75 degrees, such as about 70.6 degrees for silicon. Etching may proceed through support layer 104 to substrate 102 such that a gap 110 at the apex may be formed between two discrete support layers 104A and 104B forming a base for discrete electrodes. In this manner, the crystalline structure of silicon may provide highly precise and consistent channel geometries for robust operation.

In some examples, the technique for forming device 120 may include depositing a conductive layer on support layer 104. FIG. 18D is a side view cross-sectional conceptual and schematic diagram illustrating an example deposition of a first conductive layer 106A on first silicon layer 106A and a second conductive layer 106B on the support layer 104B of FIG. 18C. Deposition of conductive layers 106A and 106B may be similar to deposition of bottom conductive layer or top conductive layer described in FIGS. 2A and 2C-2E, respectively. In some examples, conductive layers 106A and 106B may have a thickness (not labeled) between about 50 nm and about 200 nm. Conductive layer 106A and 106B may be deposited onto support layers 104A and 104B using a variety of techniques including, but not limited to, evaporation, sputtering, electroplating, and the like, to deposit a conductive material over the v-groove structure of gap 110 in which the conductive material deposited on support layers 104A and 104B of v-groove gap 110 define a first electrode 109A and a second electrode 109B having a non-planar configuration for electrofluidics.

In some examples, the technique for forming device 120 may include depositing a dielectric layer on the conductive layer. FIG. 18E is a side view cross-sectional conceptual and schematic diagram illustrating an example deposition of a first dielectric layer 108A and a second dielectric layer 108B on first conductive layer 106A and second conductive layer 106B, respectively, of FIG. 18D. Deposition of dielectric layers 108A and 108B may be similar to deposition of dielectric layer 18 described in FIG. 2B. A thickness of dielectric layers 108A and 108B may be configured for low-volt actuation via the physics of EWOD and may be efficient for conductive solutions. In some examples, dielectric layers 108A and 108B may have a thickness (not labeled) between about 10 nm and about 100 nm, such as between about 10 nm and about 20 nm.

A resulting device 120 may have an apex width 112 of gap 110 at an apex of gap 110 to define a microchannel region for flow of a microchannel of a fluid. Apex width 112 may represent a smallest distance between electrodes 109A and 109B, such as along substrate 102. As described above, gap 110 may be configured by a time of etching, thickness 105 of support layers 104, and apex angle 118, among other factors. Flow rates through gap 110 may be relatively high compared to a flow rate of device 10, such as due to a relatively larger channel volume of gap 110.

In some examples, gap 110 may be configured to reduce a threshold voltage of device 120. For example, as described with respect to sidewall angle 34 and thickness 26 of dielectric layer 18 in FIG. 1B, reducing apex angle 118 and/or width 112 of gap 110 may reduce threshold voltage in device 120 by reducing surface tension and/or confining electric fringe fields. In some examples, a voltage may be tuned based on apex angle 118, thickness 105 of support layers 104A and 104B, thickness of dielectric layers 108A and 108B, a contact angle of a microchannel in gap 110, and other factors. The combination of a small width 112 of gap 110 and an apex angle 118 less than 180 degrees (e.g., v-groove sidewall channel) may enable very low-volt operation that can generate microchannels of fluid flow in both the dielectric and conductive liquid regimes. In some examples, width 112 of gap may be less than about 200 nm, such as between about 10 nm and about 200 nm.

In some examples, gap 110 may be configured for particle filtration, such that width 112 of gap 110 may decrease as a filtered particle size decreases. As one example, for filtering particles having a diameter of about 100 nm, width 112 of gap 110 may be between about 10 μm and about 20 μm. As another example, for filtering relatively smaller particles having a diameter of about 10 nm, width 112 of gap 110 may be between about 100 nm and about 200 nm.

The resulting microfluidic device 120 may include substrate 102, a first electrode 109A and second electrode 108B on substrate 102. First and Second electrodes 109A and 109B are separated by gap 110. Device 120 further includes dielectric layer 108A and 108B on first and second electrodes 109A and 109B. Each of first and second electrodes 109A and 109B has a sidewall 117 that forms apex angle 118. Apex angle 118 may correspond to a crystal plane structure of a crystalline material that is less than about 120 degrees, such as between about 65 degrees and about 75 degrees. The sidewall of each of first and second electrodes 109A and 109B and a portion of substrate 102 adjacent to the sidewall define a microchannel region for transporting a microchannel of a fluid.

In some examples, width 112 of gap 110 at the apex of the v-groove can be tuned to reduce the DEP force that is prevalent in the stacked metal-insulator-metal (MIM) electrofluidic device structure. FIG. 18F is a side view cross-sectional conceptual and schematic diagram illustrating operation of a device. Device 120 may permit better tunability of gating particles or analytes 116 from entering the channels defined by gap 110. The oxide layer 108A, 108B allows the liquid actuation to remain low, but the gap 110 at the apex of the v-groove can be tuned (nanometer to micrometer in width) to mitigate the DEP force 114 that gates particles or analytes 116. For example, microfluidic device 120 may have a strong DEP force 114 when width 112 is 20 nm, such that analytes 116 may be gated and rejected from entering the channel. In contrast, if gap 110 is etched to a larger width 112 of 1 μm, DEP force 114 that gates analytes 116 may be reduced and thus allows analytes 116 to enter a microchannel in gap 110.

In some examples, microfluidic device 120 may be incorporated into a microfluidic system, similar to incorporation of microfluidic device 10 into microfluidic systems 70 and 80 of FIGS. 4A and 4B, respectively. For example, a microfluidic system may be a microchip having microfluidic device 120 integrated with various electrical components. The microchip may include a substrate 102 and one or more electrode sections, in which each electrode section includes first electrode 109A and second electrode 109B on substrate 102 with first and second electrodes 109A and 109B separated by gap 110 and dielectric layers 108A and 108B on first and second electrodes 109A and 109B, respectively.

The microfluidic system may further include an inductor, such as inductor 72 of system 70 or inductor 82 of system 80, electrically coupled to at least one of first and second electrodes 109A and 109B. In some examples, such as illustrated in system 70 of FIG. 4A, the inductor may be configured to generate an electric field between first and second electrodes 109A and 109B in response to receiving an induced voltage, such as from a smartphone or other wireless actuation device. In some examples, such as illustrated in system 80 of FIG. 4B, the microfluidic system may include a resonant tank circuit that includes the inductor, and that is electrically coupled to first and second electrodes 109A and 109B.

In operation, microfluidic device 120 may be configured to manipulate a fluid by receiving a voltage at first electrode 109A and/or 109B and generating an electric field in a microchannel region defined by gap 110.

In some examples, such as illustrated in system 70 of FIG. 4A, first electrode 109A and second electrode 109B may be configured to receive a voltage from a voltage source, such as voltage source 74, to create a voltage difference across first electrode 109A and second electrode 109B. The voltage difference may correspond to a particular flow rate, flow length, width, or volume of a microchannel. In response to receiving the voltage, device 120 may generate an electric field in a microchannel region. An outer surface of a microchannel in the microchannel region may form a decreased contact angle with the outer surface of the dielectric layer and/or an increased electric field in the microchannel region, such that the microchannel extends along the microchannel region until the differential pressure within the microchannel is at equilibrium.

In some examples, such as illustrated in system 80 of FIG. 4B, a mobile computing device, such as mobile computing device 86, may induce, via an antenna, such as antenna 84, a voltage in an inductor, such as inductor 82, coupled to first electrode 109A and/or second electrode 109B to create a voltage difference across first electrode 109A and second electrode 109B. Device 120 may receive the induced voltage from inductor 82 and, in response to receiving the voltage, generate an electric field in a microchannel region. An outer surface of a microchannel in the microchannel region may form a decreased contact angle with the outer surface of the dielectric layer and/or an increased electric field in the microchannel region, such that the microchannel extends along the microchannel region until the differential pressure within the microchannel is at equilibrium.

In some examples, microfluidic device 120 may further include end electrodes at each end of a microchannel and coupled to a voltage source. Microfluidic device 120 may be configured to receive a voltage potential between the first end electrode and the second end electrode. This voltage potential may increase flow of a conductive fluid in the microchannel, such as will be described further in FIG. 20 below.

While described with respect to particular circuits above, device 10 may be integrated into a wide variety of integrated circuits. For example, due to a low voltage for generating a microchannel, device 10 may be used with conventional voltages used in integrated circuits, such as for CMOS-based lab-on-a-chip designs. Such integrated designs may use, for example, components of system 70 and system 80 in FIGS. 4A and 4B, respectively, with other circuits or computing devices for comprehensive and/or low power integrated circuit devices.

Figure 19:
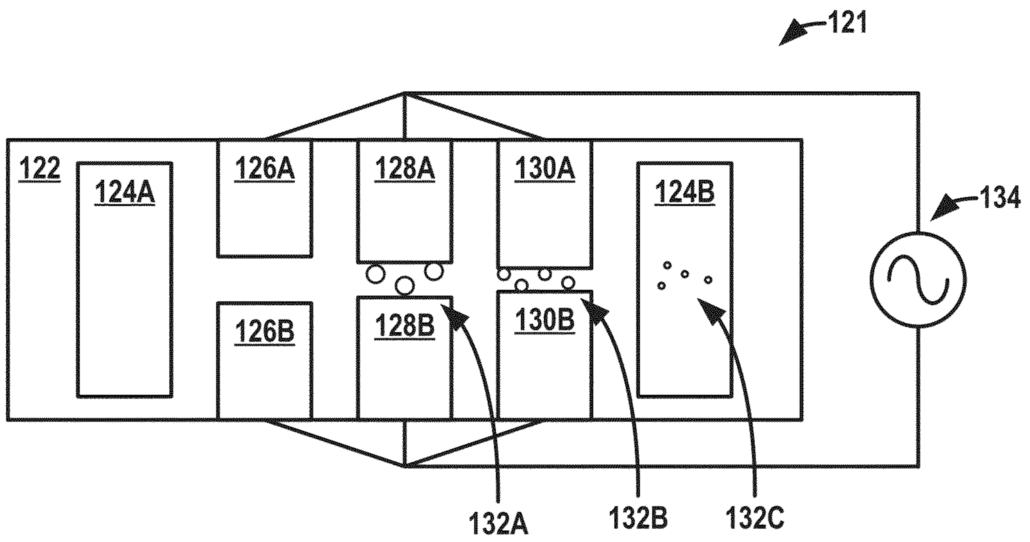
FIG. 19 is atop view schematic diagram illustrating an example microfluidic device having three microchannel regions having various widths.

In some examples, microfluidic devices described herein that include non-planar, v-groove electrodes may include various gap widths. For example, these v-groove structures could be positioned down the length of the microchannel with prescribed gap widths at the apex to filter particles by size down the fluidic channel. FIG. 19 is a top view schematic diagram illustrating an example microfluidic device having three microchannel regions having various widths. Each microchannel region is defined by an electrode sections 126, 128, and 130, each including a first electrode 126A, 128A, 130A, and a second electrode 126B, 128B, 130B, respectively.

A fluid may include a heterogeneric mixture of particles 132A, 132B, 132C. The fluid may be placed at a first end 124A. Device 121 may include a voltage source 154 configured to apply an electric signal applied to each electrode section 126, 128, 130. In response to application of the electric signal, a fluidic microchannel may be pulled across gap of a respective electrode section 126, 128, 130, and separate particles 132A, 132B, 132C by size, in which larger particles 132A are first gated at electrode section 128 with a larger gap width, intermediate particles 132B are gated at electrode section 130 with an intermediate gap width, and smaller particles 132C may proceed to a second end 124B. Upon removing bias, satellite droplets may form if the electrode section 126, 128, 130 are spaced by Ryleigh criteria containing particles 132A, 132B, 132C of their corresponding size.

In some examples, devices described herein may be configured to manipulate ionic solutions for accelerated flow using an electric field. For example, when desiring to actuate solutions containing a charge density (e.g. any physiological solution or solution with ions), an electric field can be used to accelerate these charges in solution in the direction of decreasing voltage potential. Acceleration of these microscopic charges can exhibit macroscopic forces on the liquid body (i.e. electrokinetics). This phenomenon can be integrated into any microfluidic devices described herein to accelerate fluid flow rate.

Figure 20:
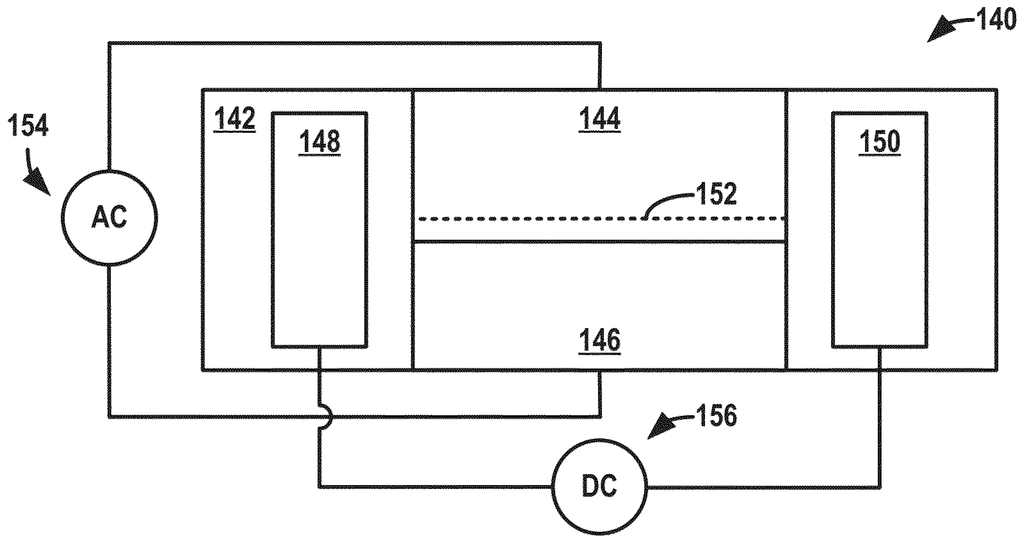
FIG. 20 is a top view cross-sectional and schematic diagram illustrating an example device configured to accelerate flow through a microchannel region using a voltage potential.

FIG. 20 is a top view cross-sectional and schematic diagram illustrating an example device 140, such as device 10 of FIG. 1A, that is configured to accelerate flow through a microchannel region 152 using a voltage potential. In the example of FIG. 20, device 140 includes a first electrode 148 at a first end of a substrate 142 and a second electrode 150 at a second end of substrate 142. For example, one of electrodes 148 or 150 may be positioned under a reservoir and another of electrodes 148 or 150 may be positioned at a desired location of the fluid. First electrode 148 and second electrode 150 may be coupled to an electric source 156; in the example of FIG. 20, electric source 156 is a DC source. Electric source 156 may be configured to apply a voltage potential (either DC, as in the example of FIG. 20, or AC) across electrodes 148 and 150 to hold reservoir drop at a fixed voltage potential. To stimulate flow, voltage source 154 may be configured to apply a voltage potential across a top electrode 146 and a bottom electrode 144 to stimulate microfluidic channel formation. Once microchannels of fluid flow through microchannel region 152 and reach a destination, free charges in solution may have a net acceleration towards the lower potential second electrode and thus increase the fluid flow rate through microchannel region

152. This voltage potential mechanism may be integrated with wireless actuation, and/or used an AC signal with a DC bias for liquid actuation.

While illustrated with respect to a non-planer top/bottom electrode configuration, the voltage potential mechanism may be integrated with a v-groove structure, such as described in FIGS. 18A-F and 19. For example, v-grooves with reducing width 112 of gap 110 may be positioned down the length of a channel to separate particles by sized as they flow past, such as illustrated in FIG. 19.

While not being limited to any particular theory, a general theoretical framework for some examples described herein is provided below. Starting from the Kelvin-Helmholtz relation, a derivation for generation of an electrically generated local pressure difference across some surface on a dielectric fluid body, such as microchannel 36 of FIG. 1B, may be shown by Equation 1, described above with respect to FIG. 1B and reproduced below:

$$\Delta p_D = \frac{1}{2}(\varepsilon_L - \varepsilon_{air})E_t^2 \qquad \text{(Equation 1)}$$

In Equation 1, $\Delta p_D$ is a local pressure difference across a liquid drop and its surrounding environment, $E_t$ is the magnitude of an electric field tangential to a surface of the liquid drop, and $\varepsilon_L$ and $\varepsilon_{air}$ are dielectric constants of the liquid and surrounding environment (e.g., air), respectively. If $E_t$ can be confined to a local region with enough strength to overcome surface tension, the pressure difference may create a channel of liquid with a cross-section defined by electric field lines. For a coplanar electrode configuration, this pressure difference results in a semicircle channel cross-section. The length of a microchannel depends on a balance between opposing surface tension forces. By decreasing a spacing between two coplanar electrodes on the surface, stronger electric fields may be generated at lower threshold voltages. However, as the gap dimensions, and corresponding microchannel dimensions, are further reduced, surface tension forces may grow rapidly in opposition. Eventually, the voltage to create a channel becomes greater than a dielectric breakdown of the dielectric material between the electrodes. This may be a limiting factor for LDEP in reaching sub-micron dimensions and a reason for such high threshold voltages, such as those reported in literature. If, this problem is addressed from a surface tension perspective, rather than or in addition to an electric field or electric circuit perspective, a different geometric channel other than a semicircle cross-section may be realized to reduce surface tension and enable low volt electro-fluidic transport, as described above.

As an example, starting with a Gibbs Free energy description for a deformable liquid, a condition may be set such that the system's energy is in a state of minimization (i.e. dG≤0), as illustrated in Equation 4 below.

$$dG=\Sigma_i\gamma_i-dA_i-p\ dV-S\ dt\leq 0 \qquad \text{(Equation 4)}$$

In the above Equation 4, dG is the differential change in Gibb's free energy and $\gamma_i$ is the surface tension between the drop and the "i-th" material (e.g. electrodes and air) that has an interface surface area of $dA_i$, summed across the surface of the drop. Since the system is initially at equilibrium (e.g., a sessile drop), movement of the microchannel may be associated with an energy cost to add new interfaces as the microchannel forms. Assuming the change in surface area of the mother drop (e.g., reservoir 12) is negligibly small during channel formation, the summation can be simplified to that of just the microchannel surface area. The pressure difference, p, between the reservoir and the leading edge of a microfluidic channel is initially at equilibrium and assumed to remain essentially constant during channel formation. This term becomes the previously defined dielectrophoretic pressure term, $\Delta p_D$, as it is the only significant change introduced to the system. The dV term is the differential volume change of the microfluidic channel as it forms. The final energy term consists of the system's entropy, S, and temperature change dT which are taken to be negligible or can be lumped into a temperature dependent surface tension term, $(\gamma_i \rightarrow \gamma_i(T))$.

As such, starting with the Gibbs Free energy equation of a deformable liquid (Equation 4) and replacing the equilibrium pressure term with our dielectrophoretic pressure (Equation 1), while ignoring temperature changes, we arrive at the following Equation 5 below.

$$dG=\Sigma_i\gamma Y_i dA_i-\Delta p_D dV\leq 0 \qquad \text{(Equation 5)}$$

The dG term may be negative so that a condition can be found where the channel shape is in a state of reducing (negative dG) energy. We define the microchannel shape assuming a cylindrical profile. The microchannel volume, dV, is the product of its arbitrary cross-sectional area, $S_c$, and its length, dz. The summation of the surface area components of the channel, $dA_i$, equals the contour of the channel entrance multiplied by the channel length. Rearranging terms we arrive at the following Equation 6 below.

$$\Delta p_D*(S_c dz)\geq dz\Sigma_i\gamma_i w_i \qquad \text{(Equation 6)}$$

In Equation 6 above, $w_i$, is a length of the contour forming the microchannel entrance that is in contact with a material that has a surface free energy or surface tension of $\gamma_i$. The channel length, dz, which exists on both sides, does not significantly affect the threshold conditions. However, the shape of the microchannel entrance may greatly influence threshold conditions.

The surface free energy of solid channel materials can be written as the difference in free energy that arises from the solid material in contact with the surrounding environment (e.g. air) and the liquid. This difference can be written in terms of the Young's Contact angle, θ, which may correspond to contact angle 38 of FIG. 1B, as in Equation 7 below.

$$\gamma_i=\gamma_{iL}-\gamma_{i0}=-\gamma_0\cos(\theta_i) \qquad \text{(Equation 7)}$$

In Equation 7 above, $\gamma_{i0}$ is the surface free energy between the channel material and surrounding medium and $\gamma_{iL}$ is the surface free energy between the channel material and liquid. This relation replaces surface energy terms with a more easily measurable contact angle term, $\theta_i$, for channel design.

By combining Equations 1 and 4, a generalized relation for the critical electric field necessary to induce a channel of flow with an arbitrary cross-section may be provided. For example, using the relation of Equation 7 and replacing the dielectrophoretic pressure (Equation 1), we arrive at the following condition for channel flow, as in Equation 8 below.

$$\frac{1}{2}(\varepsilon_L - \varepsilon_0)E_t^2 \geq \frac{-\gamma_0}{s_c}\sum_i w_i\cos(\theta_i) \qquad \text{(Equation 8)}$$

In the above Equation 8, $\varepsilon_L$ and $\varepsilon_0$ are the dielectric permittivity of the liquid and surrounding medium and $E_t$ is the electric field tangential to the drop's surface confined to a surface area equal to the cross-sectional area of the channel $S_c$. The general threshold electric field equation may be solved for, as in Equation 9 below.

$$E_t^2 \geq \frac{-2\gamma_0 \sum_i w_i \cos(\theta_i)}{s_c(\varepsilon_L - \varepsilon_0)} \quad \text{(Equation 9)}$$

Equation 9 describes the threshold electric field necessary to create a channel of liquid with an arbitrary channel shape. This summation includes the portion of the contour the liquid snakes with its surrounding environment (e.g. Air→$w_{air}$, $\theta_{air}$).

Figure 6A:
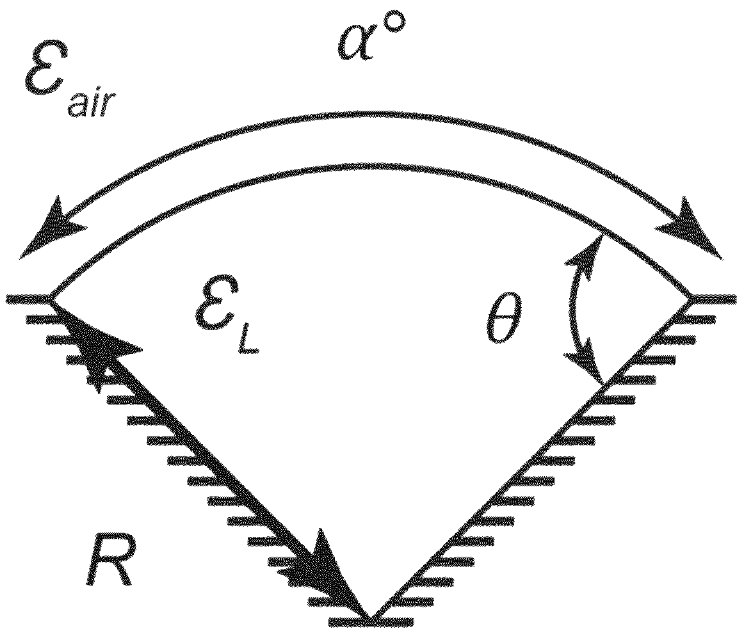
FIG. 6A is a side view schematic diagram of an example circular sector channel cross-section.

FIG. 6A is a side view schematic diagram of a circular sector channel cross-section with a radius, R, sector angle, α, and two legs of the sector in contact with a substrate with a contact angle, θ. The liquid channel has a dielectric permittivity of, $\varepsilon_L$, surrounded by an environment with a permittivity of, $\varepsilon_{air}$, (air). For both the coplanar electrode design used in classic LDEP and for our stacked electrode design, a circular sector channel entrance must be defined using a sector angle α, as shown in FIG. 6A. The cross-sectional area of the channel may be represented by Equation 10 below.

$$S_c = \frac{1}{2}\alpha R^2 \quad \text{(Equation 10)}$$

In the above Equation 10 and shown in FIG. 6A, R, is the radius of the circular sector. Assuming the surrounding environment is air (where $\theta_{air}=\pi$) and the two legs of the channel are of the same contact angle, θ, we can substitute this geometry into Equation 9 to find the threshold electric field condition, as in Equation 11 below.

$$E_t^2 \geq \frac{-4\gamma_{air}(2R\cos(\theta) - \alpha R)}{\alpha R^2(\varepsilon_L - \varepsilon_{air})} \quad \text{(Equation 11)}$$

Simplifying and dropping the air subscript on the surface tension term and defining our fluidic channel to have a circular sector cross-section, with a radius, R, and sector angle, α, results in Equation 2 described above with respect to FIG. 1B and reproduced below.

$$E_t^2 \geq \frac{-4\gamma(\alpha - 2\cos(\theta))}{\alpha R(\varepsilon_L - \varepsilon_{air})} \quad \text{(Equation 2)}$$

In the above Equation 2, θ, is the Young's static contact angle formed by the liquid and the two electrodes that make the legs of the sector (assumed to have the same contact angle; however, Equation 9 is not limited to this assumption), and γ is the surface tension of the liquid with the environment (air), as shown in FIG. 6A.

Figure 6B:
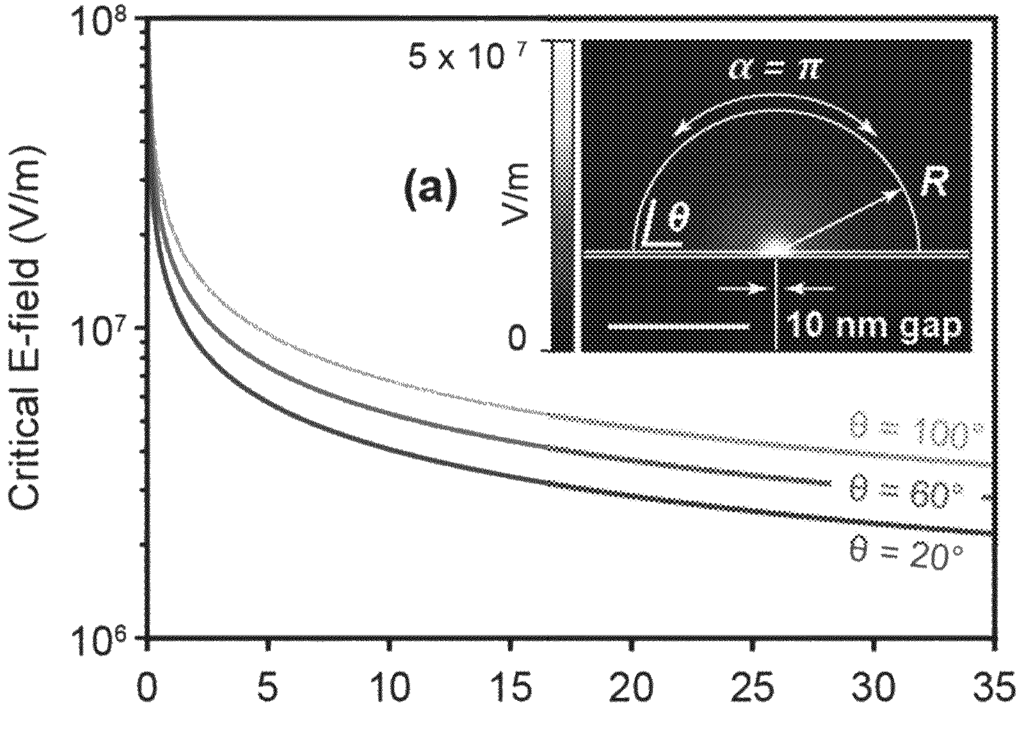
FIG. 6B is a graph of an example critical electric field used to break surface tension for coplanar electrodes.

If we use the coplanar electrode geometry, classic LDEP, a semicircle cross-section channel is formed (α=π). FIG. 6B is a graph of a critical electric field necessary to break surface tension for coplanar electrodes (α=π). A COMSOL field map of the electric field generated for 10 nm spaced electrodes when 10 volts are applied is inset. Scale bar is 1 μm. As illustrated in FIG. 6B, as the channel dimensions are reduced, the necessary electric field to overcome surface tension grows rapidly. Reducing the gap spacing between electrodes can reduce operating voltage by better confining the electric field but also reduces channel dimensions and must compete with the rapidly growing surface tension forces.

Due to literature LDEP experiments with different contact angle substrates ($\theta_i$), the equivalent threshold voltage ($V_E$) can be found by correcting their reported threshold voltage ($V_i$) using there reported contact angle and a contact angle dependent correction factor $K_C$, as in Equation 12 below.

$$V_E \approx K_c V_i \quad \text{(Equation 12)}$$

A simplified surface tension correction factor may be used to account for discrepancies when not considering surface tension, as in Equation 13 below.

$$K_C = \frac{2\theta_f}{\pi} \quad \text{(Equation 13)}$$

In Equation 13 above, $\theta_f$ is the true contact angle of their device. Equation 13 implicitly assumes a comparative model or old device had a contact angle of 90° ($\theta_i$=90°) and further assumes the contact angle of their device is close to 90° ($\theta_f$=90°+Δθ). Using Equation 2, we can provide a more accurate correction factor that accounts for the contact angle of the old model and new device without making assumption or small angle approximations, as in Equation 14 below.

$$K_C = \frac{\pi - \cos(\theta_f)}{\pi - \cos(\theta_i)} \quad \text{(Equation 14)}$$

Equation 19 can be simplified using small angle approximations to Equation 15 below.

$$\frac{\pi - \cos(\theta_f)}{\pi - \cos(\theta_i)} \approx \frac{2\theta_f}{\pi} \rightarrow \theta_f = 90° + \Delta\theta,\ \ \theta_i = 90° \quad \text{(Equation 15)}$$

The correction factor does not assume any small angle limit approximations, which may offer a more accurate alternative correction factor when correcting for differences in device contact angle.

Figure 6C:
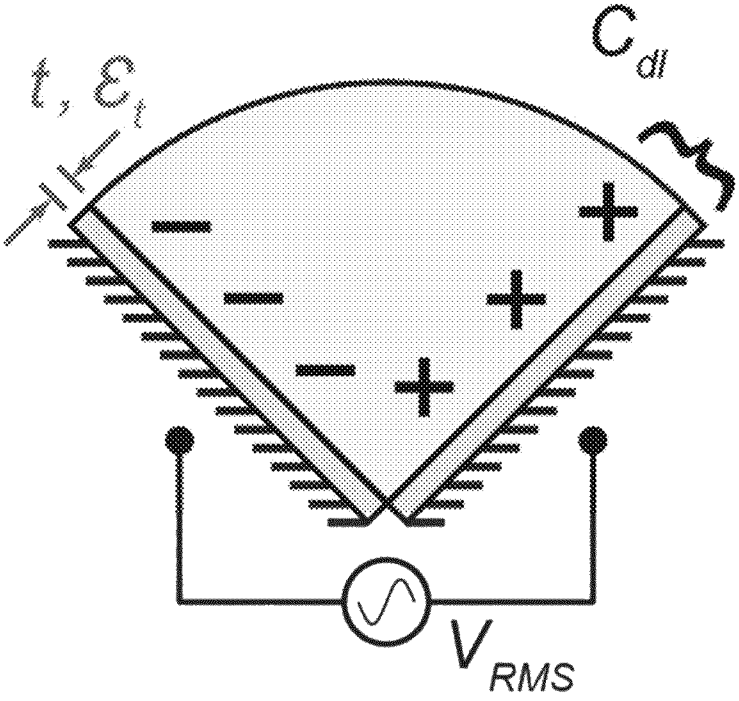
FIG. 6C is a schematic diagram of an example arbitrary sector channel with an ionic solution.
Figure 6D:
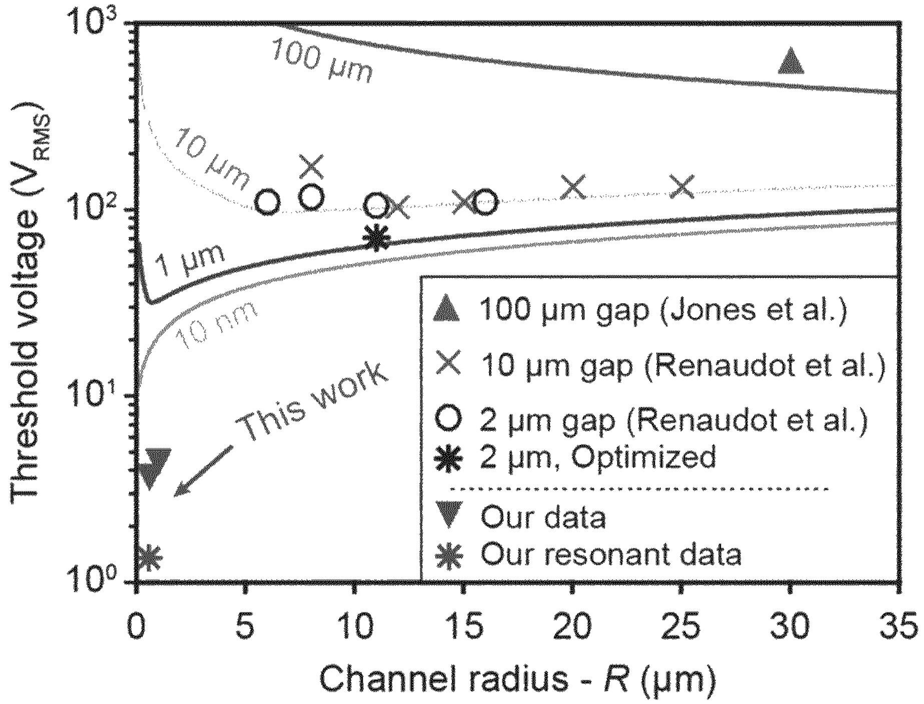
FIG. 6D is a graph of an example theoretical threshold voltage necessary to pull a channel of DI water for coplanar electrodes with various gap widths and subsequent literature values plotted for comparison.

FIG. 6C is a schematic diagram of an arbitrary sector channel with an ionic solution. An oxide layer with thickness, t, and dielectric permittivity of, $\varepsilon_r$, contributes to the double layer, $C_{dl}$, that forms and screens electric field when a voltage is applied. FIG. 6D is a graph of a theoretical threshold voltage necessary to pull a channel of DI water for coplanar electrodes with various gap widths and literature values included for comparison. The same device by Renaudot et al. after optimizing the dielectric films is also included as an asterisk. A few results are plotted for comparison using our new geometry, marked in red. COMSOL simulations were made of planar gaps with a 20 nm $Al_2O_3$ passivation layer for various gap widths and the threshold voltage necessary to meet the conditions of Equation 2 were plotted as a function of the semicircle radius, R, as shown in FIG. 6D. These theoretical curves were in good agreement with experimental LDEP literature values shown in FIG. 6D, after normalizing to the same contact angles using our correction factor, as described above.

As shown in FIG. 6D, reducing the gap spacing results in lower operating threshold voltages with values near 10 Vrms when using nanometer sized gaps, as shown in FIG. 6D. However, 10 volts for a 10 nm gap may be twice as large as the reported dielectric breakdown for high quality ALD grown $Al_2O_3$ gaps and Joule heating and evaporation from such small channels of liquid subject to 10 Vrms would be significant. Thus, experimentally we see gaps no smaller than a micron spacing for LDEP actuation in literature.

Depending on a frequency of the driving signal, an operating regime can become either conductive or dielectric. This is due to the charge relaxation time of the ionic species in solution. The crossover frequency between the conductive to dielectric regime depend on the conductivity of the solution and equivalent circuit geometry. A simple estimate can be made by just considering the hulk electrical properties of the liquid, as in Equation 16 below.

$$\omega_c = \frac{\sigma_L}{\varepsilon_L} \quad \text{(Equation 16)}$$

In Equation 16 above, $\sigma_L$ is the conductivity and $\varepsilon_L$ is the dielectric permittivity constants of the liquid, respectively. Very large frequencies may be needed for a dielectric operation of conductive solutions in which LDEP is stringent upon. As an example, an ionic solution dissolved in water ($\varepsilon_L$=80) with a conductivity of 1 S/m, has a crossover frequency around 100 MHz which is not readily feasible when operating within a voltage range of 50-100 Vrms.

When operating in the conductive regime, charges may accumulate and screen the electric fields generated by the electrodes. The below derivation of the purely conductive criteria for channel flow uses the same surface tension model described above. As the solution moves to the conductive regime, the dielectrophoretic pressure approaches zero (or equivalently $E_t \rightarrow 0$). Following the same steps outlined above for the dielectric body force, we can take Equation 2 and set the electric field term to zero, assuming it is screened by mobile charges in the solution, as in Equation 17 below $$0 \geq -\Sigma_i w_i \cos(\theta_i) \quad \text{(Equation 17)}$$

This may result in a general stipulation for capillary action and the Concuss-Finn limit can be derived accordingly. For a semicircular channel geometry ($\alpha=\pi$), Equation 2 may not hold, which may be an inherent reason why LDEP fails at physiologically relevant solutions with high ionic content. If the frequency of operation can be increased beyond the charge relaxation time, dielectric body forces can still exist to manipulate flow for conductive solutions, however, for physiologically relevant solutions (~1 S/m) the crossover frequency may exist around ~100 MHz which is not readily feasible using 50-100 Vrms. However, Equation 2 suggests microfluidic channels could exist with high conductivity if we do not use a coplanar electrode (semicircle) geometry. This condition can be solved for by setting the electric body forces to zero, as in Equation 18 below.

$$\cos(\theta) \geq \frac{\alpha}{2} \rightarrow \theta \leq \sim \frac{1}{2}(\pi - \propto) \quad \text{(Equation 18)}$$

When using small angle approximations, Equation 18 may result in a simplified Concuss-Finn (CF) limit, which stipulates the condition for spontaneous capillary action in an open channel. The physics of EWOD enable us to control when Equation 18 is satisfied by the tuning of the contact angle, θ, electrically.

The Lippman equation provides a simplified relationship between contact angle and applied voltage, as in Equation 19 below.

$$\cos(\theta^*) = \cos(\theta_0) + \frac{\varepsilon_t}{2t\gamma}V^2 \quad \text{(Equation 19)}$$

As shown in Equation 19 above, the new effective contact angle θ* that results after applying a potential V, depends on the initial Young's contact angle with the substrate, $\theta_0$, and the permittivity of the dielectric passivation layer, $\varepsilon_t$, that separates the drop from the electrode with thickness, t. Thus, the Lippman Equation provides a relation between contact angle and voltage, assuming the mobile charges can instantly screen the electric fields (perfect conductivity). If Equation 17 is not already satisfied, a voltage can be applied to tune the contact angle until Equation 17 is satisfied and thus permits microchannel formation. The generalized form can be included to Equation 17 as follows, as in Equation 20 below.

$$0 \geq -\left[\sum_i w_i \cos(\theta_i) + \sum_k \frac{w_k \varepsilon_k}{2\gamma t_k} V^2\right] \quad \text{(Equation 20)}$$

In the above Equation 20, i is summed over all surfaces and k is summed over those surfaces that drop a voltage V. The thickness of the dielectric passivation layer, $t_k$, separates the mobile charges from reacting with the metal electrodes and has a dielectric constant of $\varepsilon_k$. The generalized critical voltage for a conductive solution may be expressed in Equation 21 below.

$$V^2 \geq \frac{-2\gamma \sum_i w_i \cos(\theta_i)}{\sum_k \frac{w_k \varepsilon_k}{t_k}} \quad \text{(Equation 21)}$$

Using the Lippmann Equation and the same sector circle channel geometry, such as illustrated in FIGS. 6A and 6C, the threshold voltage necessary for a conductive liquid may be represented in Equation 3 described above with respect to FIG. 1B and reproduced below.

$$V^2 \geq \frac{\gamma t(\alpha - 2\cos(\theta_0))}{\varepsilon_t} \quad \text{(Equation 3)}$$

We now have two conditions, as provided by Equations 2 and 3, in which microfluidic flow can exist despite the conductivity of the solution. Rather, the modality driving flow switches to accommodate the sample. Both conditions depend on the sector angle, α, with the constraint that the electrodes may not be planar (i.e. $\alpha \neq \pi$).

Figure 7A:
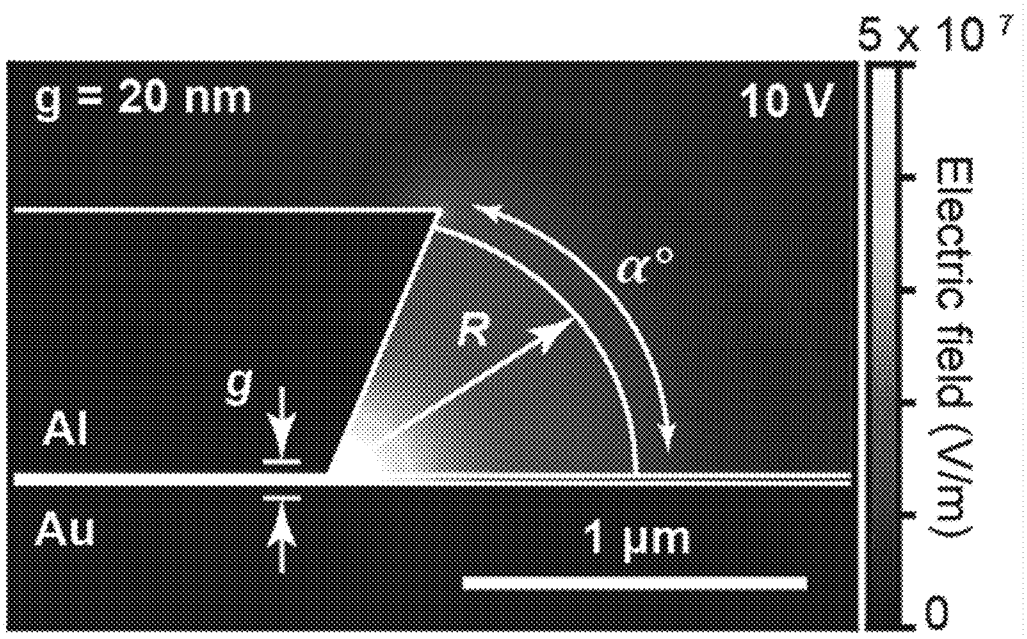
FIG. 7A is an image of example COMSOL simulations using a 20 nm $Al_2O_3$ gap were made to generate electric field maps within the sidewall edge.

As described in FIG. 1B above, a microchannel configuration with a circular sector angle, ∝, cross-section can be achieved by stacking bottom electrode 14 and top electrode 16 vertically using sidewall 30 of top electrode 16 to define one leg of the channel sector. FIG. 7A is an image of COMSOL simulations using a 20 nm $Al_2O_3$ gap were made to generate electric field maps within the sidewall edge. FIG. 7A illustrates a COMSOL field map of the electric field generated for 10 volts applied across a 20 nm Alumina spaced stacked electrode design. The tapered sidewall angle creates a circular sector cross-section channel with the bottom substrate and the radius of the channel is defined as the height of the top electrode. The material for the bottom and top electrode was gold and aluminum, respectively.

Figure 7B:
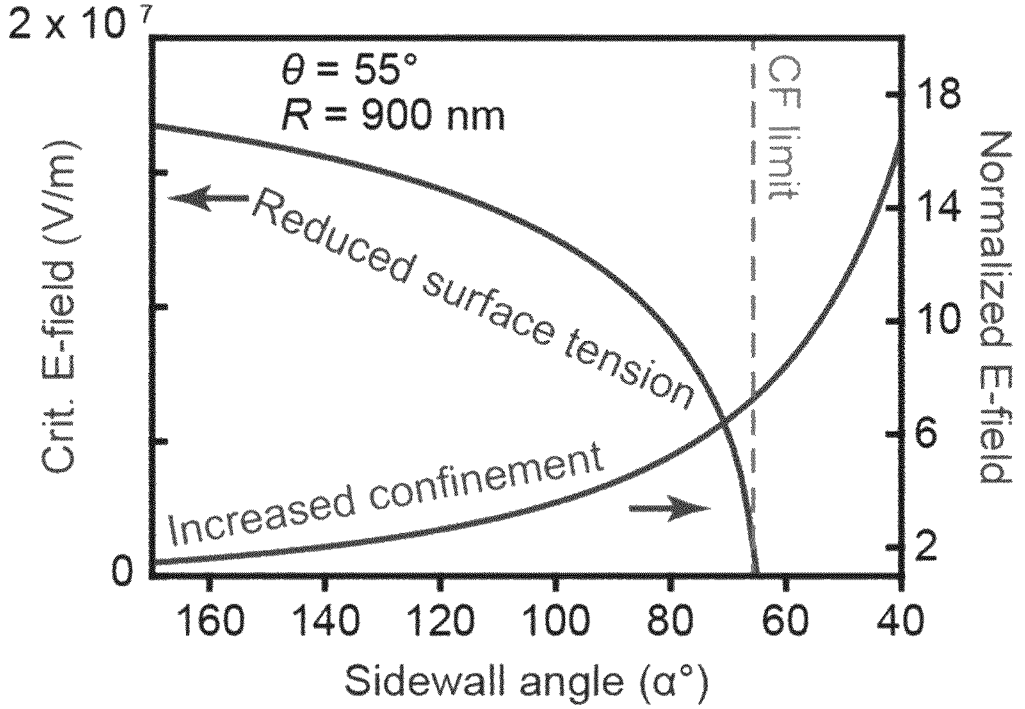
FIG. 7B is an example graph of sector angle for threshold voltage.

FIG. 7B is a graph of sector angle for threshold voltage. As shown in FIG. 7B, minimizing the sector angle of this edge is double advantageous for reducing threshold voltage. FIG. 7B illustrates a double advantage as the sector angle is reduced. First, a reduced sector angle reduces surface tension opposing the channel shape, resulting in less critical electric field necessary to pull the channel. This quickly drops of at the Concuss-Finn (CF) limit in which spontaneous capillary flow occurs and its position depends on the contact angle (55°) of the substrate. Such reduction may be especially advantageous within the conductive liquid regime where small ∝ angles result in lower switching voltages to meet the CF limit and generate flow (e.g., Equations 18 and 19). Second, smaller sector angles better confine electric fringe fields within the channel, which was normalized to the surface averaged electric field of the coplanar geometry with the same radius of 900 nm. Such confinement of electric fields may be especially advantageous for dielectric solutions where body-forces depend on large fields, which can be generated at lower voltages when better confined. The combination of a small nanometer gap (e.g., dielectric layer thickness) and a stacked sidewall channel may enable low voltage operation that can generate microchannels of flow in both the dielectric and conductive liquid regimes.

EXPERIMENTAL METHODS

Fabrication of Stacked Electrode

Figure 11A:
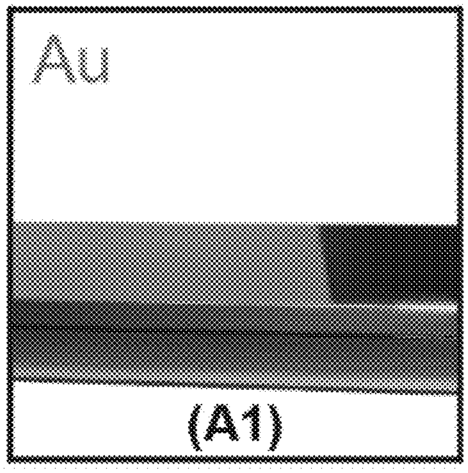
FIG. 11A is a diagram of an example gold conductive layer deposited on a glass wafer.
Figure 11B:
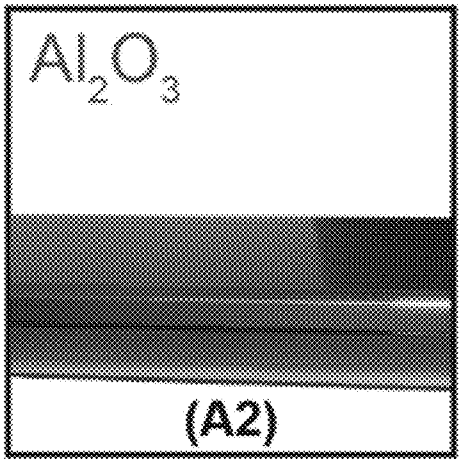
FIG. 11B is a diagram of an example aluminum oxide dielectric layer deposited on the gold conductive layer of FIG. 11A.

Fabrication of a stacked electrode platform started with a 500 μm thick Borofloat 33 glass wafer (University Wafer) that was cleaned in a standard piranha solution and thoroughly rinsed with deionized (DI) water. FIG. 11A is a diagram of a gold bottom electrode deposited on a glass wafer. Rectangular bottom electrodes (15 mm×23 mm) were then patterned using standard photolithography, electron-evaporated gold deposition (50 nm Au, with a 3 nm Chromium adhesion layer), and Lift-off in 1165 Microposit Remover, as shown in FIG. 11A. A region void of Au was defined for placing the contact pads for the top electrode. Using a protective photoresist layer, the wafer was cut into individual 25 mm×25 mm chips and thoroughly cleaned in a 60° C. sonication bath of 1165 Microposit Remover, followed by rinsing in acetone, methanol, and isopropanol. FIG. 11B is a diagram of an aluminum oxide dielectric layer deposited on the gold conductive layer. A 20 nm layer of $Al_2O_3$ was grown using atomic layer deposition (ALD) at 250° C., as shown in FIG. 11B. The thickness of this layer defined the gap spacing, g, between the bottom and top electrode.

Figure 11C:
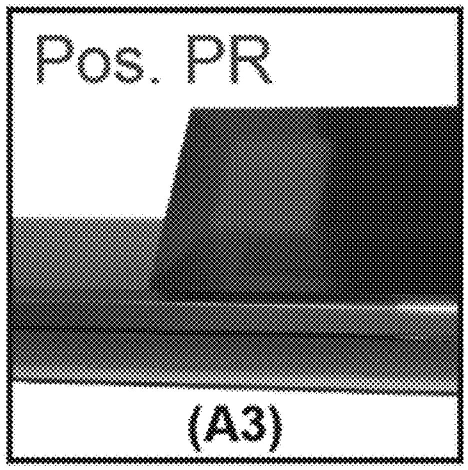
FIG. 11C is a diagram of an example photoresist (PR) layer deposited on the aluminum oxide dielectric layer of FIG. 11B.

Photolithography was used to expose regions along the edges of the bottom electrode. A thicker 200 nm electron-evaporated deposition of $Al_2O_3$ was deposited on these edges to prevent punch through of the 20 nm gap to reduce the chance for electrical shorting from the step change between the bottom electrode and glass substrate. This was followed by Lift-off and a final photolithography step to pattern the top electrodes. When desiring to control the sidewall angle using lift-off, the thickness and type of photoresist (PR) may be important. To create an electrode edge with an acute sidewall angle, α, a positive PR must be used. This PR may have a thickness of at least ~3× the desired height of the top electrode, R, to facilitate a clean Lift-off. FIG. 11C is a diagram of a photoresist (PR) layer deposited on an aluminum oxide dielectric layer. A ~2 μm thick PR layer of AZ1518 (MicroChemicals) was used for a 400 nm tall top electrode. The resist was UV exposed for 9 s using a 20 μm hard contact mode (12 mW/$cm^2$, Karl Suss MA6) followed by a post-bake at 100° C. for 60 s and was developed using Microposit 351 developer (diluted 5:1 with DI water) for 75 s, as shown in FIG. 11C.

Figure 11D:
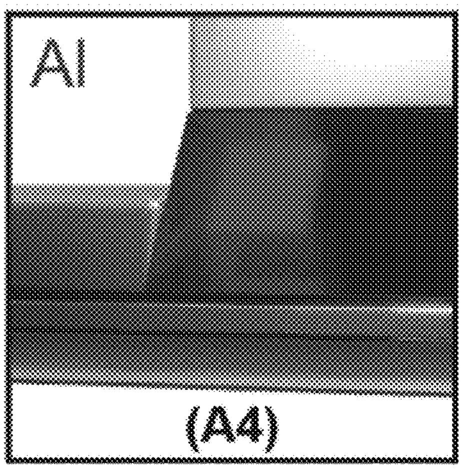
FIG. 11D is a diagram of an example aluminum conductive layer deposited on the aluminum oxide dielectric layer of FIG. 11C.
Figure 11E:
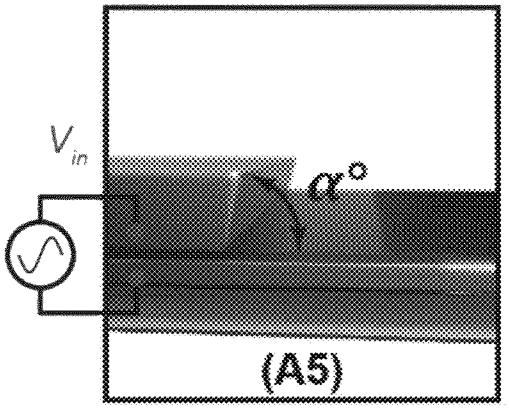
FIG. 11E is a diagram of an example device of FIG. 11D after lift-off of the PR layer.

FIG. 11D is a diagram of an aluminum conductive layer deposited on an aluminum oxide dielectric layer. An electron-evaporated 400 nm layer of Aluminum was then grown, as shown in FIG. 11D, followed by Lift-off in 1165, FIG. 11E is a diagram of the device after lift-off of the PR layer. Due to patterning a thick top electrode layer with lift-off (the nominal height being 400 nm), large fence features were left on some devices shifting the true mean of the top electrode height, R, to nearly double its nominal value. The average sidewall angle was around ~73°, which satisfies the Concuss-Finn (CF) limit when the substrate's contact angle is less than ~50°, Setting the substrate's contact angle near this limit without exceeding maintains control of the channel formation while providing faster fluid velocities and lower threshold voltages. Titania ($TiO_2$) is known for being a biocompatible and stable passivation layer with a relatively high K dielectric constant which is ideal for reducing its effective oxide thickness. We measured the static contact angle of ALD grown $TiO_2$ on our device to be on average ~55° (see contact angle characterization below). This was just above our CF limit which facilitates the optimal conditions for our sector angle channel. For these reasons, a final 5 nm of $TiO_2$ was PEALD grown at 250° C. to passivate the device and ideally define the same contact angle across all materials of the device. The 20 nm $Al_2O_3$ and 5 nm of $TiO_2$ films were measured using single wavelength ellipsometry, (Gaertner Scientific Corporation) on a silicon piece included with deposition. Fabrication dimensions are shown in Table 1 below.

TABLE 1

Fabrication Dimensions

| Device Parameter | Symbol | Nominal Value (nm) | Mean (nm) | Std. (nm) |
|---|---|---|---|---|
| Top Electrode Height | R | 400 | 946 | 464 |
| Gap Spacing | g | 20 | 20.4 | 0.1 |
| Passivation Layer | t | 5 | 4.6 | 0.3 |

Figure 12A:
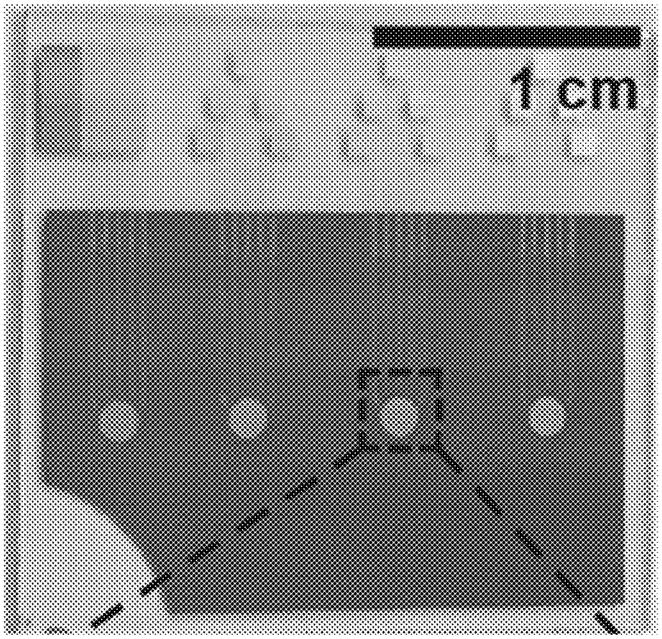
FIG. 12A illustrates an image of an example microchip.
Figure 12B:
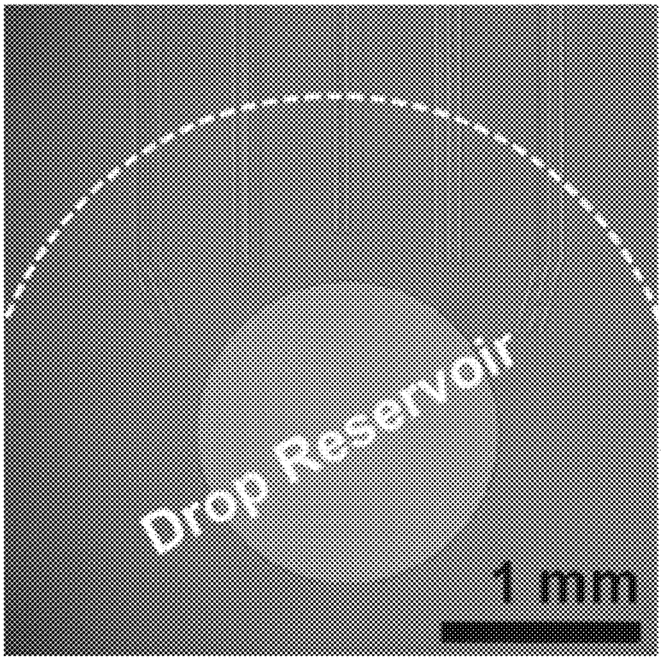
FIG. 12B illustrates an enhanced scanning electron microscope image of the example microchip of FIG. 12A.
Figure 12C:
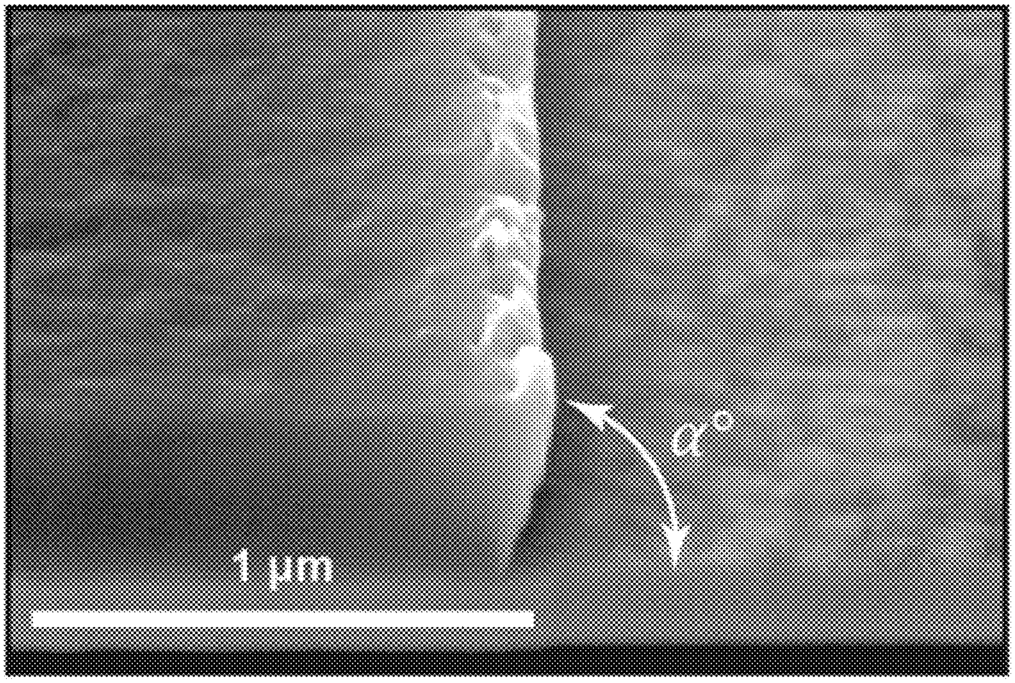
FIG. 12C is an image of a sidewall angle of the top aluminum electrode of an example device.
Figure 12D:
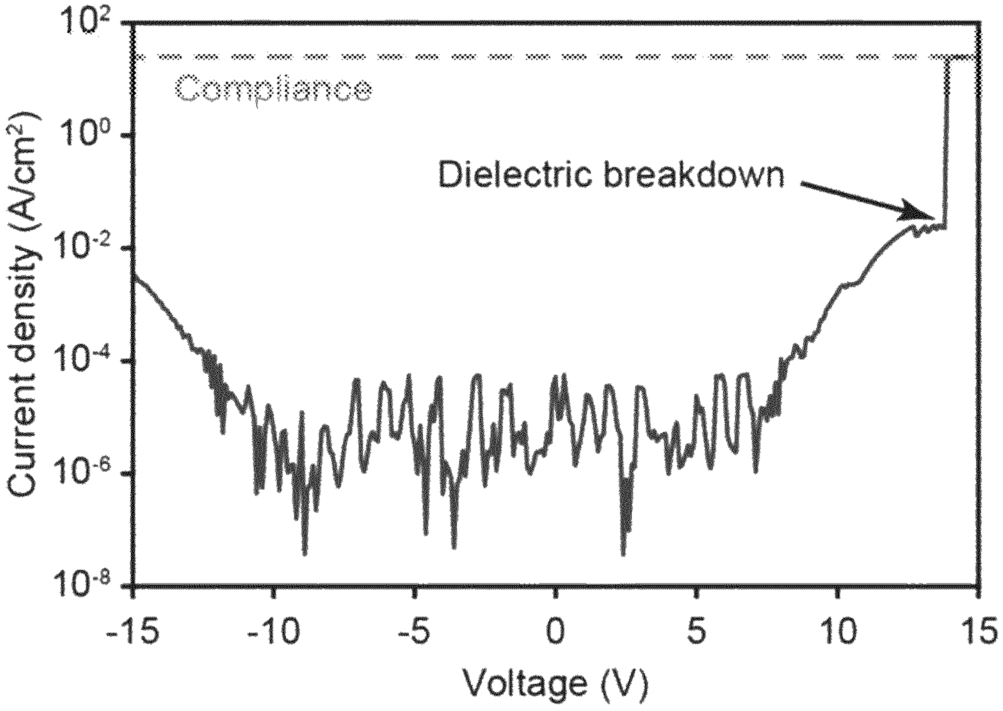
FIG. 12D is a graph of dielectric breakdown for an example device.

FIGS. 12A and 12B illustrate images of a complete chip in which the drop placement pad can be seen with the naked eye. FIG. 12C is an image of a sidewall angle of the top aluminum electrode of this device. FIG. 12D is a graph of dielectric breakdown for this device, which was measured at ~12 V.

The sidewall angle, α, of the top electrode edges was measured after experiments by milling a cross-sectional slice using a focused ion beam (FIB) and a scanning electron microscope (SEM) (Dual-Beam FIB/SEM, ThermoFisher Scientific). Samples were first placed on a stage and tilted to an angle of 52°. A 10×10 μm region was milled across the edge of the top electrode that was 0.6 μm deep. The milled region was made near where the drop reservoir was placed and was repeated for both edges of the electrode for each device. This was followed by SEM images taken of the sidewall angle and sidewall height which were later measured using ImageJ software, as shown in FIG. 11D and Table 2 below. It was observed that even with a thick photoresist, some devices had tall regions of Aluminum existed at different regions along the edges of the top electrode. This created top electrode heights much larger than the nominal 400 nm. The new averaged electrode height, R, was 946 nm±464 nm and the averaged sidewall angle, α, was 71.9°±4.9°.

Devices were used within two days of the 5 nm $TiO_2$ passivation layer and were stored in the clean room and wrapped in tin foil to protect against light induced contact angle changes from the $TiO_2$ layer. It has been shown that the contact angle of $TiO_2$ can be tuned using visible and UV exposure to light. For most devices, directly before use for an experiment, 1-2 drops of deionized water were placed on different edges of the chip and the contact angle was measured using a home-built contact angle measurement setup. The sample was placed on a stage and a silver mirror (Thorlabs) directed the image of the drop profile through a long working distance objective microscope. The angle was measured on both sides of each drop three times with ImageJ software and averaged. The average contact angle across all devices was 53.8°±8.0°.

TABLE 2

| Static Contact or Sector Angle | | | |
|---|---|---|---|
| Device Parameter | Symbol | Mean (deg.) | Standard Deviation (deg.) |
| Contact Angle | $\theta_0$ | 53.8° | 8.0° |
| Sector Angle | $\alpha$ | 71.9° | 4.9° |

Sample solutions were created using running buffers of deionized (DI) water and 1×PBS (pH 7.4, Sigma-Aldrich) with measured conductivity values of $4\times10^{-4}$ S/m and 1.52 S/m, respectively (measured using B-771 LAQUAtwin, Horiba Scientific). To visualize the channel during its formation, fluorescent dye molecules were mixed into both buffer solutions using 5 μM Alexa Fluor™ 594 Carboxylic Acid ($\lambda_{ex}$=590 nm, $\lambda_{em}$=617 nm, ThermoFisher Scientific). For experiments demonstrating filtration, solutions were made with fluorescent 200 nm diameter polystyrene (PS) beads ($\lambda_{ex}$=470 nm, $\lambda_{em}$=525 nm, Surf Green, Bangs Labs). First, the PS bead stock solution was diluted 5,000 to 1 in the desired running buffer solutions. This was then mixed 1:1 with a 10 μM Alexa dye in the same running buffer. The resulting solutions for filtration experiments were 5 μM Alexa dye with 200 nm diameter PS beads diluted 10,000 to 1 in both DI water and 1×PBS.

All theoretical electric field and electric field gradient simulations for the different device geometries were modeled using a 2D electrostatic module in COMSOL Multiphysics. Custom MATLAB scripts were written to process data, generate theory curves and plots. When modeling the planar channel, two coplanar electrodes were separated by the specified gap width in FIG. 6B and filled with $Al_2O_3$ material ($\varepsilon_d$=9.1×$\varepsilon_0$). A 20 nm $Al_2O_3$ passivation layer was also included for all planar gap geometries for more direct comparison with our stacked gap design that has a 20 nm $Al_2O_3$ layer covering the bottom electrode. Semicircle sections were positioned directly above the gap and varied in radius, R (Inset of FIG. 6B). Since the electric field generated from the gap is a fringe field, the magnitude is not spatially distributed equally. Thus, the magnitude was squared at each point spatially and then averaged across the entire cross-section surface with radius, R. A MATLAB script then found at what channel radius and voltage the average electric field met the surface tension threshold of Equation 3 for different gap widths. Literature values that specified their gap width (d), electrode width (w), and contact angle (θ) of their passivation layer were plotted and corrected using our correction factor to normalize the different contact angle substrates to the same modeled in FIG. 6D, (θ=60°). Their channel radius, R, was defined according to their provided equation for coplanar electrodes, as shown in Equation 22 below.

$$R = \frac{d}{2} + w \qquad \text{(Equation 22)}$$

The device model that included nonplanar electrode configurations was modeled similarly as above. Electrodes were stacked and separated with a 20 nm $Al_2O_3$ film. The height of the top electrode was set to the mean value (+1 standard deviation) and defined the radius of the channel, R. The sidewall angle, α, was then varied between 170°-40°. The 5 nm $TiO_2$ passivation layer was not modeled. The electric field magnitude and threshold condition of the channel was calculated the same as above as a function of α. The dielectric constant and surface tension values used for both DI water and 1×PBS were: 80×$\varepsilon_0$ and 72 mN/m, respectively. When modeling the CMF, filtration and gate curves, a complex dielectric function was defined below, as shown in Equation 23 below.

$$\varepsilon^*(\omega) = \varepsilon(\omega) + i\frac{\sigma(\omega)}{\omega} \qquad \text{(Equation 23)}$$

In Equation 23 above, σ is the conductivity of the material and was treated as a constant across the simulated RF frequencies as was ε. The dielectric constant and conductivity used for the polystyrene beads were 2.56×$\varepsilon_0$ and $160\times10^{-4}$ S/m, respectively. The conductivity of the liquid solutions (DI water and 1×PBS) was modeled using measured values reported below.

All visualization of the channels was made using an upright microscope with an extra-long working distance 50× air objective (NA 0.55, Nikon), A 2-4 μl drop of the target sample solution was placed on a circular pad (to guide the eye) so that it overlapped with the top electrodes. A sinusoidal AC signal was then applied across the nanogap using a function generator (Hewlett-Packard). To excite fluorescence, a white light Laser Driven Light Source (LDLS, Energetiq) was used to excite the channel with a Texas Red florescent filter cube arrangement ($\lambda_{ex}$: 562 nm, Dichroic: 594 nm, $\lambda_{em}$: 593 nm, Semrock). The evolution of the channel was recorded at 1 s frames (Bin. 2, 400 ms exposure, Micro-Manager) using a CCD camera (CoolSNAP $HQ^2$, Photometrics). To visualize the PS beads, a second florescent filter cube was used ($\lambda_{ex}$: 470 nm, Dichroic: 495 nm, $\lambda_{em}$: 525 nm, Chroma). During the threshold voltage experiments, the driving signal was set to 100 kHz and was incremented every 60 s by 0.5 V amplitude (0.35 Vrms) until a channel was observed with a width of 1 μm or greater and a length greater than 5 μm. Resonant threshold voltage was recorded in like fashion with a 100 μH inductor wired in series with voltage amplitude increments of 0.1 V amplitude (0.07 Vrms). Before starting the experiment, the resonant frequency was found after placing the drop by measuring the max voltage dropped across the device with an oscilloscope (Tektronix) using a small amplitude driving signal (~100 mV). The average gain was 3.15±0.1, using our tank circuit with an average resonant frequency of 432.5±165 kHz (95% confidence interval, sample standard deviation: 76.8 kHz, n=4). The input voltage and voltage dropped across the device was recorded during the recording of the liquid channel formation. Post-experiments, an SEM cross-section was then taken of the channel at a region near the channel and the sidewall angle was measured.

Theoretical plots for the threshold voltage operating in the dielectric and conductive liquid regimes were generated and tested experimentally using DI water, (4e-4 S/m) and high ionic buffer (1×PBS, 1.52 S/m), respectively. To visualize the liquid channel as it formed, both solutions were dyed with a florescent molecule (5 μM Alexa Fluor™ 594). FIG.

Figure 8A:
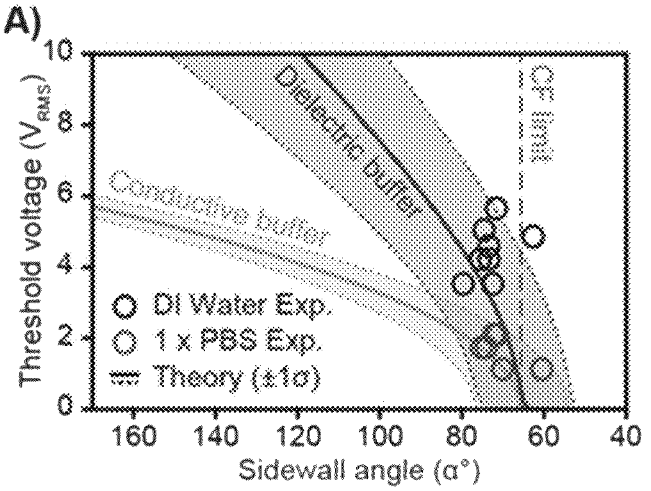
FIG. 8A is a graph of example theoretical curves plotted using device parameters for deionized (DI) water and a purely conductive liquid as a function of the sidewall angle.

8A is a graph of theoretical curves plotted using our device parameters±1 standard deviation for deionized (DI) water and a purely conductive liquid as a function of the sidewall angle. The average threshold voltage measured was 4.5+0.7 Vrms for DI water and 1.7±0.5 Vrms for 1×PBS, as shown in FIG. 8A. This compares to the best reported literature LDEP values for electrically pulled microchannels of 50 Vrms and 200 Vrms (a 10-fold and 100-fold reduction) for DI water and conductive liquid, respectively. Further, this is a 3-fold reduction compared to normal EWOD operation (10-15 Vrms) and offers significantly tighter confinement (~1–4 μm regions) of the liquid sample. Modeling did not include any oxidation layer of the top electrode or the 5 nm titanium dioxide layer. The experimental data using DI water and 1×PBS buffer solution was in good agreement. As shown in FIG. 8A, the experimental results were plotted on top of our theory curves and show high agreement. When demonstrating arbitrary flow paths, multiplexing, and filtration—a 3.5 VMS (100 kHz) driving signal was applied and recorded for 5 min with no inductor. Drops lasted approximately ~10 min, before fully evaporating.

Figure 8B:
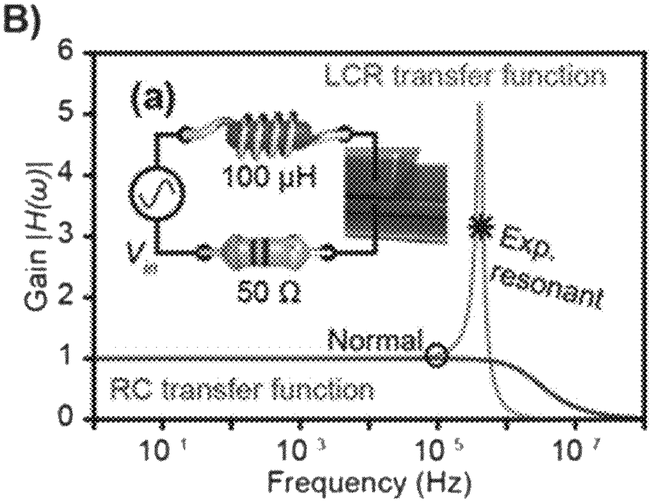
FIG. 8B is a graph of example transfer functions when performing normal operation of an RC circuit and a resonant 100 μH inductor in series.

FIG. 8B is a graph of the transfer functions when performing normal operation (RC circuit) and a resonant 100 μH inductor in series with our device (assuming 50 Ohm internal resistance, LCR circuit inset). The observed average gain over our resonant device and its frequency of resonant operation is plotted as well as the normal 100 kHz operation. A further advantage to these remarkably low operating conditions is their readily available for small circuit integration. Using a 100 μH inductor in series with our device, we can create a resonant tank circuit to further boost performance, as shown in the inset of FIG. 8B.

Figure 8C:
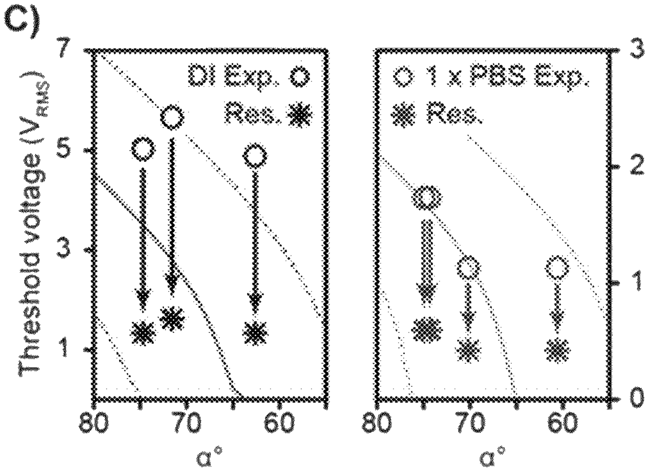
FIG. 8C are example graphs of the measured reduction in threshold voltages using a resonant circuit for DI water and 1×PBS solution.

FIG. 8C are graphs of the measured reduction in threshold voltages of several data points plotted in Panel A using our resonant circuit for DI water and 1×PBS solution. By operating at the resonant frequency (~430 kHz, see Supplementary Materials), we can reduce our average threshold voltage to 1.4±0.2 Vrms for DI water and 0.5±0.1 Vrms for 1×PBS, as shown in FIG. 8C. This equates to a 35-fold for DI water and a 400-fold for physiologically relevant solutions total reduction in input voltage. Projection lengths varied from 7 μm up to 1.25 mm in length and 1-4 μm in width. The threshold values and channel lengths for the DI water operation (for both resonant and not) had greater variance compared to 1×PBS. This is due in part to its dependence on the top electrode height, R, which had significant fabrication variance, as seen in Table 1.

Figure 9A:
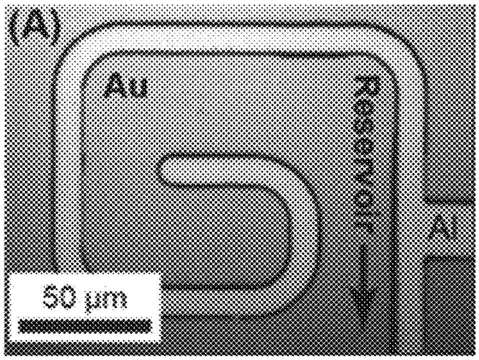
FIG. 9A is an image of an example spiral top electrode patterned out of Al with the bottom Au electrode colored yellow.
Figure 9B:
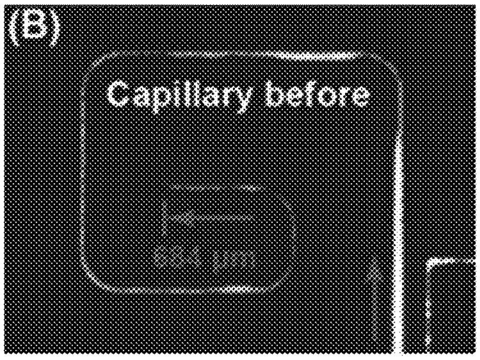
FIG. 9B is an image illustrating an example of the electrode of FIG. 9A undergoing spontaneous capillary flow (colored red for visualization) before voltage is applied due to a sidewall exceeding the CF limit.
Figure 9C:
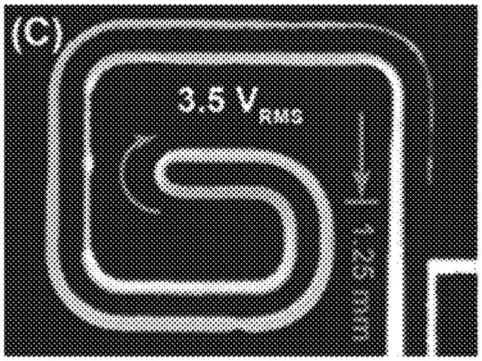
FIG. 9C is an image illustrating the electrode of FIG. 9A after a 3.5 Vrms voltage is applied to the 1×PBS solution, causing the liquid channel to grow in width and length as it wraps around to the outer edge of the top electrode.
Figure 9D:
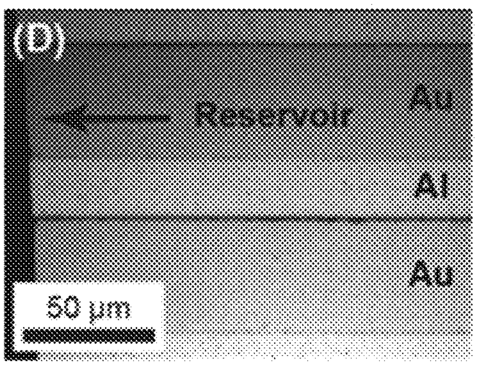
FIG. 9D is an image of an example multiplexed device created using three parallel top electrodes made of Al.
Figure 9E:
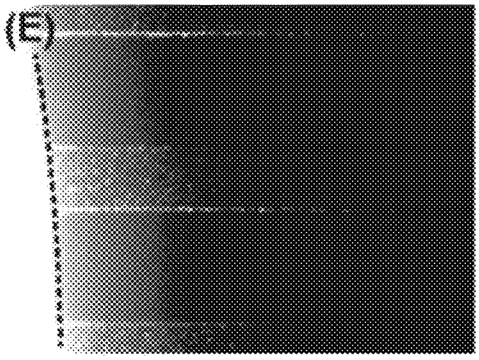
FIG. 9E is a fluorescent image of the device of FIG. 9D before applying voltage.
Figure 9F:
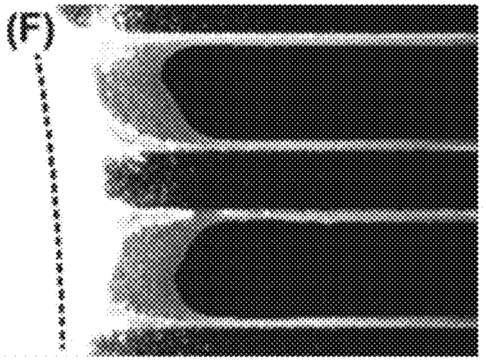
FIG. 9F is an image of the device of FIG. 9D after applying 3.5 Vrms for 5 min to a 1×PBS solution.

Feasibility of the design for liquid channel manipulation may be demonstrated by comparison to standard EWOD. FIGS. 9A-9C illustrate complex flow patterns (navigating 90° and 180° turns). FIG. 9A is an image of a spiral top electrode patterned out of Al with the bottom Au electrode colored yellow. The drop reservoir of 1×PBS is positioned out-of-view. FIG. 9B is an image illustrating the electrode of FIG. 9A undergoing spontaneous capillary flow (colored red for visualization) before voltage is applied due to a sidewall exceeding the CF limit. The liquid channel travels about 684 μm from the drop after 1-2 min. FIG. 9C is an image illustrating the electrode of FIG. 9A after a 3.5 Vrms voltage is applied, causing the liquid channel to grow in width and length as it wraps around to the outer edge of the top electrode. The liquid that exceeds past the capillary action is colored in green for visualization and travels an additional 566 μm in 5 minutes for a total length of 1.25 mm. FIGS. 9D-F illustrate multiplexed parallel flow of confined sample liquid for high throughput screening. FIG. 9D is an image of a multiplexed device created using three parallel top electrodes made of Al. The drop reservoir can be seen in black on the left-hand side. FIG. 9E is a fluorescent image of the device of FIG. 9D before applying voltage. FIG. 9F is an image of the device of FIG. 9D after applying 3.5 Vrms for 5 min. Multiple channels formed in parallel are demonstrated for high throughput applications.

FIGS. 5A-D illustrate active sorting of large particles and impurities from entering the channel/sensing area. Such active sorting may be beneficial for more routine protocols by providing robust operation and possibly less sample preparation, such as in particle separation using centrifugation or dialysis. ALD grown nanogaps achieve low voltage dielectrophoretic trapping of nanoparticles within solution. Due to a similar ALD nanogap, strong dielectrophoretic forces exist at the microchannel entrance. The method of dielectrophoretic rejection at the entrance to the channel depends on the conductivity of the solution and frequency of operation. This can be quantified in system using a lumped term call the Clausius-Mossotti factor (CMF). The sign of the real part of the Clausius-Mossotti Factor (CMF) may determine the modality at which particles are gated from the microchannel, as shown in Equation 23 below.

$$CMF = \frac{\varepsilon_p^*(\omega) - \varepsilon_L^*(\omega)}{\varepsilon_p^*(\omega) + 2\varepsilon_L^*(\omega)} \quad \text{(Equation 23)}$$

In Equation 23 above, $\varepsilon_P^*$ is the complex dielectric function of the particle and $\varepsilon_L^*$ is the complex dielectric function of the liquid medium surrounding the particle at a driving frequency ω, respectively, defined using Equation 23. When the particles are more polarizable then the surrounding liquid solution, the real CMF will be positive and result in particles trapped to the substrate surface before entering the microchannel. Conversely, if liquid is more polarizable (which correlates to high concentration of ions), the CMF will be negative resulting in a repelling force from the entrance to the channel.

Figure 10A:
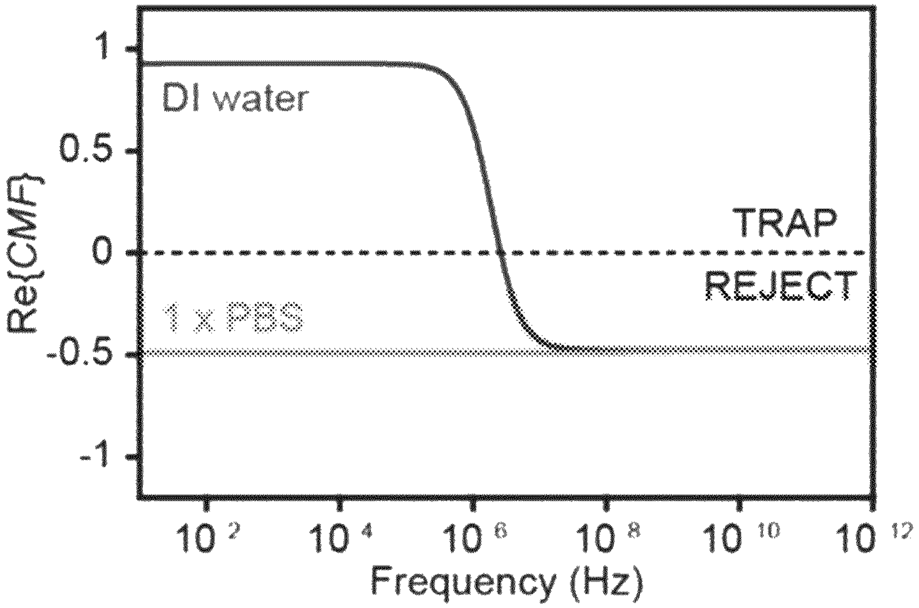
FIG. 10A is an example graph illustrating the real part of the Clausius-Mossotti factor (CMF) as a function of frequency for polystyrene in DI water and 1×PBS buffer.

FIG. 10A is a graph illustrating the real part of the Clausius-Mossotti factor (CMF) as a function of frequency for polystyrene in DI water and 1×PBS buffer. With our operating frequency of 100 kHz, PS beads are trapped in DI water and repelled in 1×PBS, preventing their entrance into the liquid channel. If the real part of the CMF is negative, particles lacking sufficient thermal energy will be repelled from the channel entrance (as compared to trapped at the entrance for a positive CMF value).

The dielectrophoretic force a spherical particle experiences depends on the size of the particle, gradient of the electric field generated by the electrodes, and the real part of the Clausius-Mossotti factor (CMF). As particles in solution wander or flow to the entrance of our microchannel, their thermal energy will determine whether they can breach the dielectrophoretic gate or be rejected from entering the microchannel. A 1D thermal force a spherical particle possesses (expressed as Brownian motion) depends on the particle's size as shown below, as shown in Equation 23 below.

$$F_{th} = \frac{k_B T}{2r_p} \quad \text{(Equation 23)}$$

Where $F_{th}$ is a thermally derived force contributing to Brownian motion, $k_B$ is the Boltzmann constant, T is the ambient temperature and $r_p$ is the particle's effective radius.

This force must be greater than the dielectrophoretic gate force provided below, as shown in Equation 24 below.

$$F_{sphere}=\pi\varepsilon_L r_p^3 Re\{CMF\}\nabla|E|^2 \quad \text{(Equation 24)}$$

Here $\varepsilon_L$ is the dielectric constant of the surrounding medium and the CMF was provided with Equation 23. The $\nabla|E|$ term is the gradient of the electric field generated from the nanogap. Larger particles feel a stronger rejection from the gap due to the cubic dependence on the particle radius, $r_p$. This can be utilized as a natural filtration, where large particles and impurities are filtered at the gate entrance and rejected from the liquid channel.

Figure 10B:
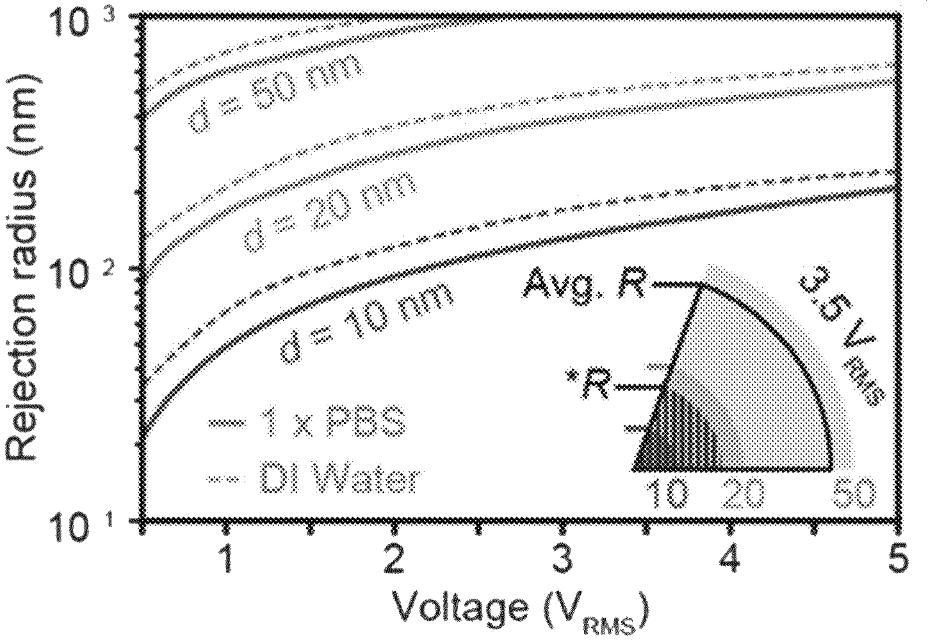
FIG. 10B is an example graph of a theoretical rejection radius for PS beads of various diameters, with an inset illustrating each gate radii to the size of the channel entrance.

The size limit for filtering depends on the operating voltage used to draw the channels and height of the channel, R. FIG. 10B is a graph of the theoretical rejection radius or "gate" for PS beads of various diameters, with an inset as a visual aid comparing each gate radii to the size of the channel entrance (average R and nominal—*R). Theoretical plots were generated using COMSOL to demonstrate the gate radius that rejects polystyrene particles of various sizes as a function of operating voltage, as shown in FIG. 10B. This was simulated for both DI water and 1×PBS, in which particles are trapped at the gate radius rather than repelled, respectively. Both result in the rejection of large particles (due to particle radius correlating to thermal energy). The theoretical rejection radius (or distance radially clear from the channel entrance) of polystyrene beads are provided as an example, as shown in FIG. 10B. Depending on the gate radius and its overlap with the channel's radius, R, an annulus is formed which sets the window for which particles can enter the channel. As a visual aid, a sector channel was made with the corresponding gate radii for various particle sizes at the operating voltage of 3.5 Vrms. It can be seen for the nominal channel radius of 400 nm, particles smaller than about 15 nm can enter the channel. When using the mean channel radius of 900 nm, particles smaller than 50 nm can enter the channel. Our 200 nm particles have a rejection radius greater than 4 μm and thus cannot enter our channel.

Figure 10C:
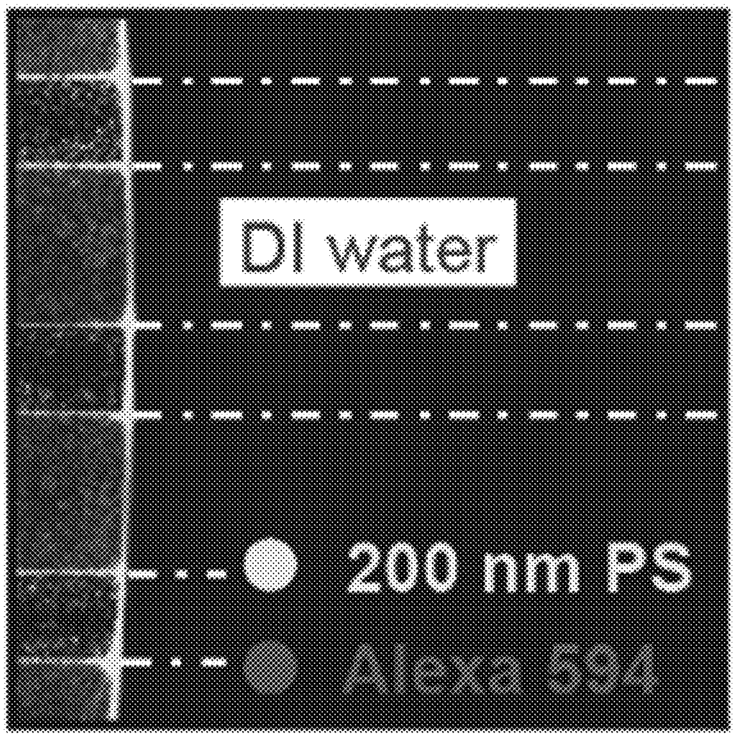
FIG. 10C is an image of an example experimental filtration test using DI water with 200 nm diameter polystyrene beads with 3.5 Vrms at 100 kHz.
Figure 10D:
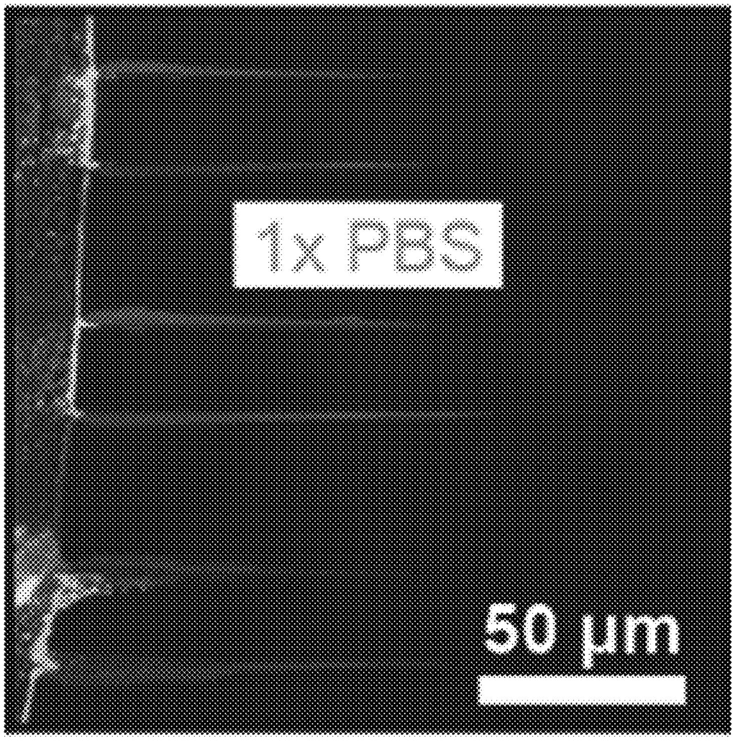
FIG. 10D is an image of an example experimental filtration test using 1×PBS ambient buffer.

To test this, solutions with 5 μM Alexa 594 dye (red) and fluorescent 200 nm polystyrene beads (green) were made in both DI water and 1×PBS on a multiplexed chip, as shown in FIGS. 10C and 10D. A non-resonant, 3.5 Vrms potential was dropped across both devices for equal comparison and driven with a 100 kHz signal. FIG. 10C is an image of an experimental filtration test using DI water with 200 nm diameter polystyrene beads with 3.5 Vrms at 100 kHz. The drop reservoir can be seen on the left where the liquid is dyed red to distinguish from the green fluorescent 200 nm PS beads. The location of six multiplexed electrode edges are plotted as dotted lines to visualize the location of the expected flow. As predicted, the heads get trapped at the entrances of the channels and no flow is observed. At this frequency, PS beads are trapped at the gate entrance in DI solution (and possibly impede flow), as shown in FIG. 10C, FIG. 10D is an image of the same experimental filtration test as FIG. 10C performed using 1×PBS ambient buffer where liquid is pulled down the six channels while actively sorting out the PS beads. However, they are repelled from the channel entrance in conductive 1×PBS solution, as shown in FIG. 10D—demonstrating active sorting of 200 nm particles from Alexa 594 molecules from entering the microchannels.

TABLE 3

Threshold Voltages

| Device Parameter | n | Mean (Vrms) | Standard Deviation (Vrms) |
|---|---|---|---|
| Threshold Voltage (DI Water) | 8 | 4.47 | 0.73 |
| Resonant Threshold (DI Water) | 3 | 1.44 | 0.16 |
| Threshold Voltage (1 × PBS) | 6 | 1.70 | 0.46 |
| Resonant Threshold (1 × PBS) | 4 | 0.53 | 0.12 |

FIGS. 13A-13C are images of passivation layers having different surface properties to reduce a contact angle. 10 nm aluminum oxide dielectric layer and a 5 nm titanium oxide passivation layer was prepared on two planar electrodes. Drops of deionized water were placed on different edges of the aluminum oxide dielectric layer and titanium oxide passivation layer. The samples were placed on a stage and a silver mirror (Thorlabs) directed the image of the drop profile through a long working distance objective microscope. The contact angle of the drops was measured on both sides of each drop. FIG. 13A is an image of a drop on the passivation layer prior to UV treatment. The contact angle of the drop is about 60 degrees. FIG. 13B is an image of the drop on the passivation layer after 30 seconds of UV treatment. The contact angle of the drop is about 40 degrees. FIG. 13C is an image of the drop on the passivation layer after 10 minutes of UV treatment. The contact angle of the drop is about 30 degrees. As such, the contact angle of microchannels may be tuned by varying the UV exposure of passivation layers.

As described herein, a microfluidic device may utilize geometric implications of a surface tension model to confine and electrically actuate liquid microchannels. By combining the out-of-plane stacked electrode design and nanogap electrode separation, we can contrast EWOD by confining liquid transport (1-4 μm in width and over a millimeter in length) while actively sorting large particles from the microchannels. Further, voltage operation is greatly reduced compared to classic LDEP platforms, operable within the range of transistor gate logic or even wireless power transfer. These implications, with its simplistic design, may result in a powerful tool for future point-of-care and handheld bio diagnostic devices.

Wireless Liquid Actuation

As described above, such as in FIG. 4B above, systems described herein may be configured to manipulate a fluid using a wireless voltage source. Wireless liquid actuation was demonstrated by spinning two in-house solenoid coils for transmitting and receiving radio-frequency power. These coils were made using 24-gauge silver plated copper wire (OD: 0.031 inch, Lapp Tannehill) and were characterized using LCR meter and a caliper. The primary coil had a measured inductance of 10.1 μH (number of turns=10, diameter=3.6 cm, height=0.3 cm, quality factor=25) and was used for transmitting power. The secondary coil used for collecting the transmitted power had a measured inductance 51.9 μH (number of turns=30 turns, diameter=3.5 cm, height=0.6 cm, quality factor=50) and was wired in series to the DEP fluidic device.

Figure 14A:
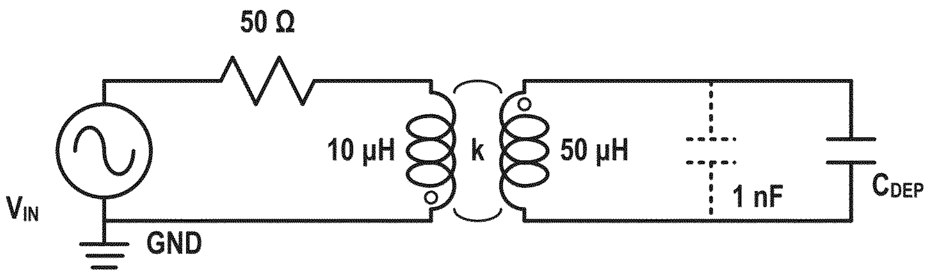
FIG. 14A is a schematic diagram of an example wireless inductive coupling circuit with a coupling coefficient k.

FIG. 14A is a schematic diagram of a wireless inductive coupling circuit with a coupling coefficient k. A primary coil (Lp=10 μH) was connected to a function generator, and a secondary coil (Ls=50 μH) was connected to the device, as shown in FIG. 14A. The coils were separated at a fixed distance of 1.2 cm throughout the entirely of the experiment.

After placing a liquid drop on the DEP fluidic device, a small-amplitude driving signal (~100 mV) was used to determine the resonant operating frequency of the circuit. The resonant operating frequency was determined as the frequency which produced the largest voltage gain across the DEP fluidic device as measured by an oscilloscope. The input voltage was then increased by increments of 0.1 V (0.07 $V_{RMS}$) until a microchannel formed with a width of 1 μm or greater and a length greater than 5 μm. This condition was chosen to ensure actual channel formation could be differentiated from intensity fluctuations at the electrode edge due to light scattering from the reservoir drop. Since the average electrode height was ~850 nm, a confirmed microchannel radius should be similar in size and thus a 1 μm or greater condition was a conservative condition to confirm the presence of actuated liquid. It was found experimentally that wireless PBS threshold experiments were more sensitive to variations in the wet device capacitance. This resulted in less predictable operating resonant frequency. To mitigate this unpredictability caused by the wet device capacitance, a 1 nF capacitor was placed in parallel (in which case the same threshold voltage is still dropped across both the device and added capacitor), which resulted in operation more robust to fluctuations in the wet device capacitance. This was done only for wireless PBS measurements and the specific capacitance value chosen was intended to keep the total capacitance similar to the previously measured averaged wet device capacitance of 1.5 nF.

Figure 14B:
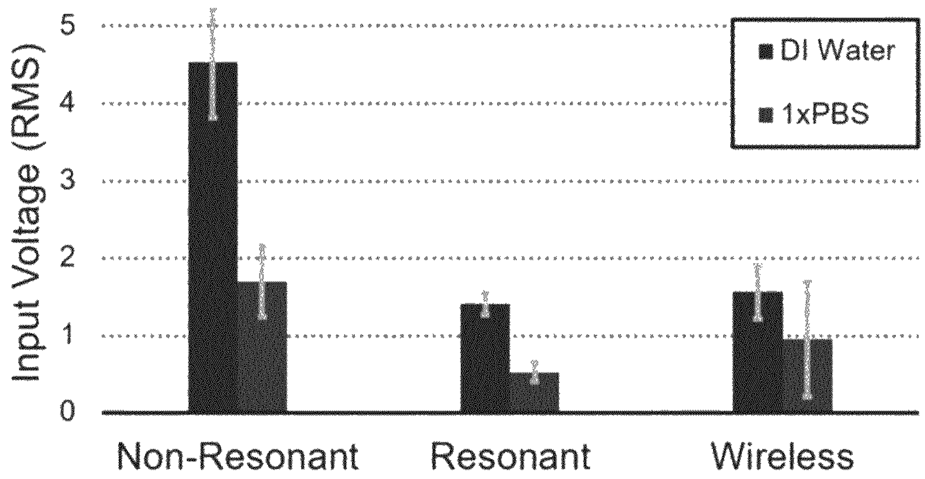
FIG. 14B is an example graph of a required input voltage for DI water and PBS buffer for three different device configurations, including a wired non-resonant circuit (RC circuit), a wired resonant circuit (LCR circuit), and a resonant wireless circuit using inductively coupled coils.

Wireless liquid actuation was then tested over seven devices for DI water and six devices for PBS solution. FIG. 14B is a graph of a required input voltage for DI water and PBS buffer for three different device configurations, including a wired non-resonant circuit (RC circuit), a wired resonant circuit (LCR circuit), and a resonant wireless circuit using inductively coupled coils (1-1.5 cm separation). The wireless input voltage was 1.6±0.3 $V_{RMS}$ for DI water and 1.0±0.7 $V_{RMS}$ for PBS which is well below the 5-volt amplitude (3.5 $V_{RMS}$) of transistor-to-transistor (TTL) digital logic used in integrated circuits.

Figure 15A:
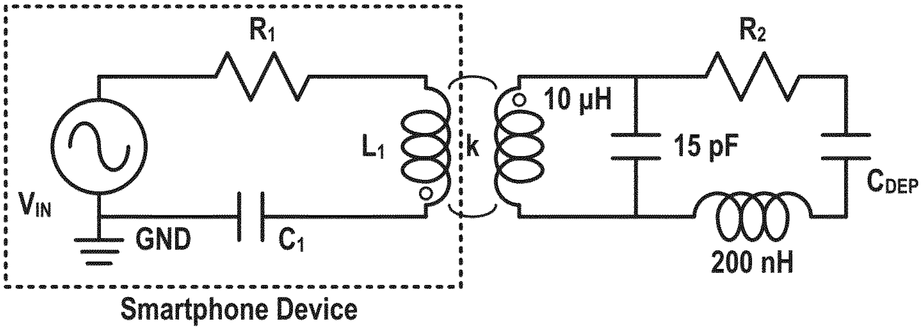
FIG. 15A is a schematic diagram of an example Near Field Communication (NFC) circuit that was both simulated and tested experimentally.

In some instances, systems described herein may be configured to manipulate a fluid using a relatively low power wireless voltage source, such as a wireless voltage source on a smartphone or other portable consumer device. FIG. 15A is a schematic diagram of a Near Field Communication (NFC) circuit that was both simulated and tested experimentally. The circuit on the left was enclosed by the smartphone device and modeled as a simple LCR series circuit. The electric values of the components in the left circuit and the $R_2$ resistor were fit to our experimental data using values readily available from vendors. The voltage drop across the device and NFC frequency were monitored using an oscilloscope. For smartphone NFC actuation, a smartphone device (Google Pixel 3a) with an NFC application running (Class NfcF JIS 6319-4, NFC Tools, wakdev) was held by hand and brought in close proximity (<1 cm) to the 10 μH coil for 5 minutes while the actuation of PBS buffer was recorded using a microscope and CCD. The voltage and frequency drop across the device was monitored in real time using an oscilloscope to confirm wireless transfer of NFC power. The voltage ranged from 1-10 $V_{RMS}$ (depending on how the phone was held, i.e. angle, small shifts in height, etc.) with an average value of 4.8 $V_{RMS}$. Per NFC standards, the driving frequency was 13.5 MHz.

Figure 15B:
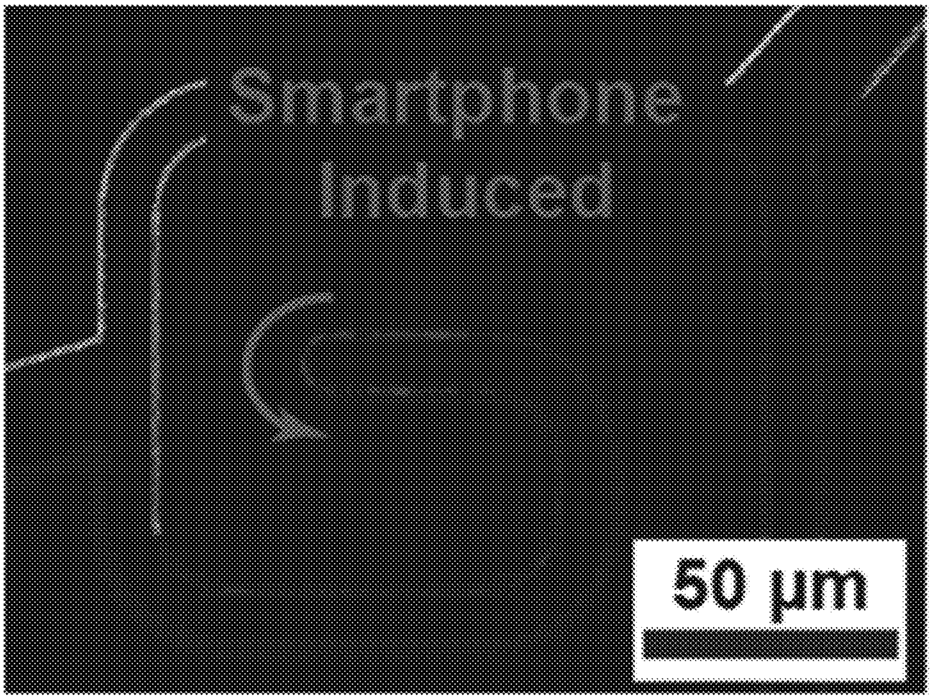
FIG. 15B is a photograph illustrating smartphone powered actuation.

The above experiment was performed three times with the PBS solution in which two of the three yielded discernable liquid actuation. FIG. 15B is a photograph illustrating smartphone powered actuation pulling the PBS solution past the capillary action while increasing the channel width throughout the entire channel length as more solution is actively drawn from the drop. One experiment was attempted using DI water in which no actuation was observed. Since the average voltage was near the threshold criteria for DI water, it is believed actuation was not observed due to the difficulty in maintaining consistent enough voltage above threshold.

Protein Extraction, Mixing, and Chemical Labeling

Figure 16A:
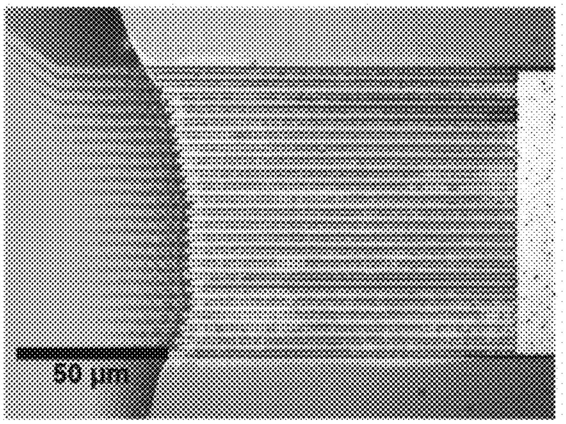
FIG. 16A is an example photograph of a GFP protein extracted and pulled down a line array using electrofluidics.

Systems described herein may be used to manipulate fluids for diagnostics, such as biological diagnostics. Wireless protein extraction was demonstrated using green fluorescent protein (GFP) (Sino Biological) at a concentration of 4.5 μM GFP in 1×PBS buffer solution. The top electrode consisting of an electrode line array to form many fluidic channels was fabricated for extraction. FIG. 16A is a photograph of a GFP protein extracted and pulled down a line array using electrofluidics. An input voltage of 4.2 $V_{RMS}$ was applied (wired and wirelessly) and protein is seen in fluorescence (left) to be extracted from the drop down the channel, as seen in FIG. 16A. Clumps of protein can be observed especially on the bottom of the array.

Figure 16B:
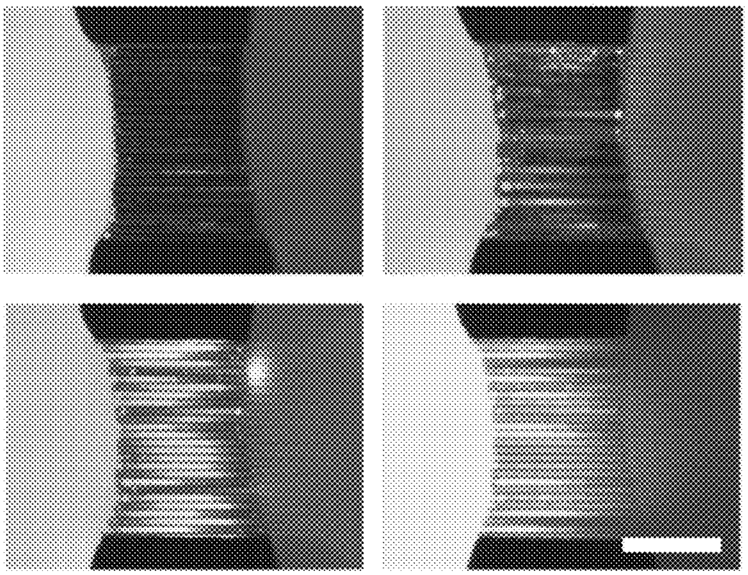
FIG. 16B is a series of example photographs of a sequence of solution mixing of GFP protein (left portion of images) and Alexa dye (right portion of images).
Figure 16C:
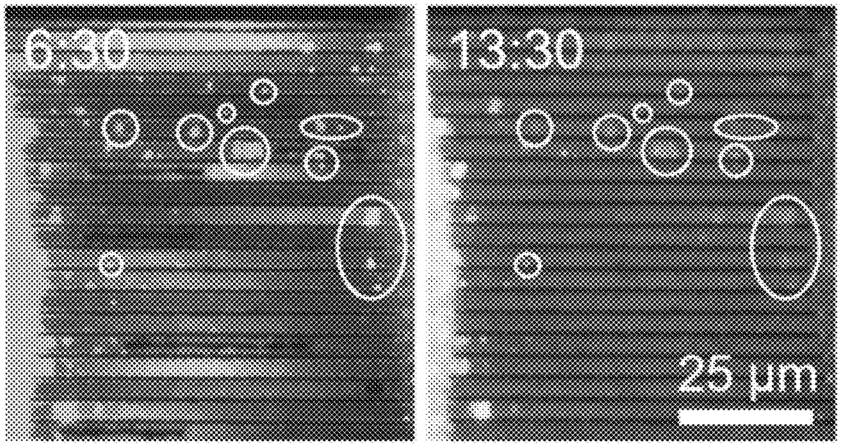
FIG. 16C is a series of example photographs before (left image) and after (right image) an Alexa draft evaporates from the mixing illustrated in FIG. 16B.

This experiment was repeated in which a second drop (red) containing 5 μM Alexa dye (ThermoFisher Scientific) was introduced on the opposite side of the drop with GFP. This Alexa dye contains a carboxylic acid group for binding to free amine groups of the GFP protein. The GFP protein has 36 Lysine, Arginine or Histidine amino acids which all posses free amine groups for binding and fluorescently labeling with Alexa. FIG. 16B is a series of photographs of a sequence of solution mixing of GFP protein (left portion of images) and Alexa dye (right portion of images). Images were taken during mixing from a green and red fluorescent channel and overlapped to appreciate the mixing from their corresponding fluorescent molecules. Scale bar is 50 μm. An input voltage of 4.2 $V_{RMS}$ was applied, it can be seen the two solutions mix within the microchannels, as seen in FIG. 16B. FIG. 16C is a series of photographs before (left image) and after (right image) an Alexa draft evaporates from the mixing illustrated in FIG. 16B. After the Alexa drop evaporates, clumps of GPF protein that were extracted from the drop (locations verified in their natural green fluorescent channel, left image) are seen to be successfully labeled red by the Alexa dye in the red fluorescent channel.

Virus Extraction

Figure 17A:
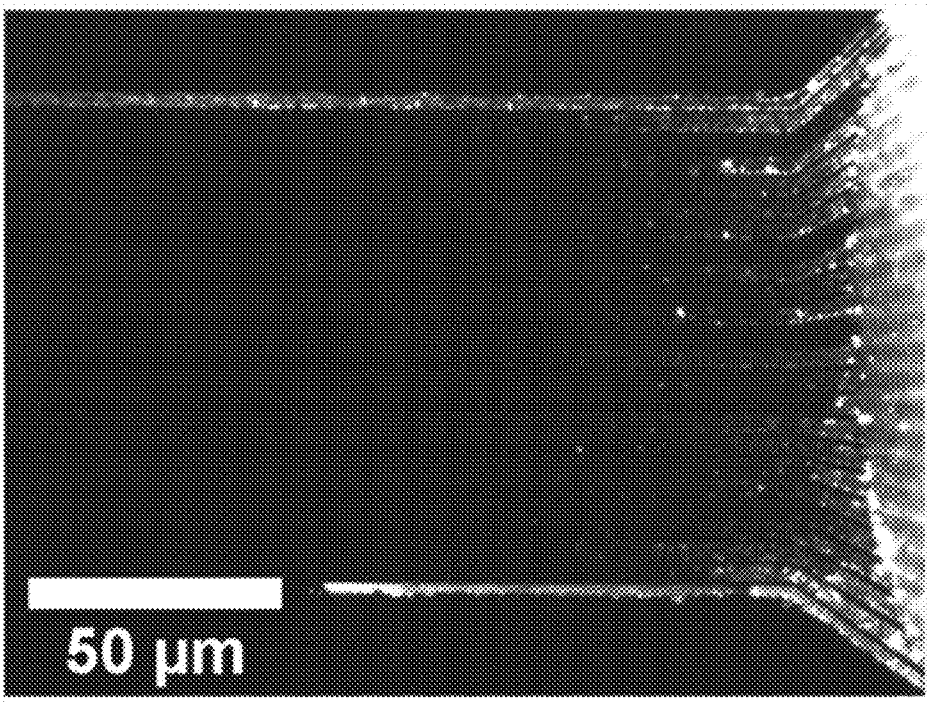
FIG. 17A is an example photograph of a solution containing fluorescently labeled Norovirus-like-particles inn a line-array electrofluidic device.

To demonstrate virus extraction, Norovirus (20-40 nm in diameter) virus-like-particles (VLPs) were purchased (Native Antigen Company) and fluorescently labeled for imaging using a commercial FITC labeling kit (Abcam). This solution was then diluted with PBS such that the virus mass concentration was 7.4 μg/mL. The same line array top electrode structure used for protein extraction was used. FIG. 17A is a photograph of a solution containing fluorescently labeled Norovirus-like-particles inn a line-array electrofluidic device. An input voltage of 4.2 VRMS was applied and fluorescently labeled virus particles are seen to be extracted into the channels. After applying 4.2 $V_{RMS}$, channels were formed (see top and bottom channel) as well as particles are seen to be extracted into the line-array region.

Figure 17B:
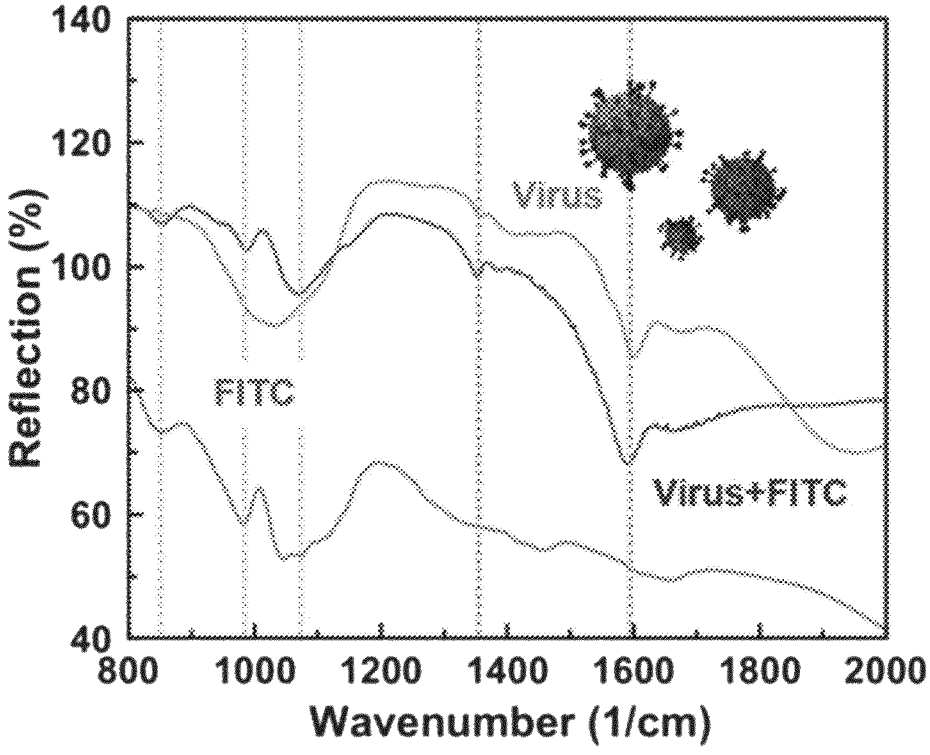
FIG. 17B is an example graph of IR spectra for Norovirus-like particles and FITC dye.

To confirm the presence of virus particles, this experiment was repeated for drops containing just the FITC fluorescent dye and just the VLPs. FIG. 17B is a graph of IR spectra for Norovirus-like particles and FITC dye. Using infrared absorption spectra taken from the line array, absorption dips associated with just the FITC dye and just the virus particles could be differentiated and thus provides a second confirmation that virus particles can be extracted into the channel region.

V-Groove Microfluidic Device Simulation

Simulations to prove the efficacy of these designs were ran for a 2 μm thick silicon wafer with a buried oxide for various photolithography pattern widths. These widths determine the apex gap width due to wet etching, as shown in Table 4 below. Then for each corresponding v-groove dimensions, it was assumed a 10 nm $TiO_2$ oxide layer was used to passivate the electrodes (e.g., electrodes 106A and 106B of FIGS. 18D-F) and thus the resulting input voltage to pump fluid (using a non-resonant RC circuit) was found, as shown in Table 4 below. The DEP gating force was then determined using a COMSOL simulation to find the smallest particle that would be rejected at this v-groove structure where smaller particles are able to pass through. As shown in Table 4, smaller particles get rejected as the pattern/apex gap width is reduced. Using the empirically found friction factor from our MIM electrofluidic devices, we could approximate the travel time it would take the fluidic channel to travel 500 μm with a 4 V amplitude signal applied (again using the thinner 10 nm TiO2 oxide layer), as shown in Table 4.

TABLE 4

| Pattern Width | 40 μm | 20 μm | 10 μm | 3 μm |
|---|---|---|---|---|
| Apex Gap Width (um) | 37.3 | 17.4 | 7.2 | 0.260 |
| Threshold V (amp) | 3.6 | 2.5 | 1.6 | 0.3 |
| Particle Rejection Size | 1 μm | 500 nm | 100 nm | 10 nm |
| Time to travel 0.5 mm (s) | 45 | 7 | 3 | 0.97 |

Table 4 illustrates photolithography with various pattern widths that were simulated to predict the threshold voltage for liquid actuation, particle rejection size, and fluid velocity/travel time. The wider pattern widths allow for more exposure to wet etching of the silicon. As the silicon is etched, v-groove structures form down the prescribed crystalline apex angle of silicon. These v-grooves will terminate at the buried oxide and begin etching back a gap width at the apex. These simulated results for a 2 μm Silicone layer are provided. With these values, a 10 nm $TiO_2$ oxide layer is applied for electrofluidic actuation of conductive solution and the corresponding threshold voltage to initiate fluidic actuation was simulated. Further, the DEP force from the corresponding apex gap widths was simulated to determine the smallest particle size rejected where particles smaller can pass through. Finally, an estimate of the time it would take the fluid to travel 0.5 mm was determined.

Figure 21:
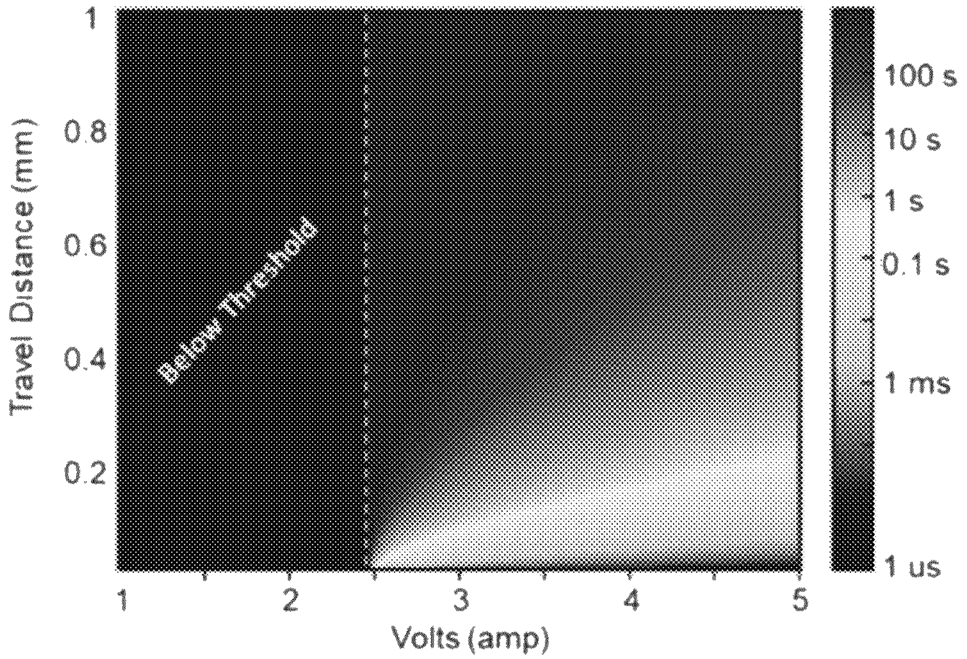
FIG. 21 is an example graph of theoretical travel time as a function of voltage for physiological solutions.

A simulation of the travel distance and time of an electrofluidic channel pulled using the 20 μm pattern width was simulated as a function of applied voltage. FIG. 21 is a graph of theoretical travel time as a function of voltage for physiological solutions. No actuation of fluid (black region to the left of the white dashed line) is possible until the threshold voltage of 2.5 Vamp is applied. With a voltage greater than this threshold, the time needed to actuate the channel down a desired travel distance (y-axis) can be found for a given input voltage using the color bar scale. A 3.5 Vamp signal can pull a liquid 0.5 mm in ~100 s.

Contact Angle Simulation

Tuning the substrate contact angle, θ, (e.g. using self-assembled monolayers or patterned nanostructures) could achieve more consistent/robust flow. Additionally, it could be used to gain the added function for retracting microchannels. A simulation of the conditions for spontaneous capillary flow and anti-capillary flow was determined for various combinations of the substrate contact angle, θ, and sidewall angle, α.

Figure 22:
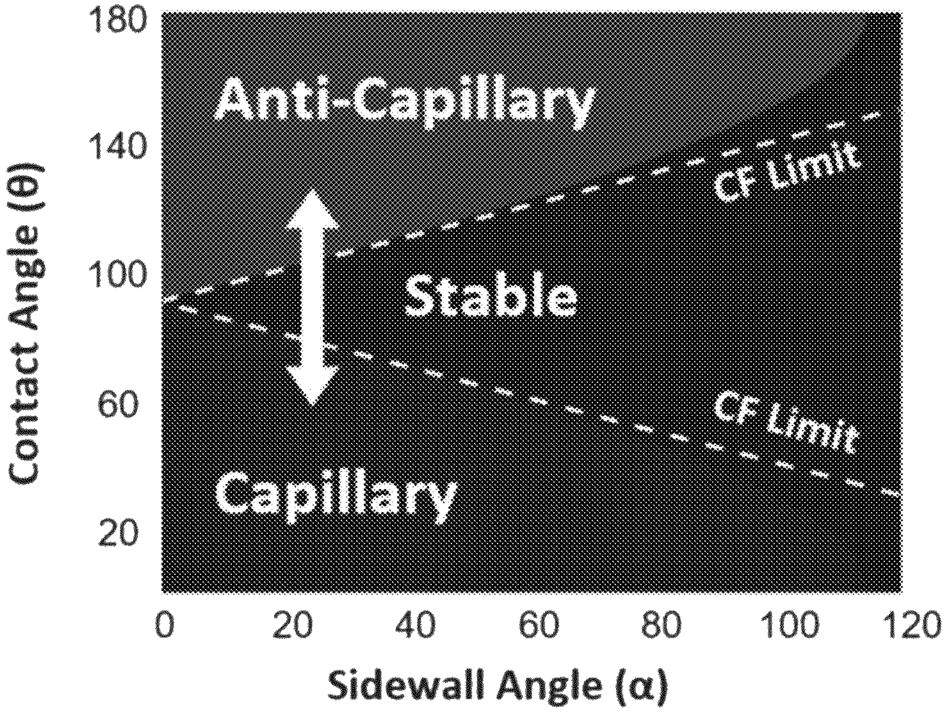
FIG. 22 is an example graph of sidewall angle and contact angle for extracting and retracing microchannels.

FIG. 22 is a graph sidewall angle and contact angle for extracting and retracing microchannels. Depending on the combination of the sidewall angle, α, and contact angle, θ, the chip will exist within either the "Anti-capillary", "Stable", or "Capillary" zones. As discussed previously, the Lippman Equation predicts how the contact angle, θ, of the substrate can be reduced when applying a voltage potential across the two electrodes. If the chips original state exists within the "Anti-capillary" zone, then by applying increasing voltage, all three zones could be achieved. Therefore, full control over extracting the microchannels out of the drop, retracting the channels back into the drop, or no actuation of the channels could be controlled by the level of voltage applied.

By tuning either the contact angle or sidewall angle, a condition can be found such that the chip without voltage bias exists within the "Anti-capillary" zone. Then by apply a voltage bias, the solutions contact angle can be reduced (Lippman Equation) to bring the chip down into the "Stable" zone. Here no liquid actuation occurs and the chip is held at baseline. By increasing the voltage further, the contact angle can be reduced such that the chip now dips within the "Capillary" zone and thus microfluidic channels will begin to form. To stop flow, the voltage can be reduced back to the "Stable" zone or be completely removed such that the chip returns to the "Anti-Capillary" zone. This latter case, the microchannels will then begin to retract back into the reservoir/source drop. In this manner, channel extraction and retraction can be manipulated on the same chip through proper tuning of the contact angle, θ, and sidewall angle, α. Additionally, this process could be reversed in which electro-de-wetting by introducing surfactants into the liquid drop. The result could be the same as above but rather as the voltage is increased the contact angle, θ, would now increase and thus operation could be moved up from the "Capillary" zone to either the "Stable" or "Anti-capillary" zones.

Example 1: A microfluidic device includes a bottom electrode; a dielectric layer on the bottom electrode; and one or more top electrodes on a region of the dielectric layer, wherein each of the one or more top electrodes has a sidewall that forms a sidewall angle with an outer surface of the dielectric layer that is less than about 180 degrees, and wherein the sidewall of each of the one or more top electrodes and a portion of the outer surface of the dielectric layer adjacent to the sidewall define a microchannel region for transporting a microchannel of a fluid.

Example 2: The microfluidic device of example 1, wherein the sidewall angle is between about 70 degrees and about 90 degrees.

Example 3: The microfluidic device of example 1 or 2, wherein the dielectric layer has a thickness less than about 50 nanometers in the region of the dielectric layer between the bottom electrode and each of the one or more top electrodes.

Example 4: The microfluidic device of any of examples 1 to 3, wherein each of the one or more top electrodes has a thickness less than about five micrometers.

Example 5: The microfluidic device of any of examples 1 to 4, wherein each of the one or more top electrodes is separated from another of the one or more top electrodes by less than about 10 micrometers.

Example 6: The microfluidic device of any of examples 1 to 5, further comprising a fluidic reservoir fluidically coupled to the microchannel region of each of the one or more top electrodes.

Example 7: The microfluidic device of any of examples 1 to 6, further comprising a passivation layer on the one or more top electrodes.

Example 8: The microfluidic device of any of examples 1 to 7, further comprising a first end electrode at a first end of the microchannel region and second end electrode at a second end of the microchannel region.

Example 9: A microfluidic system includes a microchip includes a bottom electrode; a dielectric layer on the bottom electrode; and one or more top electrodes on a region of the dielectric layer; and an inductor electrically coupled to at least one of the bottom electrode or the one or more top electrodes, wherein each of the one or more top electrodes has a sidewall that forms a sidewall angle with an outer surface of the dielectric layer that is less than about 180 degrees, and wherein the sidewall of each of the one or more top electrodes and a portion of the outer surface of the dielectric layer adjacent to the sidewall define a microchannel region for transporting a microchannel of a fluid.

Example 10; The microfluidic system of example 9, wherein the inductor is configured to generate an electric field between the bottom electrode and the one or more top electrodes in response to receiving an induced voltage.

Example 11: The microfluidic system of example 10, wherein the induced voltage is less than 5 volts.

Example 12: The microfluidic system of any of examples 9 to 11, further comprising a resonant tank circuit comprising the inductor, wherein the resonant tank circuit is electrically coupled to the bottom electrode and the one or more top electrodes.

Example 13: A method includes depositing a dielectric layer on a bottom electrode; and depositing a top conductive layer on one or more regions of the dielectric layer to form one or more top electrodes, wherein each of the one or more top electrodes has a sidewall that forms a sidewall angle with an outer surface of the dielectric layer that is less than about 180 degrees, and wherein the sidewall of each of the one or more top electrodes and a portion of the outer surface of the dielectric layer adjacent to the sidewall define a microchannel region for transporting a microchannel of a fluid.

Example 14: The method of example 13, further comprising depositing a bottom conductive layer on a substrate to form the bottom electrode.

Example 15: The method of example 13 or 14, further includes depositing, after depositing the dielectric layer and before depositing the top conductive layer, a pattern layer on another region of the dielectric layer, different from the one or more region of the dielectric layer on which the top conductive layer is deposited; and removing, after depositing the top conductive layer, the pattern layer.

Example 16: The method of example 15, wherein the pattern layer is a photoresist layer.

Example 17: The method of any of examples 13 to 16, wherein the dielectric layer is deposited using atomic layer deposition.

Example 18: The method of any of examples 13 to 17, wherein the sidewall angle is between about 70 degrees and about 90 degrees.

Example 19: The method of any of examples 13 to 18, wherein the dielectric layer has a thickness less than about 50 nanometers in a region of the dielectric layer between the bottom electrode and each of the one or more top electrodes.

Example 20: The method of any of examples 13 to 19, wherein each of the one or more top electrodes has a thickness less than about five micrometers.

Example 21: The method of any of examples 13 to 20, wherein each of the one or more top electrodes is separated from another of the one or more top electrodes by less than about 10 micrometers.

Example 22: The method of any of examples 13 to 21, further comprising depositing a passivation layer on the one or more top electrodes.

Example 23: A method for manipulating a fluid includes generating, by a microfluidic device, an electric field in a microchannel region in response to receiving a voltage, wherein the microfluidic device comprises: a bottom electrode; a dielectric layer on the bottom electrode; and one or more top electrodes on a region of the dielectric layer, wherein each of the one or more top electrodes has a sidewall that forms a sidewall angle with an outer surface of the dielectric layer that is less than about 180 degrees, wherein the sidewall of each of the one or more top electrodes and a portion of the outer surface of the dielectric layer adjacent to the sidewall define the microchannel region for transporting a microchannel of a fluid.

Example 24: The method of example 23, wherein an outer surface of the microchannel forms a contact angle with the outer surface of the dielectric layer that is greater than about 50 degrees.

Example 25: The method of any of example 23 or 24, wherein the microchannel has a width less than about 5 micrometers.

Example 26: The method of any of examples 23 to 25, wherein the microfluidic device further comprises an inductor, and wherein the microfluidic device receives an induced voltage.

Example 27: The method of example 26, wherein the microfluidic device receives the induced voltage from a wireless source.

Example 28: The method of any of examples 23 to 27, wherein the received voltage is less than 5 volts.

Example 29: The method of any of examples 23 to 28, wherein the microfluidic device further comprises a first end electrode at a first end of the microchannel region and second end electrode at a second end of the microchannel region, and wherein the method further comprises receiving, by the microfluidic device, a voltage potential between the first end electrode and the second end electrode.

Example 30: A microfluidic device includes a substrate; one or more electrode sections, wherein each electrode section comprises: a first electrode and a second electrode on the substrate, wherein the first electrode and the second electrode are separated by a gap; and a dielectric layer on the first electrode and the second electrode, wherein a sidewall of the first electrode and a sidewall of the second electrode form an apex angle that is less than about 180 degrees, and wherein the sidewalls of the first electrode and the second electrode define a microchannel region for transporting a microchannel of a fluid.

Example 31: The microfluidic device of example 30, wherein the apex angle is less than about 120 degrees.

Example 32: The microfluidic device of example 30 or 31, wherein the gap has an apex width between about 10 nanometers and about 20 micrometers.

Example 33: The microfluidic device of any of examples 30 to 32, wherein each of the first electrode and the second electrode has a thickness less than about 10 micrometers.

Example 34: The microfluidic device of any of examples 30 to 33, wherein the one or more electrode sections comprise: a first electrode section having a first gap at a first apex width; and a second electrode section having a second gap at a second apex width, different from the first width.

Example 35: The microfluidic device of any of examples 30 to 34, wherein the first electrode comprises a first support layer and a first conductive layer on the first silicon layer, wherein the second electrode comprises a second support layer and a second conductive layer on the second silicon layer, and wherein each of the first and second support layers comprise a crystalline material.

Example 36: A microfluidic system includes a microchip includes a substrate; one or more electrode sections, wherein each electrode section comprises: a first electrode and a second electrode on the substrate, wherein the first electrode and time second electrode are separated by a gap; and a dielectric layer on the first electrode and the second electrode; and an inductor electrically coupled to at least one of the first electrode or the second electrode, wherein a sidewall of the first electrode and a sidewall of the second electrode form an apex angle that is less than about 180 degrees, and wherein the sidewalls of the first electrode and the second electrode define a microchannel region for transporting a microchannel of a fluid.

Example 37: The microfluidic system of example 36, wherein the inductor is configured to generate an electric field between the first electrode and the second electrode in response to receiving an induced voltage.

Example 38: The microfluidic system of example 36 or 37, further comprising a resonant tank circuit comprising the inductor, wherein the resonant tank circuit is electrically coupled to the first electrode and the second electrode.

Example 39: A method includes etching a support layer on a substrate to form a first support layer and a second support layer; and depositing a conductive layer on the first support layer and the second support layer to form a first electrode and a second electrode, wherein the first and second electrodes are separated by a gap; wherein a sidewall of the first electrode and a sidewall of the second electrode form an apex angle that is less than about 180 degrees, and wherein the sidewalk of the first electrode and the second electrode define a microchannel region for transporting a microchannel of a fluid.

Example 40: The method of example 39, wherein the apex angle is less than about 120 degrees.

Example 41: The method of example 39 or 40, wherein the gap has an apex width between about 10 nanometers and about 20 micrometers.

Example 42: The method of any of examples 39 to 41, wherein each of the first electrode and the second electrode has a thickness from the substrate less than about 10 micrometers.

Example 43: A method for manipulating a fluid includes generating, by a microfluidic device, an electric field in a microchannel region in response to receiving a voltage, wherein the microfluidic device comprises: a substrate; one or more electrode sections, wherein each electrode section comprises: a first electrode and a second electrode on the substrate, wherein the first and second electrodes are separated by a gap; and a dielectric layer on the first electrode and the second electrode, wherein a sidewall of the first electrode and a sidewall of the second electrode form an apex angle that is less than about 180 degrees, and wherein the sidewalls of the first electrode and the second electrode define the microchannel region for transporting a microchannel of the fluid.

Example 44: The method of example 43, wherein the microfluidic device further comprises a first end electrode at a first end of the microchannel region and second end electrode at a second end of the microchannel region, and wherein the method further comprises receiving, by the microfluidic device, a voltage potential between the first end electrode and the second end electrode.

Various examples of the disclosure have been described. Any combination of the described systems, operations, or functions is contemplated. These and other examples are within the scope of the following claims.

What is claimed is:

1. A microfluidic device, comprising:

a bottom electrode;

a dielectric layer on the bottom electrode; and one or more top electrodes on a region of the dielectric layer, wherein each of the one or more top electrodes has a sidewall that forms a sidewall angle with an outer surface of the dielectric layer that is less than about 180 degrees, wherein the sidewall of each of the one or more top electrodes and a portion of the outer surface of the dielectric layer adjacent to the sidewall define a microchannel region for transporting a microchannel of a fluid, wherein the microchannel region is an open, nonplanar microchannel region and the microchannel of the fluid is an open microchannel of the fluid, and wherein the microfluidic device is configured to transport the microchannel of the fluid along the microchannel region by generating an electric field between the bottom electrode and the one or more top electrodes to vary a static contact angle of the fluid.

2. The microfluidic device of claim 1, wherein the sidewall angle is between about 70 degrees and about 90 degrees.

3. The microfluidic device of claim 1, wherein the dielectric layer has a thickness less than about 50 nanometers in the region of the dielectric layer between the bottom electrode and each of the one or more top electrodes.

4. The microfluidic device of claim 1, wherein each of the one or more top electrodes has a thickness less than about five micrometers.

5. The microfluidic device of claim 1, wherein each of the one or more top electrodes is separated from another of the one or more top electrodes by less than about 10 micrometers.

6. The microfluidic device of claim 1, further comprising a fluidic reservoir fluidically coupled to the microchannel region of each of the one or more top electrodes.

7. The microfluidic device of claim 1, further comprising a passivation layer on the one or more top electrodes.

8. The microfluidic device of claim 1, further comprising a first end electrode at a first end of the microchannel region and second end electrode at a second end of the microchannel region.

9. A microfluidic system, comprising:

a microchip comprising:

a bottom electrode;

a dielectric layer on the bottom electrode; and one or more top electrodes on a region of the dielectric layer; and an inductor electrically coupled to at least one of the bottom electrode or the one or more top electrodes, wherein each of the one or more top electrodes has a sidewall that forms a sidewall angle with an outer surface of the dielectric layer that is less than about 180 degrees, and wherein the sidewall of each of the one or more top electrodes and a portion of the outer surface of the dielectric layer adjacent to the sidewall define a microchannel region for transporting a microchannel of a fluid, wherein the microchannel region is an open, nonplanar microchannel region and the microchannel of the fluid is an open microchannel of the fluid, and wherein the microchip is configured to transport the microchannel of the fluid along the microchannel region by generating an electric field between the bottom electrode and the one or more top electrodes to vary a static contact angle of the fluid.

10. The microfluidic system of claim 9, wherein the inductor is configured to generate an electric field between the bottom electrode and the one or more top electrodes in response to receiving an induced voltage.

11. The microfluidic system of claim 10, wherein the induced voltage is less than 5 volts.

12. The microfluidic system of claim 9, further comprising a resonant tank circuit comprising the inductor, wherein the resonant tank circuit is electrically coupled to the bottom electrode and the one or more top electrodes.

13. A method, comprising:

depositing a dielectric layer on a bottom electrode of a microfluidic device; and depositing a top conductive layer on one or more regions of the dielectric layer to form one or more top electrodes of the microfluidic device, wherein each of the one or more top electrodes has a sidewall that forms a sidewall angle with an outer surface of the dielectric layer that is less than about 180 degrees, and wherein the sidewall of each of the one or more top electrodes and a portion of the outer surface of the dielectric layer adjacent to the sidewall define a microchannel region for transporting a microchannel of a fluid, wherein the microchannel region is an open, nonplanar microchannel region and the microchannel of the fluid is an open microchannel of the fluid, and wherein the microfluidic device is configured to transport the microchannel of the fluid along the microchannel region by generating an electric field between the bottom electrode and the one or more top electrodes to vary a static contact angle of the fluid.

14. The method of claim 13, further comprising depositing a bottom conductive layer on a substrate to form the bottom electrode.

15. The method of claim 13, further comprising:

depositing, after depositing the dielectric layer and before depositing the top conductive layer, a pattern layer on another region of the dielectric layer, different from the one or more regions of the dielectric layer on which the top conductive layer is deposited; and removing, after depositing the top conductive layer, the pattern layer.

16. The method of claim 15, wherein the pattern layer is a photoresist layer.

17. The method of claim 13, wherein the dielectric layer is deposited using atomic layer deposition.

18. The method of claim 13, wherein the sidewall angle is between about 70 degrees and about 90 degrees.

19. The method of claim 13, wherein the dielectric layer has a thickness less than about 50 nanometers in a region of the dielectric layer between the bottom electrode and each of the one or more top electrodes.

20. The method of claim 13, wherein each of the one or more top electrodes has a thickness less than about five micrometers.

21. The method of claim 13, wherein each of the one or more top electrodes is separated from another of the one or more top electrodes by less than about 10 micrometers.

22. The method of claim 13, further comprising depositing a passivation layer on the one or more top electrodes.

23. A method for manipulating a fluid, comprising:

generating, by a microfluidic device, an electric field in a microchannel region in response to receiving a voltage, wherein the microfluidic device comprises:

a bottom electrode;

a dielectric layer on the bottom electrode; and one or more top electrodes on a region of the dielectric layer, wherein each of the one or more top electrodes has a sidewall that forms a sidewall angle with an outer surface of the dielectric layer that is less than about 180 degrees, wherein the sidewall of each of the one or more top electrodes and a portion of the outer surface of the dielectric layer adjacent to the sidewall define the microchannel region for transporting a microchannel of the fluid, wherein the microchannel region is an open, nonplanar microchannel region and the microchannel of the fluid is an open microchannel of the fluid, and wherein the electric field generated is generated between the bottom electrode and the one or more top electrodes to vary a static contact angle of the fluid to transport the microchannel of the fluid along the microchannel region.

24. The method of claim 23, wherein an outer surface of the microchannel forms a contact angle with the outer surface of the dielectric layer that is greater than about 50 degrees.

25. The method of claim 23, wherein the microchannel has a width less than about 5 micrometers.

26. The method of claim 23, wherein the microfluidic device further comprises an inductor, and wherein the microfluidic device receives an induced voltage.

27. The method of claim 26, wherein the microfluidic device receives the induced voltage from a wireless source.

28. The method of claim 23, wherein the received voltage is less than 5 volts.

29. The method of claim 23, wherein the microfluidic device further comprises a first end electrode at a first end of the microchannel region and a second end electrode at a second end of the microchannel region, and wherein the method further comprises receiving, by the microfluidic device, a voltage potential between the first end electrode and the second end electrode.

* * * * *